(12) United States Patent
Shukla et al.

(10) Patent No.: US 7,451,432 B2
(45) Date of Patent: Nov. 11, 2008

(54) TRANSFORMATION OF COMPONENTIZED AND EXTENSIBLE WORKFLOW TO A DECLARATIVE FORMAT

(75) Inventors: Dharma K. Shukla, Sammamish, WA (US); Mayank Mehta, Bellevue, WA (US); Aditya G. Bhandarkar, Redmond, WA (US); Abhay Vinayak Parasnis, Sammamish, WA (US); Akash J. Sagar, Redmond, WA (US); Kumarswamy P. Valegerepura, Bellevue, WA (US); Robert B. Schmidt, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 531 days.

(21) Appl. No.: 11/047,017

(22) Filed: Jan. 31, 2005

(65) Prior Publication Data

US 2006/0074732 A1    Apr. 6, 2006

Related U.S. Application Data

(60) Provisional application No. 60/615,543, filed on Oct. 1, 2004.

(51) Int. Cl.
*G06F 9/44* (2006.01)
(52) U.S. Cl. .............. 717/106; 718/104; 717/105; 717/109; 717/121
(58) Field of Classification Search .......... 717/104–110
See application file for complete search history.

(56) References Cited

U.S. PATENT DOCUMENTS

| | | | |
|---|---|---|---|
| 5,634,127 A | 5/1997 | Cloud et al. | |
| 5,774,661 A | 6/1998 | Chatterjee et al. | |
| 5,930,512 A * | 7/1999 | Boden et al. | 717/102 |
| 6,016,394 A * | 1/2000 | Walker | 717/104 |
| 6,225,998 B1 | 5/2001 | Okita et al. | |
| 6,253,369 B1 | 6/2001 | Cloud et al. | |
| 6,397,192 B1 | 5/2002 | Notani et al. | |
| 6,405,364 B1 * | 6/2002 | Bowman-Amuah | 717/101 |
| 6,411,961 B1 | 6/2002 | Chen | |

(Continued)

FOREIGN PATENT DOCUMENTS

| | | |
|---|---|---|
| DE | 10215653 A1 | 11/2003 |
| EP | 0 697 652 A1 | 2/1996 |
| EP | 0953929 A2 | 11/1999 |
| WO | WO 00/54202 A2 | 9/2000 |

OTHER PUBLICATIONS

Marshak, "IBM's Flowmark Object-Oriented Workflow for Mission-Critical Applications," Workgroup Computing Report, vol. 17, No. 5, May 1, 1994, pp. 3-13, U.S.A.

(Continued)

*Primary Examiner*—Wei Zhen
*Assistant Examiner*—Phillip H Nguyen
(74) *Attorney, Agent, or Firm*—Senniger Powers LLP

(57) ABSTRACT

Building a componentized workflow model. Each step of the workflow is modeled as an activity that has metadata to describe design time aspects, compile time aspects, and runtime aspects of the workflow step. A user selects and arranges the activities to create the workflow via user interfaces or application programming interfaces. The metadata associated with each of the activities in the workflow is collected to create a persistent representation of the workflow. Users extend the workflow model by authoring custom activities. The workflow may be compiled and executed.

19 Claims, 10 Drawing Sheets

U.S. PATENT DOCUMENTS

| | | | |
|---|---|---|---|
| 6,567,783 B1 | 5/2003 | Notani et al. | |
| 6,604,104 B1 | 8/2003 | Smith | |
| 6,621,505 B1 | 9/2003 | Beauchamp et al. | |
| 6,662,188 B1 | 12/2003 | Rasmussen et al. | |
| 6,678,882 B1 | 1/2004 | Hurley et al. | |
| 6,708,186 B1 | 3/2004 | Claborn et al. | |
| 6,768,986 B2 | 7/2004 | Cras et al. | |
| 6,807,583 B2 | 10/2004 | Hrischuk et al. | |
| 6,845,507 B2 | 1/2005 | Kenton | |
| 6,898,604 B1 | 5/2005 | Ballinger et al. | |
| 6,898,790 B1 | 5/2005 | Cheong et al. | |
| 6,954,747 B1 | 10/2005 | Wang et al. | |
| 6,964,034 B1* | 11/2005 | Snow | 717/121 |
| 6,985,939 B2* | 1/2006 | Fletcher et al. | 709/223 |
| 7,069,536 B2* | 6/2006 | Yaung | 717/102 |
| 7,093,207 B1 | 8/2006 | Liao et al. | |
| 7,096,454 B2* | 8/2006 | Damm et al. | 717/105 |
| 7,133,833 B1* | 11/2006 | Chone et al. | 705/7 |
| 7,181,440 B2 | 2/2007 | Cras et al. | |
| 7,222,334 B2* | 5/2007 | Casati et al. | 717/136 |
| 7,233,952 B1 | 6/2007 | Chen | |
| 7,240,324 B2* | 7/2007 | Casati et al. | 717/103 |
| 7,272,816 B2* | 9/2007 | Schulz et al. | 717/104 |
| 2002/0032692 A1 | 3/2002 | Suzuki et al. | |
| 2002/0040312 A1 | 4/2002 | Dhar et al. | |
| 2002/0170035 A1 | 11/2002 | Casati et al. | |
| 2002/0184610 A1 | 12/2002 | Chong et al. | |
| 2002/0188644 A1 | 12/2002 | Seidman | |
| 2003/0004771 A1 | 1/2003 | Yaung | |
| 2003/0055668 A1 | 3/2003 | Saran et al. | |
| 2003/0084016 A1 | 5/2003 | Norgaard et al. | |
| 2003/0084127 A1 | 5/2003 | Budhiraja et al. | |
| 2003/0177046 A1 | 9/2003 | Socha-Leialoha | |
| 2003/0200527 A1 | 10/2003 | Lynn et al. | |
| 2003/0217053 A1 | 11/2003 | Bachman et al. | |
| 2003/0220707 A1 | 11/2003 | Budinger et al. | |
| 2003/0233374 A1 | 12/2003 | Spinola et al. | |
| 2004/0078778 A1 | 4/2004 | Leymann et al. | |
| 2004/0139426 A1 | 7/2004 | Wu | |
| 2004/0148213 A1 | 7/2004 | Aziz et al. | |
| 2004/0153350 A1 | 8/2004 | Kim et al. | |
| 2004/0162741 A1 | 8/2004 | Flaxer et al. | |
| 2004/0220910 A1 | 11/2004 | Zang et al. | |
| 2004/0221261 A1 | 11/2004 | Blevins | |
| 2005/0050311 A1 | 3/2005 | Joseph et al. | |
| 2005/0066002 A1 | 3/2005 | Teres et al. | |
| 2005/0071209 A1 | 3/2005 | Tatavu et al. | |
| 2005/0071347 A1 | 3/2005 | Chau et al. | |
| 2005/0149908 A1 | 7/2005 | Klianev | |
| 2005/0192963 A1 | 9/2005 | Tschiegg et al. | |
| 2005/0193286 A1 | 9/2005 | Thatte et al. | |
| 2005/0204333 A1 | 9/2005 | Denby et al. | |
| 2005/0216482 A1 | 9/2005 | Ponessa | |
| 2005/0267889 A1 | 12/2005 | Snyder et al. | |
| 2006/0053120 A1 | 3/2006 | Shum et al. | |
| 2006/0074734 A1 | 4/2006 | Shukla et al. | |
| 2006/0143193 A1 | 6/2006 | Thakkar et al. | |
| 2006/0206863 A1 | 9/2006 | Shenfield et al. | |
| 2006/0241954 A1 | 10/2006 | Jeng et al. | |
| 2006/0271927 A1 | 11/2006 | Morales et al. | |

OTHER PUBLICATIONS

Parasnis, "Session Code: DAT321 —Data Systems—Biz Talk Orchestration Engine Futures," Microsoft Professional Developers Conference 2003, Oct. 27, 2003, 13 pages, Microsoft Corporation, U.S.A.

Maurer et al., "Merging Project planning and Web-Enabled Dynamic Workflow Technologies," IEEE Internet Computing, Jun. 2000, pp. 65-74, IEEE Service Center, U.S.A.

Virdell, "Business Processes and Workflow in the Web Services World," printed from http://www-106.ibm.com/developerworks/webservices/library/ws-work.html, IBM Corporation, Jan. 1, 2003, 6 pages, U.S.

Boiko, "Everyone talks About Workflow, But What Is It, Really?" printed from http://www.cmswatch.com/Features/TopicWatch/FeaturedTopic/?feature_id=47, CMSWorks, Inc., Oct. 4, 2001, 5 pages, U.S.

Adkins, "Introduction to Workflow Learning," printed from http://www.internettime.com/workflow/intro_wfl.htm, Workflow Learning Institute, Internet Time Group LLC, Nov. 2003, 11 pages, U.S.

Brambilla, M. et al., "Exception Handling within Workflow-based Web Applications," Web Engineering, 4th International Conference, Munich: LNCS Springer, 2004, 14 pgs., http://www.webml.org/webml/upload/ent5/1/213_brambilla_icwe2004.pdf.

Hagen, C. et al., "Exception Handling in Workflow Management Systems," IEEE Transactions On Software Engineering, Oct. 2000, vol. 26, No. 10, pp. 943-958.

Perkins, A., "Business Rules=Metal-Data," Proceedings of the Technology of Object-Oriented Languages and Systems (TOOLS 34'00), 2000, pp. 285-294.

Zhao, Z. et al., "Dynamic Workflow in a Grid Enabled Problem Solving Environment," Proceeding of 5th International Conference on Computer and Information Technology, IEEE 2005, 7 pgs.

Goff et al., "Object Serialization and Decimalization using XML," Apr. 2001, Cern, Switzerland, pp. 1-14.

ISO/IEC, "Document Schema Definition Languages (DSDL)—Part 4: Namespace-based Validation Dispatching Language- NVDL," May 2004, available at http://dsdl.org, pp. i-vi, 1-45.

* cited by examiner

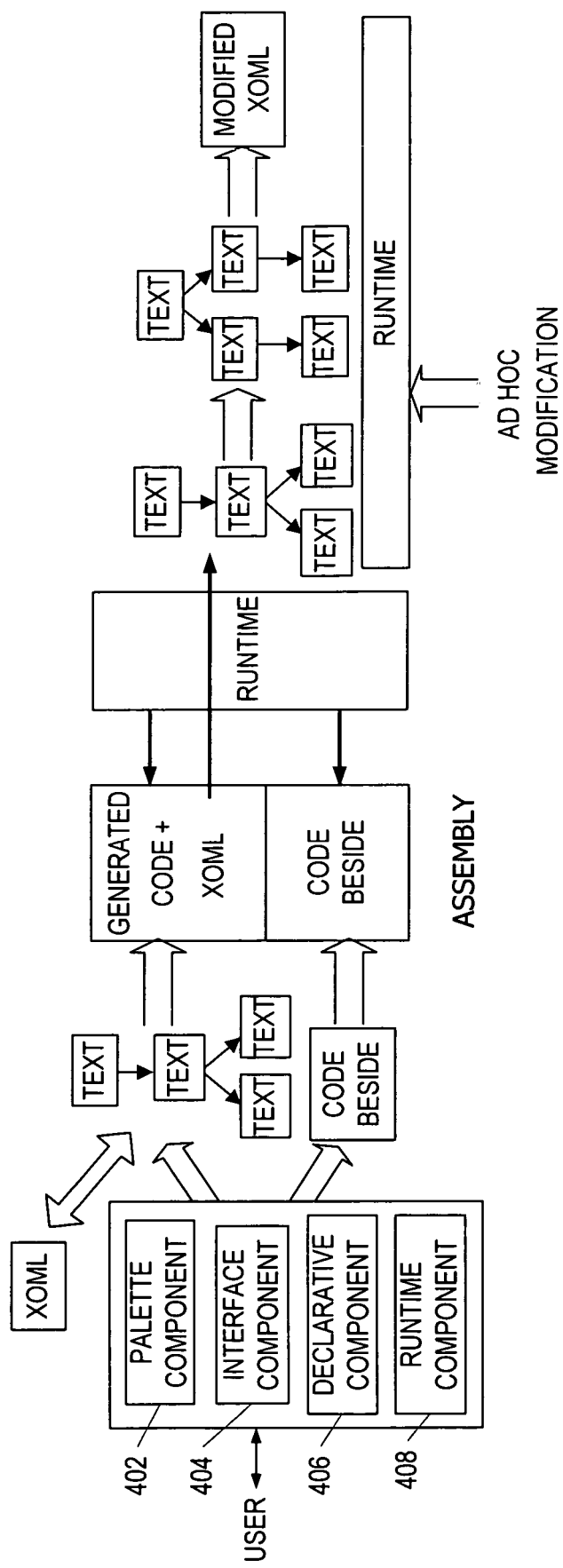

FIG. 5

WORKFLOW DESIGNER

SPECIFY DETAILS FOR "SEND FOR APPROVAL"

CHOOSE THE CONDITIONS AND ACTIONS THAT DEFINE THIS STEP OF THE WORKFLOW:

[SET CONDITIONS] WHEN <u>AUTHOR IS JOHN SMITH</u>

[ADD ACTIONS ▶] EMAIL <u>FOO.ASPX</u> TO <u>FRONTPAGE PM</u> VIA EMAIL
THEN SEND <u>CURRENT DOCUMENT FOR APPROVAL</u> TO <u>USER'S MANAGER</u>

[SET CONDITIONS] ELSE WHEN <u>AUTHOR IS KIM SMITH</u>

[ADD ACTIONS ▶] EMAIL <u>FOO?ASPX</u> TO <u>SHAREPOINT PM</u>
AND SEND <u>CURRENT DOCUMENT FOR APPROVAL</u> TO <u>USER'S MANAGER</u>

ADD CONDITIONAL BRANCH

SETTINGS FOR THIS STEP

NAME: [SEND FOR APPROVAL]

WORKFLOW STEPS

🖧 SEND FOR APPROVAL
  ⊗ ARCHIVE DOCUMENT
  ⊗ NOTIFY MANAGERS
ADD WORKFLOW STEP

[CANCEL] [< BACK] [NEXT >] [FINISH]

US 7,451,432 B2

TRANSFORMATION OF COMPONENTIZED AND EXTENSIBLE WORKFLOW TO A DECLARATIVE FORMAT

CROSS-REFERENCE TO RELATED APPLICATION

This application claims the benefit of U.S. provisional patent application No. 60/615,543 filed Oct. 1, 2004.

TECHNICAL FIELD

Embodiments of the present invention relate to the field of workflow modeling. In particular, embodiments of this invention relate to a componentized and extensible workflow model.

BACKGROUND OF THE INVENTION

Existing systems attempt to map business problems to high-level workflows by modeling the business problem. However, real world workflows vary in a variety of dimensions such as (a) execution and modeling complexity, (b) knowledge of the structure of the flow at design time, (c) statically defined or ad-hoc/dynamic, (d) ease of authoring and editing the flow at various points in its lifecycle, and (e) weak or strong association of business logic with the core workflow process. Existing models fail to accommodate all these factors.

Further, most existing workflow models are based on either language-based approaches (e.g., BPEL4WS, XLANG/S, and WSFL) or application based approaches. Language based approaches are high-level workflow languages with a closed set of pre-defined constructs help model the workflow process to the user/programmer. The workflow languages carry all of the semantic information for the closed set of constructs to enable the user to build a workflow model. However, the languages are not extensible by the developers and represent a closed set of primitives that constitute the workflow model. The languages are tied to the language compiler shipped by the workflow system vendor. Only the workflow system product vendor may extend the model by extending the language with a new set of constructs in a future version of the product. This often requires upgrading the compiler associated with the language.

Application based approaches are applications which have the workflow capabilities within the application to solve a domain specific problem. These applications are not truly extensible nor do they have a programmable model.

With the existing approaches, the issues of complexity, foreknowledge, dynamic workflows, authoring ease, and strength of associations with business logic and core workflows are not adequately addressed. There are no extensible, customizable, and re-hostable workflow designer frameworks available to build visual workflow designers to model different classes of workflows. Existing systems lack a rapid application development (RAD) style workflow design experience which allows users to graphically design the workflow process and associate the business logic in a programming language of developer's choice. In addition, there are no ink-enabled workflow designers.

In addition, existing systems fail to provide seamless ad-hoc or dynamic editing for executing workflows. Workflow processes are dynamic and mobile in nature and their form cannot be entirely foreseen at design time. The workflow processes start in a structured fashion and eventually evolve and change during the course of their execution lifetime. There is a need for a workflow authoring framework that allows workflow builders to author various types of workflow models at design time as well as make ad-hoc or dynamic changes to running workflows in a seamless manner. Even after a workflow process has been deployed and is running, changes in business requirements often force changing or editing the currently running workflow process. There is a need for a system that provides runtime authoring of a workflow process.

In addition, workflow processes deal with cross cutting orthogonal and tangled concerns that span multiple steps of a workflow process model. For example, while parts of the workflow process are designed to participate in long running transactions, other parts of the same process are designed for concurrent execution. Still other portions of the same workflow process require tracking, while other portions handle business or application level exceptions. There is a need to apply certain behaviors to one or more portions of a workflow process.

Some workflow modeling approaches are impractical as they require a complete flow-based description of an entire business process including all exceptions and human interventions. Some of these approaches provide additional functionality as exceptions arise, while other approaches exclusively employ a constraint-based approach instead of a flow-based approach to modeling a business process. Existing systems implement either the flow-based or constraint-based approach. Such systems are too inflexible to model many common business situations.

Accordingly, a componentized and extensible workflow model is desired to address one or more of these and other disadvantages.

SUMMARY OF THE INVENTION

Embodiments of the invention provide an extensible framework for building a componentized workflow model. In particular, each step of a workflow process has an associated component model that describes design time aspects, compile time aspects, and runtime aspects of the workflow step. Further, any developer may extend the core workflow model by authoring these components. The invention includes a workflow engine that is flexible and powerful enough to coordinate the execution of various kinds of workflows including highly formal machine-to-machine processes, constraint-based ad-hoc human workflows, and workflows having a mixture of flow-based and constraint-based approaches. The workflow engine permits activation, execution, query, and control capabilities against executing workflows. For example, the invention permits ad-hoc and dynamic changes to executing workflows. The workflow engine is rehostable or embeddable in a variety of host environments including both server and client environments. Each specific host environment marries the workflow engine to a set of service providers. The aggregate capabilities of the service providers determine the kinds of workflows that may be executed in the specific host environment.

Other embodiments of the invention provide a declarative format such as an extensible orchestration markup language (XOML) for serializing a workflow model. The declarative format enables a user to extend the workflow model by writing a set of components. The semantics corresponding to the various steps of a workflow process are encapsulated in an activity validator component which validates and enforces the semantics for a given component at compile time. Embodiments of the declarative format of the invention further enable the declaration and association of data with various elements of the workflow model. The declarative format supports the transformation of the data through the workflow. For example, the format represents external data sources such as databases or files, code snippets, and business rules within the workflow model declaratively.

An embodiment of the invention provides an extensible, customizable, and re-hostable workflow designer framework to build graphical/visual workflow designers to model different classes of workflows. Another embodiment of the invention supports a rapid application development style workflow design experience to allow users to graphically design a workflow process and associate business logic in any programming language. Embodiments of the invention also provide ink support using pen and tablet technologies. The invention provides a free form drawing surface in which a workflow drawn by a user is converted into an internal representation. The invention supports creation and modification of the workflows via ink editing on the existing drawing surface (e.g., add/delete activities), and ink annotation of existing workflows (e.g., comments, suggestions, or reminders hand-drawn on the design surface).

Still other embodiments of the invention provide components for capturing cross cutting behaviors in a declarative way and applying the behaviors to selected portions of a workflow model. Other embodiments of the invention execute the selected portions of the workflow model in the context of the behaviors associated therewith. Embodiments of the invention provide a framework, reusable components, and a language to deal with cross cutting orthogonal and tangled concerns that span multiple steps of a workflow process model.

In accordance with one aspect of the invention, a computer-implemented method models a workflow. The workflow includes activities and the workflow models a business process. The method includes presenting a plurality of activities, receiving a selection of the presented activities by a user, and serializing the received activities to create a persistent representation of the workflow.

In accordance with another aspect of the invention, one or more computer-readable media have computer-executable components for modeling a workflow. The workflow includes activities and the workflow models a business process. The components include a palette component for presenting a plurality of activities. The components also include an interface component for receiving, from a user, a selection and hierarchical organization of the activities presented by the palette component. The components also include a declarative component for serializing the activities received by the interface component to create a persistent representation of the workflow.

In accordance with yet another aspect of the invention, a computer-implemented system models a workflow. The workflow includes activities and the workflow models a business process. The computer-implemented system includes a package identifying a plurality of activities. The system also includes an interface for selecting and interrelating one or more of the activities from the package to create a workflow. The system also includes a serializer for serializing the received activities to create a persistent representation of the workflow.

Alternatively, the invention may comprise various other methods and apparatuses.

Other features will be in part apparent and in part pointed out hereinafter.

BRIEF DESCRIPTION OF THE DRAWINGS

FIG. 4 illustrates an exemplary component model lifecycle.

FIG. 5 is a high-level application user interface for authoring workflows that relies upon wizards for specification of the workflow.

Figure 1:
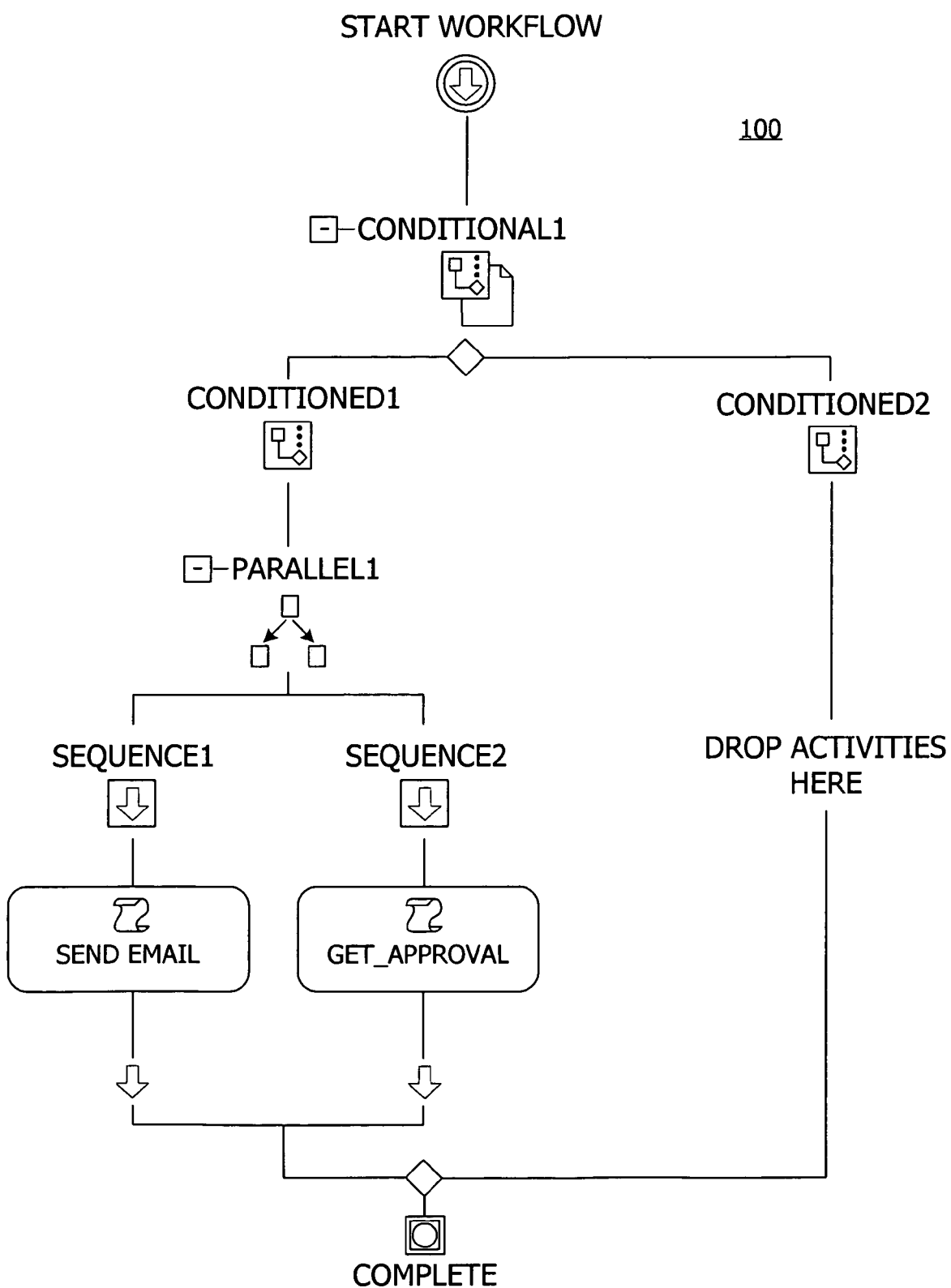
FIG. 1 is an exemplary workflow containing tasks and control flow composite activities.

Appendix A describes exemplary activities.

Appendix B describes exemplary activity designer interfaces.

Appendix C describes activity validation.

Appendix D describes exemplary application programming interfaces of the invention.

Corresponding reference characters indicate corresponding parts throughout the drawings.

DETAILED DESCRIPTION OF THE INVENTION

Embodiments of the invention model a workflow representing a process such as a business process. Business processes are dependant and ordered tasks, activities, or the like that result in predictable and repeatable outcomes. Including an organization's operating procedures, institutional working knowledge, and information resources, business processes are designed to satisfy defined business objectives in an efficient and timely manner. In an efficient environment, the functional components of a process can be readily identified, adapted, and deployed to address ever-changing corporate requirements. The workflow is an end user's experience interacting with the tasks in a business process. Tasks are modeled as activities, components, or the like, each representing a unit of work that is performed by a person or machine. In one embodiment, a plurality of activities is presented to a user. The user selects and organizes the activities to create the workflow. The created workflow is executed to model the business process. Referring first to FIG. 1, an exemplary workflow 100 contains tasks and control flow composite activities.

In one example, an orchestration engine workflow model supports modeling, authoring and executing different classes of workflows. Examples include modeling a given problem in terms of a structured set of steps that occur in an ordered sequence or as a set of asynchronous events. The orchestration engine coordinates the execution of schedules. A schedule is an organized set of activities that is arranged hierarchically in a tree structure. The execution context of, and the shared data visible to, an executing activity is provided by a scope. Each activity represents a component that encapsulates metadata for the step in a workflow process. The activity is the basic unit of execution in the workflow model and has associated properties, handlers, constraints and events. Each activity may be configured by user code in any programming language. For example, the user code may represent business or application logic or rules written in common language runtime (CLR) languages. Each activity supports pre-interception hooks and post-interception hooks into execution in the user code. Each activity has associated runtime execution semantics and behavior (e.g., state management, transactions, event handling and exception handling). Activities may share state with other activities. Activities may be primitive activities or grouped into a composite activity. A primitive or basic activity has no substructure (e.g., child activities), and thus is a leaf node in a tree structure. A composite activity contains substructure (e.g., it is the parent of one or more child activities).

In one embodiment, activities are of three types: simple activity, container activity and root activity. In this embodiment, there is one root activity in the model, and none or any quantity of simple activities or container activities inside the root activity. A container activity may include simple or container activities. The entire workflow process may be used as an activity to build higher-order workflow processes. Further, an activity may be interruptible or non-interruptible. A non-interruptible composite activity does not include interruptible activities. A non-interruptible activity lacks services that would cause the activity to block.

Figure 2:
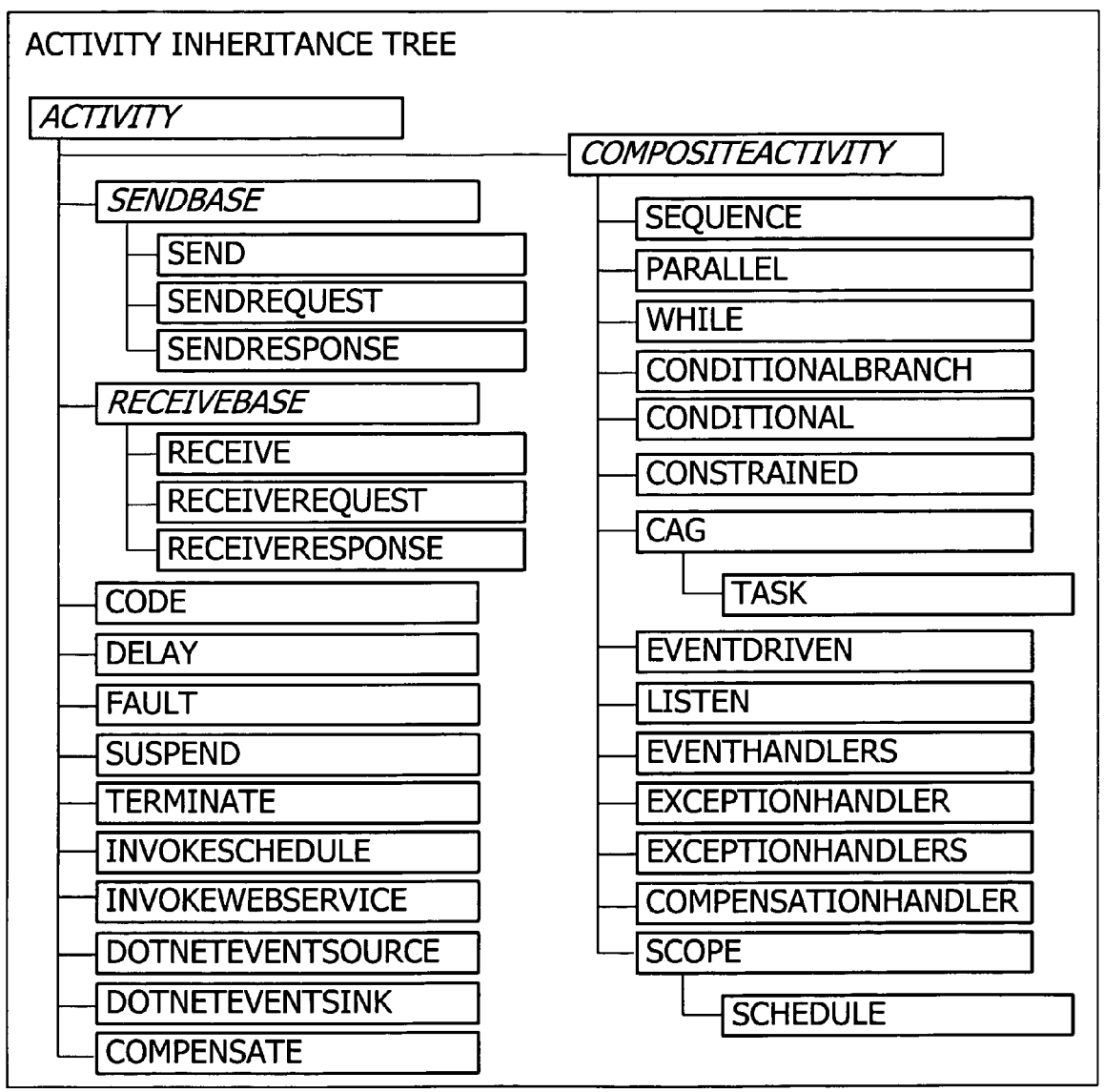
FIG. 2 illustrates an exemplary activity inheritance tree.

The orchestration engine provides an exemplary set of activities. Referring to FIG. 2, an activity inheritance tree illustrates exemplary activities. The exemplary activities listed in FIG. 2 are described in detail in Appendix A. In addition, any user may write one or more activities to extend the workflow model. For example, the user may write activities for a specific business problem, domain, workflow standard (e.g. business process execution language), or a target platform. The orchestration engine may provide a rich set of services to the user for writing activities which include, for example, services of analyzing code, type resolution and type system, services for serialization, and rendering.

In one embodiment, each activity has at least three parts: metadata, instance data, and execution logic. The metadata of the activity defines data properties that may be configured. For example, some activities may share a common set of metadata defined in an activity abstract base class. Each activity declares its own additional metadata properties according to its needs by extending this class.

The values of metadata properties will be shared by all instances of that activity across the instances of the schedule where the activity was configured. For example, if a user creates a schedule A and adds a send activity to it, the send activity is given identification information (e.g., "001") as part of its metadata. A second send activity added to the schedule would receive its own unique identification information (e.g., "002"). Once multiple instances of schedule A are created and executed, all instances of send "001" will share metadata values. In contrast, the instance data of an activity defines a set of data which is specific to the instance of the activity in a running schedule instance. For example, a delay activity may offer a read-only property on its instance data that is the date and time value representing the delay activity's timeout value. This value is available once the delay activity has begun executing, and it is most likely different for every single instance of the delay activity. It is common to refer to instances of schedules, and especially instances of activities and tasks, without qualifying the reference with "instance."

Composite activities have their set of child activities as another element. Child activities are considered metadata in one embodiment. The orchestration engine model explicitly permits manipulation of this metadata at runtime within an instance of the schedule. It is possible to add new child activities to a composite activity that is part of an executing schedule instance such that only the metadata (activity tree) for that schedule instance is affected.

Figure 3:
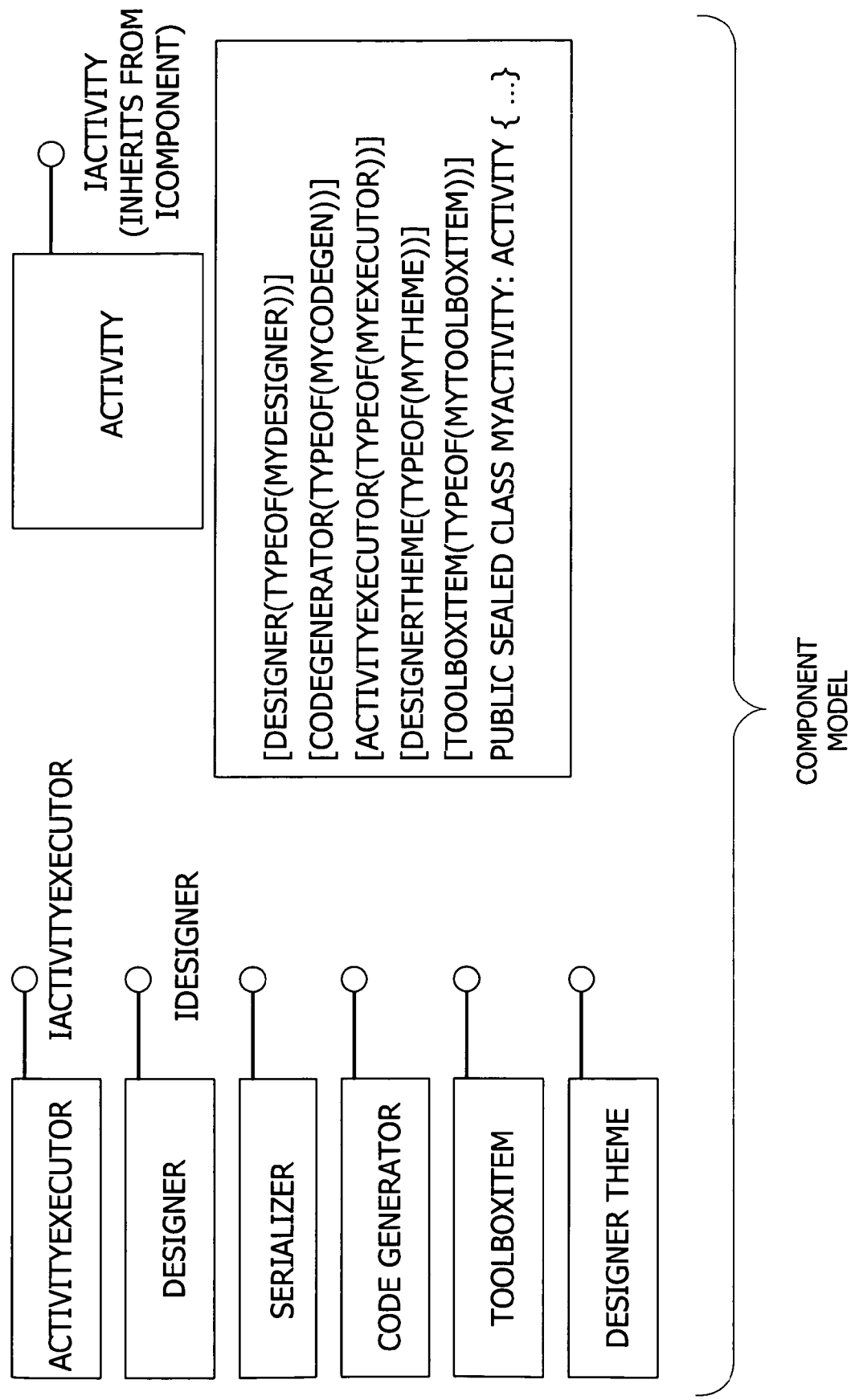
FIG. 3 illustrates an exemplary component model.

Referring next to FIG. 3, each activity has an associated set of components that forms the component model for the activity. The associated set of components includes an activity executor, an activity designer, an activity serializer, an activity validator (e.g., semantic checker), and an activity code generator. The activity executor is a stateless component that implements the execution semantics for the activity. The activity executor works with the metadata of an activity to implement the activity. A core scheduler acts as a service provider for the activity executor to provide services to the activity executor.

The activity designer visually displays the design time visual representation of the activity. The activity designer is a node in a designer hierarchy and may be themed or skinned. The activity designer is hosted in a design environment (e.g., an application program) and interacts with the host design environment via services. Activity designer interfaces are described in detail in Appendix B. The activity validator enforces the activity semantics at compile time as well as runtime. The activity validator operates on the context of the workflow model and uses the services provided by the environment (e.g., compiler, designer, or runtime). Validation occurs at various points in the lifecycle of a workflow. Structural compliance checks are made when creating serialized representations of the workflow, when compiling, and in response to the user's request. The semantic checks may be stronger at runtime than those performed at compile-time to ensure the safety of a runtime operation such as the addition or replacement of an activity in the activity tree of a running instance. The invention evaluates semantics associated with each of the activities for conformance or compliance with, for example, predefined interface requirements. Activity validation is described in detail in Appendix C.

The activity serializer is a component that serializes the metadata of an activity. The activity serializer is called from the various model/format serializers. The entire workflow model is serialized based on an extensible schema into a declarative markup language which may be further translated into other workflow languages as desired.

In one embodiment, the component model for an activity is stored as a data structure on a computer-readable medium. In the data structure, the activity designer is represented by an image field storing data (e.g., an icon) for visually representing the activity. In addition, one or more author time fields store metadata defining properties, methods, and events associated with the activity. The activity serializer is represented by a serializer field storing data for transferring the metadata stored in the author time fields to a declarative representation of the activity. The activity generator is represented by a business logic field storing software code associated with the metadata stored in the author time fields. The activity executor is represented by an executor field storing data for executing the software code stored in the business logic field.

Scopes and Schedules

The execution context of, and the shared data visible to, an executing activity is provided by a scope. A scope is one of the core activities. A scope is a unifying construct for bringing together variables and the state of a long-running service with transactional semantics, error-handling semantics, compensation, event handlers, and data state management. A scope may have associated exception and event handlers. In one embodiment, a scope may be transactional, atomic, long running, or synchronized. Concurrency control is provided for the user in cases of conflicting read-write or write-write access to user variables. A scope is also a transaction boundary, an exception handling boundary, and a compensation boundary. Since scopes may be nested within a schedule, it is further possible to declare variables, messages, channels, and correlation sets with the same name in different scopes (even if the scopes are nested) without name collision.

Scopes nested within a schedule are only executable within the context of that schedule. A schedule may be compiled either as an application (e.g., a standalone executable entity) or as a library (e.g., for invocation from other schedules). Every schedule that is compiled as a library effectively constitutes a new activity type that may be invoked from within other schedules. A schedule's metadata includes the declaration of parameters.

Once a schedule is developed, instances of the developed schedule may be executed. The process of activating and controlling a schedule instance is a function of the host environment in which the orchestration engine is embedded. The orchestration engine provides a no-frills "simple host" that may be used to test schedules. In addition, the orchestration engine provides an activation service to promote standardization of a "service provider" model (e.g., application programming interfaces) that is used alike by the engine and external applications for interacting with the service environment (i.e. host). The activation service creates a schedule instance of a particular schedule type, optionally passing parameters. The schedule instance is essentially a proxy to the running schedule instance and includes an identifier that uniquely identifies the instance, a reference to the metadata (activity tree) for the schedule, and methods to suspend, resume, and terminate the instance. The activation service also support finding a schedule instance based on a given schedule instance identifier.

Code-Beside

A scope activity may have an associated code-beside class that includes business logic for the scope activity. Since a schedule is itself a scope, a schedule may also have a code-beside class. Any scopes nested within a schedule may also have their own code-beside classes. The activities that are nested within a scope share the scope's code-beside class which acts as a container for their shared data state and business logic. For example, metadata for a code activity includes a reference to a method with a particular signature in the code-beside. In another example, metadata for a send activity includes an optional reference to a code-beside method of a particular signature plus mandatory references to a message declaration and a channel declaration.

Exemplary uses of code-beside include the following: declaration of variables, messages, channels, and correlation sets; declaration of in/out/ref parameters; declaration of additional custom properties; preparation of a message to be sent; processing of a message that has been received; implementation of a rule expressed in code that returns a Boolean value; manipulation of locally defined variables; reading activity metadata and instance data; writing activity instance data (e.g., setting a property on an activity about to be executed); raising an event; throwing an exception; enumerating and navigating the hierarchy of activities in the running schedule instance's activity tree, including across nested scopes and schedule invocation boundaries; adding new activities to a composite activity within the running schedule instance; changing the declarative rules associated with activities within the running schedule instance; and obtaining references to, and manipulating, other running schedule instances.

Referring to FIG. 4, a block diagram illustrates an exemplary component model lifecycle. A user interacts with computer-executable components stored on one or more computer-readable media. The computer-executable components include a palette component 402 for presenting a plurality of activities, an interface component 404 for receiving a selection and hierarchical organization of the activities presented by the palette component 402, a declarative component 406 for serializing the activities received by the interface component 404 to create a persistent representation of the workflow, and a runtime component 408 for compiling the workflow representation serialized by the declarative component 406 and the software code received by the interface component 404 into a single assembly containing an executable representation of the workflow. The interface component 404 includes a user interface (e.g., graphical) and/or an application programming interface (API). The user interacts with the computer-executable components to create workflow including code-beside and a serialized representation in a language such as an extensible object markup language (XOML). The runtime component 408 generates the assembly (e.g., generated code, XOML, and code-beside) and executes the assembly. The invention supports ad hoc modifications to the executing workflow, resulting in modified XOML.

In another embodiment, the computer-executable components of the invention provide a schedule interface for creating a schedule associated with the workflow, a scope interface for creating a scope associated with the schedule, and an activity interface for selecting one or more activities. The invention arranges the selected activities to create a workflow within the created schedule for execution within the created scope. The schedule interface, scope interface, and activity interface are application programming interfaces (APIs) in one embodiment.

In a programmatic object model, compiling the plurality of activities arranged in the workflow includes receiving metadata, via a metadata interface, for each of the plurality of activities from the component model associated therewith. Receiving the metadata includes receiving properties, methods, and events for each of the plurality of activities. The method also validates the received metadata by examining semantics associated with the received metadata via a validate interface. The method further generates software code associated with the received metadata via a code generator interface as a function of the validation. The generated software code is compiled via a code compile interface. One or more computer-readable media have computer-executable instructions for performing the method. In one embodiment, the invention provides one or more of the metadata interface, the validate interface, the code generator interface, and the code compile interface.

Workflow Stencils

A workflow stencil (e.g., a workflow template or an activity package) includes a root activity and a set of activities. Stencils may be domain and or host specific. Examples of the former include a structured workflow stencil, human workflow stencil, and an unstructured workflow stencil. Some stencils may be "closed" as a set of activities including one or more roots designed to work together, possibly in a particular host environment. Other stencils may be "open", to varying degrees. A stencil defines its extensibility points. For instance, a developer writes a CustomRoot and a new abstract CustomActivity and declares that the package is CustomRoot plus any activity that derives from CustomActivity.

An exemplary BPEL or XLANG/S stencil includes a root activity with the following characteristics: participates in state management and transactions, has associated event and exception handlers, supports contract first model, may be analyzed, and has well-defined activation and termination behavior. The exemplary stencil further includes a set of messaging specific activities (e.g., Send and Receive and their variants) and other structured activities such as Scope, Loop, Condition, Listen, and Throw.

An exemplary Halifax Stencil includes a root activity with the following characteristics: implicit state management, associated exception handlers (0-n), supports event-based model, has well defined activation behavior, and has undefined termination. The root activity contains 0-n EventDriven activities. Each EventDriven Activity represents a Halifax Action. Each EventDriven Activity has an associated state management protocol and executes in an atomic scope.

Designer Framework (User Interface)

The orchestration engine provides a framework for designing various classes of workflow models in a WYSWYG fashion. For example, referring to FIG. 5, a high-level application user interface for authoring workflows relies upon wizards for specification of the workflow. The framework includes a set of services and behaviors that enable developers to write visual workflow designers. These services provide an efficient way of rendering a workflow process, support for Ink/Tablet for drawing the flows, and support for designer operations such as undo/redo, drag/drop, cut/copy/paste, zoom, pan, search/replace, bookmarks, adornments, smart tags for validation errors, valid drop-target indicators for activities, auto layout, view pagination, navigation markers, drag indicators, print and preview with headers/footers, etc. Through such a user interface, simple workflows containing tasks and control flow composite activities (e.g., sequence, parallel, and conditional) may be constructed. No input of code (or reliance upon existing compiled code) is required either for rule specification (e.g., conditional branching logic, while looping logic) or dataflow specification (e.g., the output of task A is input to task B). The serialized representation of a schedule (including rules and dataflow) is self-contained and complete in some scenarios where no code-beside is required.

Figure 6:
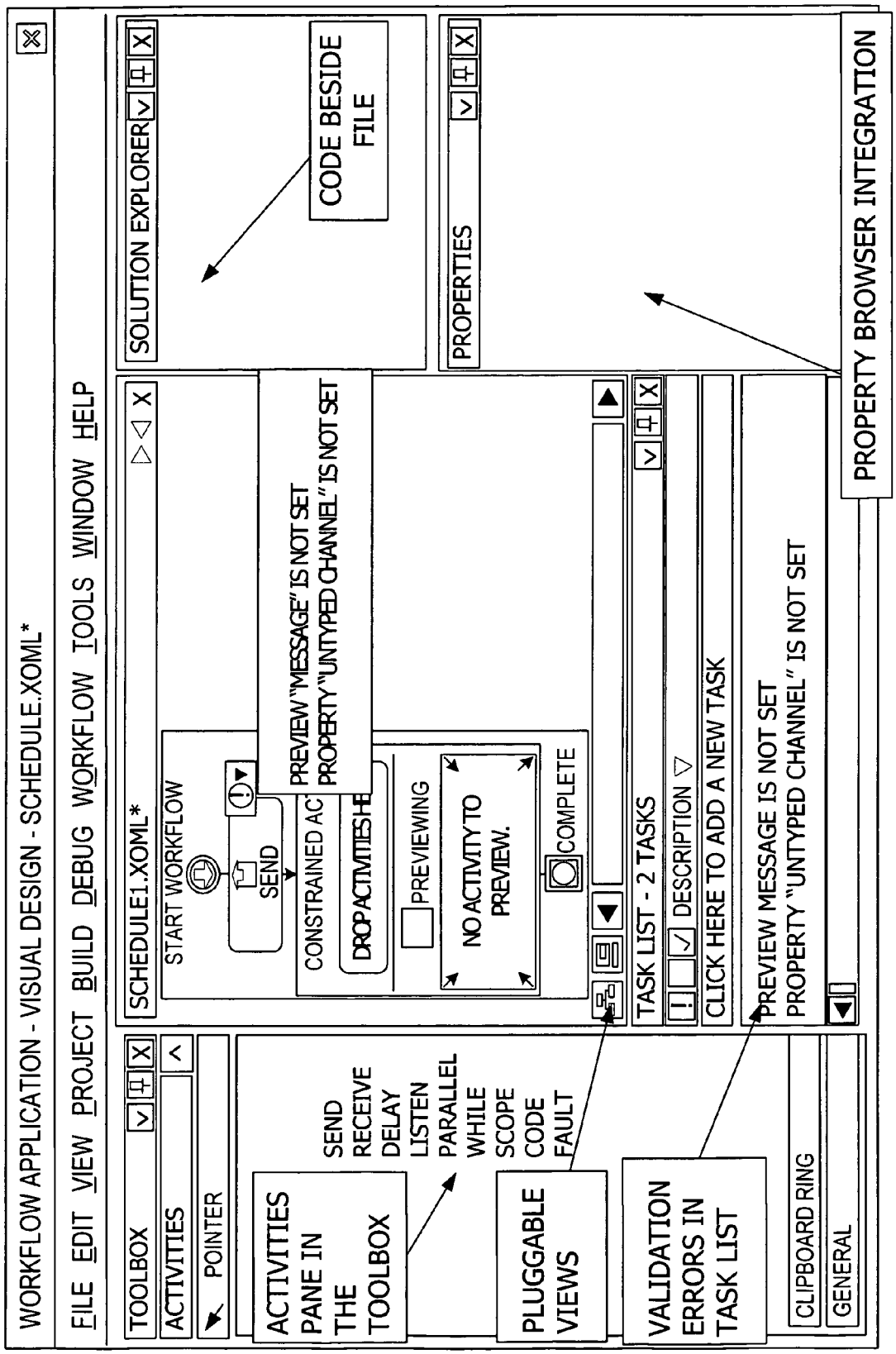
FIG. 6 illustrates an exemplary workflow designer.

Using the designer framework of the invention, the orchestration engine of the invention includes a rapid application development (RAD) style visual workflow designer with support for associating software code with the workflow model in a visual way. Each activity in the workflow has an associated activity designer. Each activity designer is written in terms of framework services. The framework of the invention also contains a visual designer model. The visual designer model includes a set of activity designers linked with one another via relationships described in the workflow model. FIG. 6 illustrates an exemplary workflow designer. The invention includes various modes of associating code with the workflow model including "Code-Beside", "Code-Within" and "Code-Only" which enables round-tripping of the user code to the workflow model in real time. The invention also provides real-time semantic errors while the user is building the workflow.

In one embodiment, the invention presents the user with a package identifying a plurality of activities in the designer framework user interface. The invention further receives from the user a selection and hierarchical organization of the presented activities. The invention serializes the received activities to create a persistent representation of the workflow. The invention further receives from the user software code representing business logic for association with one of the plurality of activities in the workflow. The invention may also receive a user-defined activity having one or more semantics associated therewith. The invention includes a semantic checker or validator for evaluating the semantics for conformance to a predefined interface requirement. If the semantics conform to the predefined interface requirement, the invention presents the user-defined activity as one of the plurality of activities. The invention further compiles the software code to create one or more binary files. For example, the invention compiles the serialized workflow representation and software code into a single assembly containing an executable representation of the workflow. The invention executes the created workflow. In one embodiment, one or more computer-readable media have computer-executable instructions for performing the method.

The orchestration engine designer allows the user to recursively compose higher order schedules by using other created schedule and using them. The inline expansion of schedules allows the user to view the schedule contents inline and cut or copy the contents. To enable the inline expansion of the schedule and to make the schedule read only, a separate design surface and designer host for the inline schedule is created. Further, the composite schedule designer has its own hierarchy. The invoked schedule is loaded and displayed when the designer is expanded by the user. In one embodiment, the designer is collapsed when the activity is dropped or copied on the design surface. A property chains the calling activity designer with the root designer of the hosted schedule. The following functions prevent the adding and removing of activities from the designer.

internal static bool AreAllComponentsInWritableContext (ICollection components)
    internal static bool IsContextReadOnly(IServiceProvider serviceProvider)

These functions are called by the infrastructure to check if the context in which the activities are being inserted is writable. For the hosted designer these functions return false. In addition, properties are prevented from being modified. Other functions fetch the activity designers from the appropriate components:

internal static ServiceDesigner GetSafeRootDesigner(IServiceProvider serviceprovider)
    internal static ICompositeActivityDesigner GetSafeParentDesigner(object obj)
    internal static IActivityDesigner GetSafeDesigner(object obj)

In one example, a user creates a schedule and compiles it as activity. On successful compilation, the schedule appears on the toolbox. The user opens or creates the schedule in which use of the compiled schedule is desired. The user drags and drops the compiled schedule from the toolbox. A collapsed schedule designer is shown on the design surface. When the user wants to view the contents of the compiled schedule which was dropped, the user expands the schedule designer to show the contents of the invoked schedule inline in a read only state. The inlining of the called schedule enables the user to view the invoked schedule without switching between different schedule designers. The feature is useful to developers composing higher order schedules by reusing existing schedules.

Support for Customization of the Designer Framework Using Themes/Skins

A workflow designer written using the designer framework may be customized using workflow themes. These may be extensible markup language (XML) files which declaratively describe various aspects of the designer. The workflow designer provides wizard support for partners to extend activities. Exemplary user interface features supported by the workflow designer include, but are not limited to, undo/redo, drag/drop, cut/copy/paste, zoom, pan, search/replace, bookmarks, adornments, smart tags for validation errors, valid drop-target indicators for activities, auto layout, view pagination, navigation markers, drag indicators, print and preview with headers/footers, and document outline integration. The workflow designer supports custom designer themes/skins to enable customizing the look and feel of the designer using XML metadata. The workflow designer supports background compilation. In one example, smart tags and smart actions are provided for validation errors while designing the schedule. The workflow designer may be hosted in any container (e.g., application programs, shells, etc.).

Figure 7:
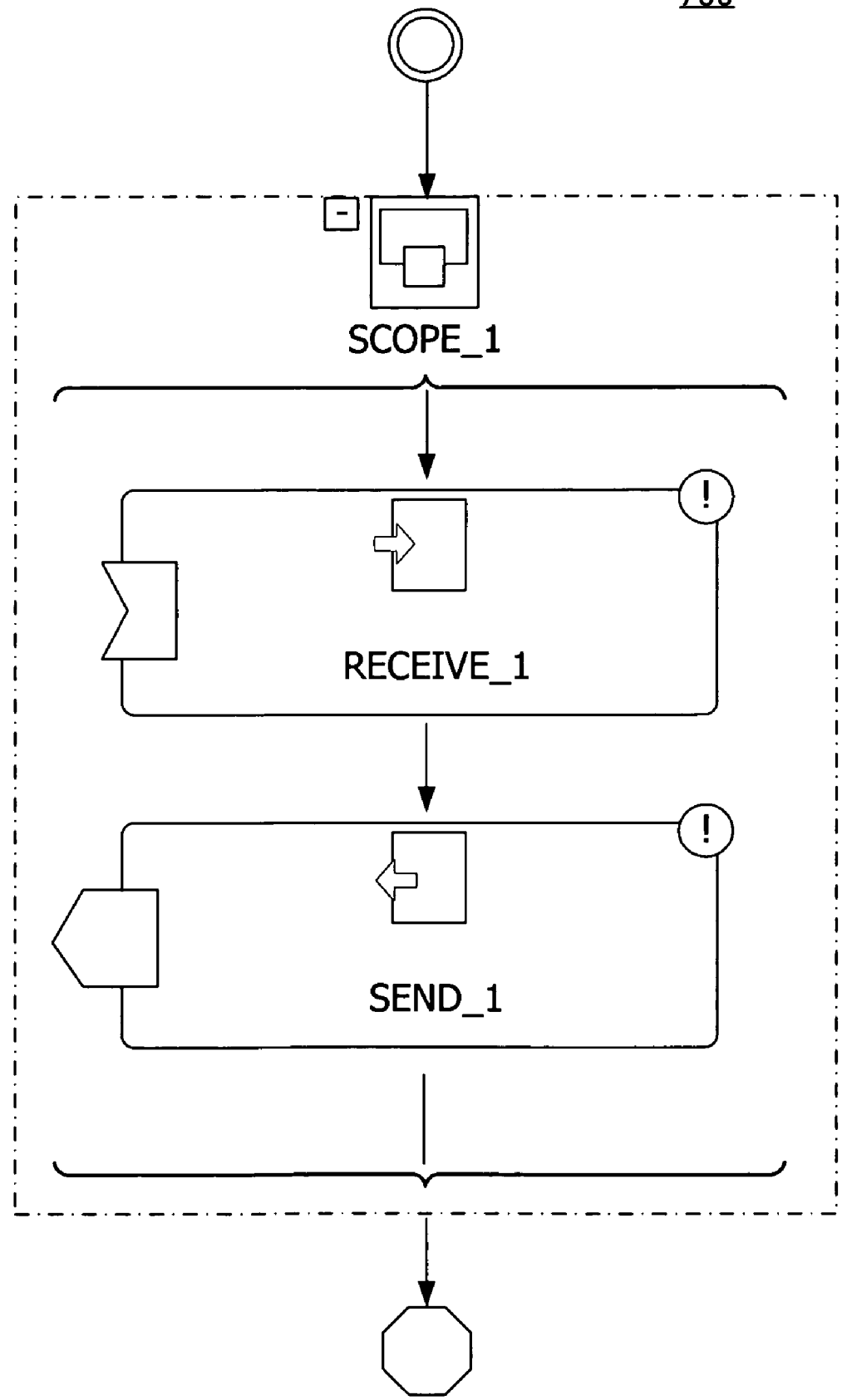
FIG. 7 illustrates an orchestration program including a receive activity followed by a send activity.

An exemplary orchestration engine program includes a receive activity followed by a send activity. The process receives a message and sends it out. The user creates a project called "Hello World" and adds an orchestration item to the project. The user then drags and drops a scope activity onto the design surface. Next, the user drops a receive activity followed by a send activity onto the scope. FIG. 7 illustrates the resultant workflow 700 in the designer. Each activity designer provides a user interface representation on an object model. Developers are able to directly program the object model and set properties on activities or use the designer. The orchestration engine designer allows a developer to select an activity from the toolbox and drag it onto the designer surface. If the activity has already been placed into a schedule and needs to be moved, the developer is able to select it (by clicking on it) and drag it to the area of the schedule where it needs to go. If a developer hold the control key while dragging and dropping, a copy of the selected activities selected are made.

Active placement provides possible drop points (targets) as visual indicators on the design surface. Auto scrolling also participates within the context of drag and drop. When dealing with large schedules, navigation to areas of the designer currently not in the view port are accessible by dragging the activity towards the area of the schedule to be placed.

Drag and drop is supported across schedules in the same project and across schedules in other projects in the same solution. After an activity has been placed onto the design surface, the developer configures the activity. Each activity has a set of properties that a developer configures in order for the schedule to be valid. These properties are editable in the property browser. Every activity controls what properties are viewable in the property browser. To aide the developer in configuring various activities, the designer provides a variety of dialogs or "sub-designers". Each of the dialogs is invoked for various properties of activities.

The orchestration engine is able to customize the activities presented in the toolbox. When a developer creates a custom activity or schedule, the end result is an assembly. Using a dialog, a developer is able to browse to the assembly location and select the assembly to make it appear as an orchestration engine activity. Alternatively, a developer may place the assembly in the orchestration engine installation path and it will be present as an orchestration engine activity.

Application Programming Interfaces (APIs)

In another embodiment, the invention provides application programming interfaces (APIs) for performing various workflow operations. The invention includes a design application programming interface for authoring the workflow. The design application programming interface comprises means for authoring a workflow and means for selecting one or more of the activities to create the workflow. The invention also includes a compilation application programming interface for compiling the workflow authored via the design application programming interface. The compilation application programming interface comprises means for serializing the workflow, means for customizing a visual appearance of the workflow, means for compiling the workflow authored via the design application programming interface, means for validating the workflow.

The invention also includes a type provider application programming interface for associating a type with each of the activities in the workflow. The type provider application programming interface comprises means for associating the type with each of the activities in the workflow and means for associating a type with each of the activities in the workflow.

Appendix D describes exemplary APIs. The APIs in Appendix D constitute exemplary means for authoring the workflow, exemplary means for selecting one or more of the activities to create the workflow, exemplary means for serializing the workflow, exemplary means for customizing a visual appearance of the workflow, exemplary means for validating the workflow, exemplary means for compiling the workflow, and exemplary means for associating a type with each of the activities in the workflow.

Activity Execution Framework

With the exception of schedule and scope, the engine views activities as abstract entities and simply coordinates the execution of activities without knowing the specific data or semantics of any particular activity. In one embodiment, four entities interact during the execution of an activity: the activity itself, a parent activity of the activity that is executing, the scope enclosing the activity that is executing, and the orchestration engine. Each entity has a different function.

If the execute method of an activity returns without having signaled completion to its activity coordinator, the activity is said to be in a logical waiting state. Such an activity may be cancelled by the orchestration engine, or continued (e.g., once the item or event on which it is waiting becomes available or occurs, and the activity is notified of this by the engine).

Some activities which never enter the logical waiting state may never be cancelled. Examples include the send activity and the code activity since they execute without any demands on external events or subscriptions. Once handed a thread (i.e. once their execute method is called by the orchestration engine), these activities will do work until done. The orchestration engine is never given an opportunity to cancel them since they do not return the thread until they signal completion.

The orchestration engine runtime uses rules to trigger events on which orchestration engine activities are executed. The orchestration engine designer provides the user ability to associated rules to be evaluated at runtime to trigger events. The orchestration engine designer enables the user to use different types of rules technology by providing extensibility architecture. The designer is agnostic to the type of rules technology used.

In one embodiment, the designer supports Boolean expression handlers as a way to associate a rule with an activity. This means that in the user code file; the user writes a method which returns a true or false value; based on which the rule is triggered. Currently there are multiple technologies which may also be used to evaluate rules including Info Agent and Business Rules Engine (BRE). To achieve this, the designer includes an extensibility architecture which enables the rule technology developers to host custom user interfaces in the designer. The designer provides a way to the custom user interface writers to serialize the rules in the form of code statement collection. The designer emits a Boolean handler in user code file with the code statement collections inserted into it. The orchestration engine includes a default user interface which may also be used by the rule writers. A rule technology provider add rules to the orchestration engine designer by creating a custom rule declaration, writing a user interface type editor associated with the custom rule declaration, creating a custom user interface to host the rules user interface, and generating code statements on save.

In one example, a user selects the activity designer with which rule needs to be attached, locates the rule property in the property browser and selects the "RuleExpressionHandler" in the drop down (which makes the "Statements" property to appear underneath the Rule Property in the user interface), specifies the user code method name in the "Statements" property, invokes a user interface type editor to invoke a dialog which will host rules specific user interface, and defines rules in the dialog by creating new predicate rows and grouping them together. The user interface emits a method in the user code file. The method name will be same as the one specified by the user in the property browser. The code statements equivalent to creating the rule will be inserted in the user code method for rule.

Messaging During Execution

In a running workflow, messages sent to a schedule are intended for a specific schedule instance. For example, an invoice for purchase order #123 must be sent back to the same schedule instance that originated (e.g., sent out) that purchase order. To match an inbound message with the appropriate schedule instance, the message and the schedule instance share a correlation set. The correlation set may be a single-valued correlation set in which means an identifier field in the message is matched against an identifier of the same type that is held by schedule instances. Multi-property correlation sets are also possible and analogous to multi-column primary keys in a database table.

The correlation set value held by a schedule instance is initialized when the schedule instance sends out a message (e.g., the value may be taken from an identifier field of an outbound purchase order) or receives a message. This correlation set value is then a part of that schedule instance's state. When a subsequent inbound message arrives, the correlation set value held in the schedule instance state is matched against the identifier held by an inbound message of the expected type. When a match is found, the correlation set is satisfied and the message is delivered to the schedule instance.

Although the implementation of correlation sets is a function of the orchestration engine and host environment, the user in one embodiment declares the correlation sets to make the schedule instance work correctly. In another embodiment, some activities (e.g., SendRequest/ReceiveResponse activities and ReceiveRequest/SendResponse activities) set up the correlation sets independent of the user. A wide range of validation checks are performed by the send and receive activities to ensure that correlation sets are initialized and followed properly.

Dynamic Editing of Executing Workflows

The orchestration engine provides a framework for authoring (and subsequently visualizing and executing) various types of workflows. Examples include event-condition-action (ECA) style workflows or structured flows or rules driven flows. Further, regardless of the way the workflow was modeled, the framework allows the users to author or edit workflows in the same manner at design time or even when the workflow process is running without the need for recompiling the workflow process. The framework allows the user to roundtrip between the runtime and the design time representation with hi-fidelity. Ad hoc changes are the changes made at run time to the process model. A user may ask a running instance for its schedule model and make changes to the model. For example, the user may add, remove, or replace activities in a batch, then commit or rollback the batched changes. In one embodiment, the model is validated after the updates. In many workflow scenarios of the invention, there is a blurring of, or even an elimination of, the separation between "design-time authoring" and "runtime execution."

A schedule instance effectively shares with other instances the activity type (metadata) tree defined for those instances' schedule type. But any schedule instance, once it begins executing, may be changed on the fly via the addition of new activities or the manipulation of declarative rules. It is possible to take such a modified schedule instance and "save as" as a new schedule type or more generally, to simply recover the serialized representation from the instance. That is, a running schedule instance may be serialized and then brought into any designer (e.g., authoring environment) or runtime visualization tool.

Further, it is possible for an advanced developer to author a schedule entirely as software code. To author a schedule type directly, the developer simply includes a static method called InitializeScheduleModel in the software code in the code-beside class for the schedule and marks this method with a [ScheduleCreator] attribute. In one embodiment, the static method takes no parameters and returns a Schedule object. There is no companion serialized file, though the serialized representation of the schedule may be recovered from the Schedule object that is created. Although this means that a schedule may be developed using a single software code file, validation checks may not be performed on the file. The orchestration engine compilation ensures the structural and semantic validity of the activity tree that underlies the schedule type. In another embodiment, compilation and validation run internally to produce the actual type that is executed, but no code input is required. Schedule type compilation becomes a very light process since there is no translation from a compile-time object model to a runtime object model. In essence, compilation simply combines the object model representation of a schedule with code-beside to produce a new type. In one embodiment, there may be no fundamental need to provide any code-beside at all for a particular schedule if the compiled code-beside matches what is demanded by the activities in the object model or code-beside may already exist in compiled form (an assembly).

When compiling a serialized schedule, it is possible to point to an existing compiled type that effectively serves as the code-beside for the schedule. A derivative of this compiled type is created and this new type serves as the code-beside to ensure that a unique type is created to represent the new schedule.

Serialization Architecture

Figure 8:
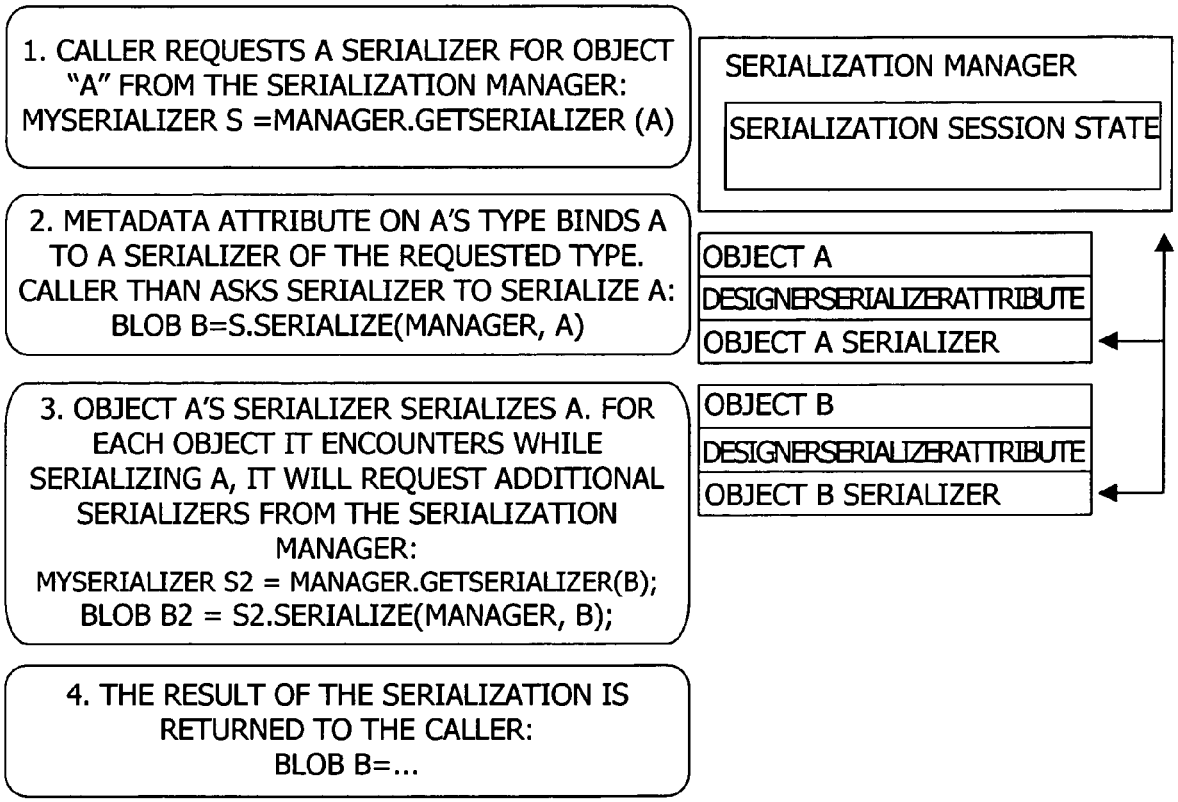
FIG. 8 illustrates the serialization of objects in a graph.

The serialization infrastructure provides a modular, format neutral and easily extensible mechanism to serialize the orchestration engine activity tree. FIG. 8 illustrates the serialization of objects in a graph.

In particular, a caller (e.g., an application program or a user) requests a serializer for an object (or activity) A from the serialization manager. The metadata attribute of object A's type binds object A to a serializer of the requested type. The caller then asks the serializer to serialize object A. Object A's serializer then serializes object A. For each object encountered while serializing, the serializer requests additional serializers from the serialization manager. The result of the serialization is returned to the caller.

Every activity in the orchestration engine component model may participate in serialization. The serializer component is not a part of activity class itself in one embodiment. Instead, the component is specified by annotating a serializer attribute in a class associated with the activity. The serializer attribute points to a class which is used to serialize objects of that activity type. In another embodiment, provider components for an activity type override the default serializer provided by the activity.

Designer serialization is based upon metadata, serializers, and a serialization manager. Metadata attributes are used to relate a type with a serializer. A "bootstrapping" attribute may be used to install an object that provides serializers for types that do not have them. A serializer is an object that knows how to serialize a particular type or a range of types. There is a base class for each data format. For example, there may be an XmlSerializer base class that knows how to convert an object into XML. The invention is a general architecture that is independent of any specific serialization format. The serialization manager is an object that provides an information store for all the various serializers that are used to serialize an object graph. For example, a graph of fifty objects may have fifty different serializers that all generate their own output. The serialization manager may be used by these serializers to communicate with each other when necessary.

In one embodiment, the use of serialization providers coupled with serializers that use generic object metadata provide a callback mechanism where an object is given the opportunity to provide a serializer for a given type. A serialization manager may be given a serialization provider through a method such as AddSerializationProvider. A serialization provider may be automatically added to a serialization manager by adding an attribute such as DefaultSerializationProviderAttribute to the serializer.

In one embodiment, the format is dictated by the following rules: an object is serialized as an xml element, a property of an object is categorized as simple property (e.g., serialized as an xml attribute) or complex property (serialized as child element), and a child object of an object is serialized as child element. The definition of a child object may differ from an object to another object. The example below is the serialization of a while activity, which has a Send activity as one of its child objects.

```
<While ID="while1">
    <ConditionRule>
        <CodeExpressionRuleDeclaration>
            <Expression Name="whileCondition" />
        </CodeExpressionRuleDeclaration>
    </ConditionRule>
    <Send HasTypedChannel="True" ID="send1">
        <Message Name="msg1" Type="System.UInt32" />
        <OnBeforeSend Name="onBeforeSend1" />
        <TypedChannel Type="System.Collections.IList" Operation="AddIndex" Name="Foo" />
    </Send>
</While>
```

In an embodiment in which the language used for serialization is XOML, each XOML element is serialized to its respective object when the schedule is compiled. Objects include both simple and complex types. The mapping between the XOML representation of each activity and its mapping to the authoring object model is next described. Serialization of XOML varies between Primitive and Composite activities.

Simple types for primitive activities are serialized as attributes on the activity type. Complex types for primitive activities are serialized as child elements. As an example, here is the XOML representation of a Send activity.

```
<Send ID="send1" HasTypedChannel="False">
    <Message Name="message1" Type="System.String" />
    <UntypedChannel Name="c1" />
</Send>
```

In a similar manner to primitive type serialization, simple types for composite activities are serialized as attributes on the activity type. However, by definition, composite activities encapsulate nested activities. Each nested activity is serialized as another child element. As an example, here is the XOML representation of a While activity.

```
<While ID="while1">
    <ConditionRule>
        <CodeExpressionRule>
            <Expression Name="test" />
        </CodeExpressionRule>
    </ConditionRule>
</While>
```

Figure 9:
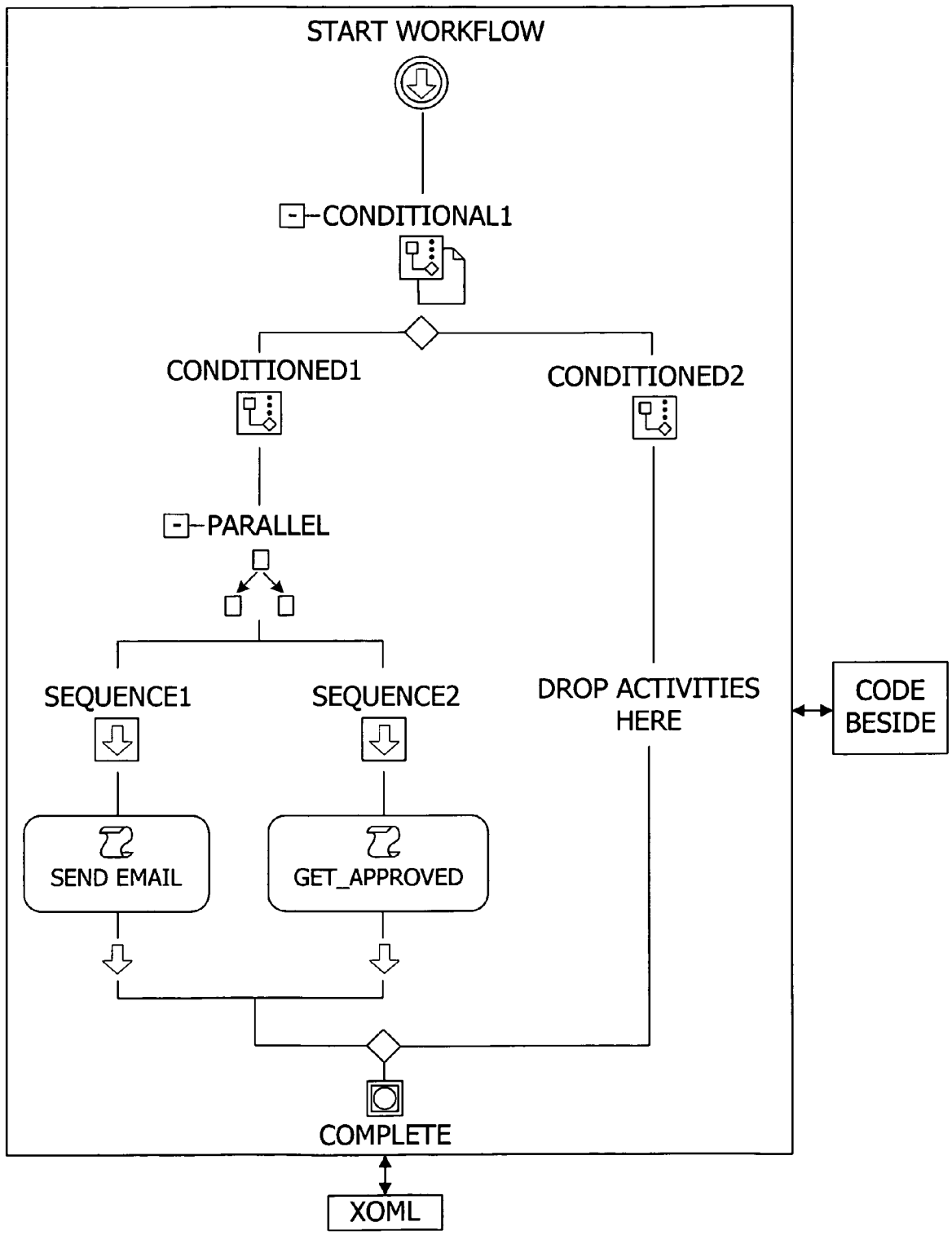
FIG. 9 illustrates a schedule definition and the relationship between a visual workflow, a serialized representation in XOML of the workflow, and the code beside of the workflow.

A strong relationship between the process/workflow view and the serialized representation exists. FIG. 9 illustrates a schedule definition and the relationship between a visual workflow, a serialized (e.g., XOML) representation of the workflow, and the code beside of the workflow. When authoring in either representation, the other will incur changes. Thus, modifying the XOML for an activity (or its constituent parts in cases of composite activities) is directly reflected in the process/workflow view when a developer switches between the two. The converse is also applicable. Modifying the activity in the process/workflow view results in the appropriate modification within XOML. As an example, the deletion of an activity in the process/workflow view results in the removal of the XML element in XOML for the same activity. Round tripping also occurs between the process/workflow view and the code beside.

During creation of the XOML code, if the XOML definition does not conform to a pre-defined interface requirement, the offending XML element is underscored or otherwise visually identified to the developer. If the developer switches to the process view, they will be alerted that there is an error within the XOML and the designer provide a link where the developer may click and will be navigated to the offending element. This same error appears in the task pane and upon doubling clicking on the error, the developer will be navigated to the offending element in the XOML.

Creating the Activity Tree from a XOML File (Deserialization)

In one embodiment, a CreateEditorInstance( ) function creates a DesignSurface object and then calls a BeginLoad( ) function onto the DesignSurface object passing the actual loader object into it, which eventually ends up in a BeginLoad( ) call to a DesignerLoader( ) function. A PerformLoad( ) function reads the text buffer object and deserializes it to the orchestration engine component model hierarchy. The invention walks through the hierarchy and inserts the activities into the design surface to load the components in the visual studio.

The invention also listens to changes to the XOML file to track the hierarchy and item identification changes to update the values in the visual studio cache. A secondary document data list includes a list of secondary documents, invisible to the user, on which orchestration engine designer works. For example, it is possible that user has not opened the code beside file, but when the user makes changes in the orchestration engine designer, the changes are made to the code beside file. As this file is not visible to the user, the file is maintained as a secondary document. Whenever the XOML file is saved, the secondary documents are automatically saved. If the name of one of these files changes or if the file is deleted, the invention updates the corresponding secondary document objects accordingly.

Exemplary deserialization guidelines for an object tree are as follows. An xml element is first treated as a property of parent object. If the parent object does not have a property with the element's tag name then the element is treated as a child object of the parent object. An xml attribute is treated as simple property on the parent object.

In an exemplary deserialization using the serialized code above, a <While> element is treated as an object created using the xml namespace information. A <ConditionRule> element is treated as a property of the While activity. The <CodeExpressionRuleDeclaration> element is treated an as object whose value will be applied to the ConditionRule property. The <Send> element is first tried as a property of the While activity, but the 'While' activity does not have a property with the name 'Send', so the <Send> element is treated as an object and added as the children activity of the while activity. The <Message> element is treated as a property of the Send activity. Because the Message property on Send is read only, the contents of Message element are considered as the contents of Message object. A similar rule applies to the deserialization of <OnBeforeSend> and <TypedChannel> elements.

Under the following conditions, XOML de-serialization will critically fail: the XOML code is not well formed, the XomlDocument is not the first element in the XOML code, and the first activity in the XOML code cannot be de-serialized. The developer will be presented with error message with which they may navigate to the offending XML element when switching from XOML view to process/workflow view.

Hosting the Orchestration Engine Designer

The designer framework may be hosted in any application program. This is a very useful feature for third party applications to render workflow in their respective environments. It also will allow third parties to develop tools around the orchestration engine designer by rehosting and customizing the design surface. The framework of the invention expects the hosting container application to provide a set of services such as editors and/or text buffers.

One step in rehosting the designer is to create a loader and a design surface. The loader is responsible for loading a XOML file and constructing the designer host infrastructure which maintains the activities. The design surface maintains the designer host infrastructure within it and provides services to host and interact with the design surface. The design surface acts as a service container as well as a service provider. In one example, the following code is executed to load a XOML document and construct a designer host which maintains the activities in it.

```
this.loader.XomlFile = filePath;
if (this.surface.IsLoaded == false)
    this.surface.BeginLoad(this.loader);
```

The following services enable different functions in the designer. An ISelectionService function maintains the selected objects. An IToolboxService function manages interaction with the toolbox. An IMenuCommandService function manages interaction with the menu. An ITypeProvider function enables the type system. In addition, there may be additional services provided by the designer hosting environment to enable advanced designer features.

The type system is a component in the component model framework of the invention. When a designer is hosted inside a project system, a TypeProvider object is created on a per project basis. Assembly references in the project are pushed to the type provider. Further, the user code files in the project are parsed and a single code compile unit is created and pushed to the type provider. In addition, the invention listens to the events in the project system which may cause the types to be changed in the type system and makes appropriate calls to the type provider to re-load types in response to the changes.

Undo/Redo

After creating and correctly constructing a schedule, a developer may wish to rollback a series of performed operations. Undo and redo functions of the invention provide visual feedback illustrating which activity has been directly affected. For example, when a property change on an activity is undone, the activity which was affected becomes selected. When the deletion of multiple objects is undone, all the objects involved become selected when they are restored to the schedule. Undo/Redo is a common feature used throughout many applications in other fields and its meaning is well understood. In the orchestration engine designer, undo/redo items are not purged on Save. Further, undo/redo may be performed in the process/workflow view, XOML view, when a developer switches between views, and in the code beside.

Undo/Redo is provided for the following actions in the process/workflow view: activity drag and drop (e.g., dragging an activity from the toolbox to the design surface, moving an activity from one part of the schedule to another, and moving an activity from one designer to another), configuration of an activity (e.g., specifying properties for an activity), and cut/copy/paste/delete.

In one embodiment, the serialized view (e.g., XOML view) is an XML editor which provides the standard undo/redo operations of a text editor. The designer of the invention provides feedback to the developer indicating that changes made in the process/workflow view and then undone in serialized view will result in the loss of serialized code. When the developer constructs a portion of the schedule in the process/workflow view, switches to the serialized view and then decides to perform an undo/redo operation, a warning will appear.

Exemplary Operating Environment

Figure 10:
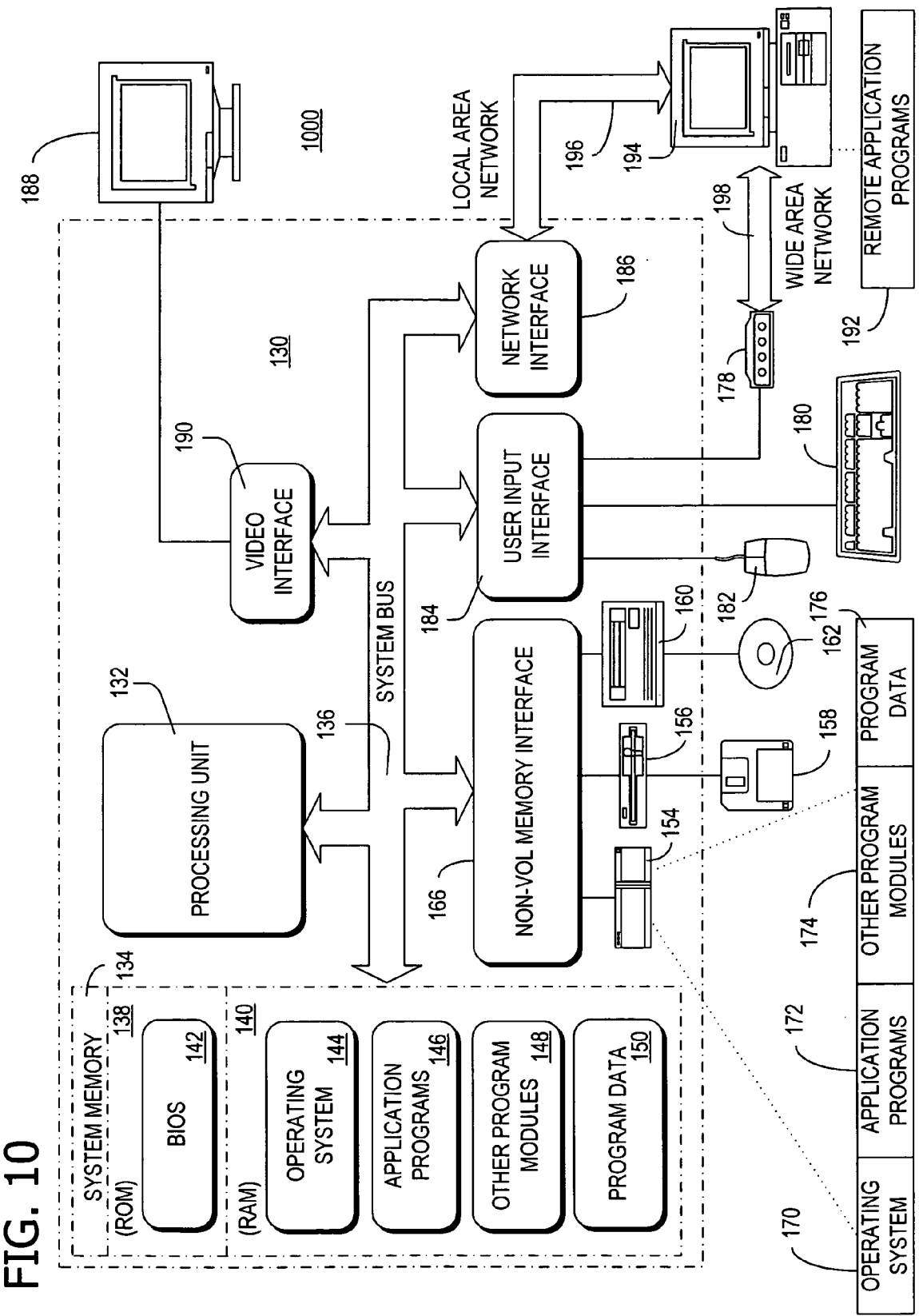
FIG. 10 is a block diagram illustrating one example of a suitable computing system environment in which the invention may be implemented.

FIG. 10 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 10 illustrates operating system 144, application programs 146, other program modules 148, and program data 150.

The computer 130 may also include other removable/non-removable, volatile/nonvolatile computer storage media. For example, FIG. 10 illustrates a hard disk drive 154 that reads from or writes to non-removable, nonvolatile magnetic media. FIG. 10 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 10, provide storage of computer readable instructions, data structures, program modules and other data for the computer 130. In FIG. 10, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 10 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 10 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

APPENDIX A

Exemplary Activities and Exemplary Implementation Thereof

Exemplary activities include the following: Send, SendRequest, SendResponse, Receive, ReceiveRequest, ReceiveResponse, Code, Delay, Fault, Suspend, Terminate, InvokeSchedule, InvokeSchedules, InvokeWebService, DotNetEventSource, DotNetEventSink, Sequence, Parallel, While, ConditionalBranch, Conditional, Constrained, ConstrainedActivityGroup (CAG), EventDriven, Listen, EventHandlers, ExceptionHandler, ExceptionHandlers, Compensate, CompensationHandler, Scope, and Schedule.

The activity classes listed above rely upon a set of supporting types for their metadata declarations. These types include: DataElement, LiteralElement, MemberDeclaration, VariableDeclaration, TypedVariableDeclaration, MessageDeclaration, CorrelationSetDeclaration, ChannelDeclaration, TypedChannelDeclaration, HandlerDeclaration, TypedHandlerDeclaration, RuleDeclaration, CodeExpressionRuleDeclaration, DeclarativeExpressionRuleDeclaration, ParameterDeclaration, ParameterDeclarationCollection, ParameterBinding, and ParameterBindingCollection.

Additionally, there are a set of standard delegate types defined that map to the types of the code-beside methods that certain activities require as metadata. In addition, there are a set of utility classes that support serialization [XomlSerializer and related types] and compilation [XomlCompiler and related types] of schedules. There is a utility wfc.exe (e.g., "workflow compiler"), that is a command line tool for compiling schedules.

Send Activities

The orchestration engine provides three activities for sending messages, each of which addresses a different use case. Additionally, because the three activities share some metadata, an abstract base class is defined and used as the superclass of all three.

SendBase

Metadata:
  A message reference.
  An optional code-beside method.
  An optional collection of correlation sets.

Send

Metadata:
  A message reference.
  An optional code-beside method.
  An optional collection of correlation sets.
  An outbound channel reference, which may be untyped or typed. If the channel is typed, an operation is also specified on the channel declaration.

Execution:
  A Send activity sends the specified message on the specified channel. If a typed channel is used, the Send activity utilizes a specific operation. This operation must be defined to return void. An untyped channel accepts messages of any type. Before the message is sent, an optional code-beside handler is invoked. The normal usage of this handler is to initialize or otherwise prepare the message that is about to be sent. The Send activity also initializes any correlation sets that have been specified. Send activities do not follow correlation sets. Send executes in a synchronous manner (it does not yield its thread until it is complete).

SendRequest

Purpose: Send a request message as part of a request-response message pattern.

Metadata:
  A message reference.
  An optional code-beside method.
  An optional collection of correlation sets.
  An outbound channel reference, which may be untyped or typed. If the channel is typed, an operation is also specified.

Execution:
  A SendRequest activity sends the specified message on the specified channel. If a typed channel is used, the Send activity utilizes a specific operation. This operation must be defined to return a type other than void (Note: this is how SendRequest differs from Send). An untyped channel accepts messages of any type. Before the message is sent, an optional code-beside handler is invoked. The normal usage of this handler is to initialize or otherwise prepare the message that is about to be sent. The SendRequest activity also initializes any correlation sets that have been specified. In a simple schedule that only contains a SendRequest/ReceiveResponse pair and no other receive activities, no correlation sets need to be explicitly created or initialized; correlation of request and response messages will be performed automatically. Send activities do not follow correlation sets.
  SendRequest executes in a synchronous manner (it does not yield its thread until it is complete).

SendResponse

Purpose: Send a response message as part of a request-response message pattern.

Metadata:
  A message reference.
  An optional code-beside method.
  An optional collection of correlation sets.
  The ID of a ReceiveRequest activity.

Execution:
  A SendResponse activity sends the specified message on the channel that is declared on the associated ReceiveRequest activity. If a typed channel is used, the SendResponse activity utilizes the operation indicated by the ReceiveRequest activity. This operation must be defined to return a type other than void. An untyped channel accepts messages of any type. Before the message is sent, an optional code-beside handler is invoked. The normal usage of this handler is to initialize or otherwise prepare the message that is about to be sent. The SendResponse activity also initializes any correlation sets that have been specified. Send activities do not follow correlation sets. SendResponse executes in a synchronous manner (it does not yield its thread until it is complete).

Receive Activities

The orchestration engine provides three activities for receiving messages, each of which addresses a different use case. Additionally, because the three activities share some metadata, an abstract base class is defined and used as the superclass of all three.

ReceiveBase

Purpose: Abstract base class for receive activities.

Metadata:
  A message reference.
  An optional code-beside method.
  An optional collection of correlation sets.

Receive

Purpose: Receive a message.

Metadata:
  A message reference.
  An optional code-beside method.
  An optional collection of correlation sets.
  A Boolean indicating whether this is an activating receive.
  An inbound channel reference, which may be untyped or typed. If the channel is typed, an operation is also specified.

Execution:
  A Receive activity performs a blocking wait for the arrival of a message on the specified channel. If a typed channel is used, the Receive awaits the arrival of a message of a specific type on a specific operation of the channel. This operation must be defined to return void. An untyped channel delivers messages of any type. If the Receive is an activating receive, a special subscription will be configured so that the arrival of a message on the indicated channel will cause a new instance of the schedule of which the Receive is part to be created and executed. Correlation sets to be followed by the Receive are used in the message subscription that is set up on the channel. This ensures that a schedule instance receives only those messages that are intended for that instance. After receiving the message, the Receive activity initializes any correlation sets that have been specified as requiring initialization. Then, an optional code-beside handler is invoked. The normal usage of this handler is to process the message in some manner.

ReceiveRequest

Purpose: Receive a request message as part of a request-response message pattern.

Metadata:
  A message reference.
  An optional code-beside method.
  An optional collection of correlation sets.

A Boolean indicating whether this is an activating receive.

An inbound channel reference, which may be untyped or typed. If the channel is typed, an operation is also specified.

Execution:

A ReceiveRequest activity performs a blocking wait for the arrival of a message on the specified channel. If a typed channel is used, the ReceiveRequest awaits the arrival of a message of a specific type on a specific operation of the channel. This operation must be defined to return a type other than void (this is how ReceiveRequest differs from Receive). An untyped channel delivers messages of any type. If the ReceiveRequest is an activating receive, a special subscription will be configured so that the arrival of a message on the indicated channel will cause a new instance of the schedule of which the ReceiveRequest is part to be created and executed. Correlation sets to be followed by the ReceiveRequest are used in the message subscription that is set up on the channel. This ensures that a schedule instance receives only those messages that are intended for that instance. After receiving the message, the ReceiveRequest activity initializes any correlation sets that have been specified as requiring initialization. Then, an optional code-beside handler is invoked. The normal usage of this handler is to process the message in some manner. In a simple schedule that only contains a ReceiveRequest/SendResponse pair and no other receive activities, no correlation sets need to be explicitly created or initialized; correlation of request and response messages will be performed automatically.

ReceiveResponse

Purpose: Receive a response message as part of a request-response message pattern.

Metadata:
A message reference.
An optional code-beside method.
An optional collection of correlation sets.
The ID of a SendRequest activity.

Execution:

A ReceiveResponse activity performs a blocking wait for the arrival of a message on the channel specified on the associated SendRequest activity. If a typed channel is used, the ReceiveResponse activity utilizes the operation indicated by the SendRequest activity. This operation must be defined to return a type other than void. An untyped channel delivers messages of any type. ReceiveResponse activities do not follow correlation sets. After the message is received, an optional code-beside handler is invoked. The normal usage of this handler is to process the message that has been received. After receiving the message, the ReceiveResponse activity initializes any correlation sets that have been specified as requiring initialization. Then, an optional code-beside handler is invoked. The normal usage of this handler is to process the message in some manner.

Code

Purpose: Execute a method implemented in code-beside.

Metadata:
A code-beside method.

Execution:

The Code activity executes the code-beside method indicated in the metadata. Code executes in a synchronous manner (it does not yield its thread until it is complete). Thus, the execution of the code-beside method is expected to be performed and should not block with a dependency on some external resource. For example, this code should typically not invoke a web service. The normal use of the Code activity is to inspect schedule instance state and manipulate local variables and messages.

Delay

Purpose: Wait until a specific DateTime in the future is reached.

Metadata:
A code-beside method that returns a DateTime.

Instance Data:
The DateTime value that the Delay is waiting (or has waited) until. This value is reported as null until the Delay actually begins executing.

Execution:

The Delay activity executes its mandatory code-beside method to generate a DateTime value. It internally sets the TimeoutValue property on its instance data to this value. If the DateTime is in the past, the Delay completes immediately. Otherwise, it sets up a timer subscription so that the Delay will be notified when the timer fires. When the timer fires, the Delay is notified and it completes. Like a receive activity, Delay does not complete its execution synchronously; instead, it yields its thread and awaits notification that the DateTime has been reached. Based on the characteristics of the underlying timer service surfaced by the engine, the Delay activity is guaranteed to complete no sooner than the indicated DateTime; but, it may in fact take longer since the timer notification may occur some time after the DateTime is reached (for example, due to high system stress in a server environment). Note that a UTC time must be returned in order for the Delay to work as expected; for many cases, this means using DateTime.UtcNow instead of DateTime.Now in the code handler that returns the DateTime value.

Fault

Purpose: Throw an exception.

Metadata:
A code-beside method that returns an Exception.

Execution:

The Fault activity executes its mandatory code-beside method to generate an Exception object. It then throws this exception. Functionally, the Fault activity is equivalent to a Code activity whose code beside method simply throws the exception that is created by the ExceptionProvider. The purpose of Fault is to capture the throwing of business exceptions as part of the process metadata for a schedule. Due to the fact that it throws an exception, the Fault activity will have a reported Outcome of Faulted, despite the fact that this constitutes normal execution of this activity.

Suspend

Purpose: Suspend the running schedule instance.

Metadata:
An error message to report to administrators.

Execution:

The Suspend activity suspends the current schedule instance. What this means is that the engine immediately stops handing the thread to any items queued up for the instance that has been suspended; no 'Cancel' signal occurs. The host (e.g., instance manager and persistence provider) decides where the error message goes.

Terminate

Purpose: Terminate the running schedule instance.

Metadata:

An error message to report to administrators.

Execution:

The Terminate activity terminates the current schedule instance. What this means is that, as with Suspend, the engine immediately stops handing the thread to items queued up for the instance that has been terminated. With Terminate, the queued items are also deleted since there is no possibility of the instance being resumed. As with Suspend, no 'Cancel' signal occurs. The host (e.g., instance manager and persistence provider) decide where the error message goes.

Invoke Schedule

Purpose: Invoke a schedule.

Metadata:

The type of the schedule to be invoked.

An enum that indicates whether the invocation has CALL or EXEC semantics.

A set of parameter bindings.

An optional code-beside method that is called before the schedule is invoked.

Execution:

The InvokeSchedule activity first calls the OnInitializeCallee code-beside method, if one has been specified. Typically, this method will be used to set up In parameters for the schedule instance to be invoked. InvokeSchedule then creates and invokes a schedule instance of the specified type, passing the parameters that have been provided. The InvokeSchedule activity blocks (and yields its thread) if the invocation semantic is CALL, and waits for the called schedule to complete. Alternatively, the InvokeSchedule activity completes immediately once the schedule instance is invoked, if the invocation semantic is EXEC. The InvokeSchedule calls the OnCompletedCallee code-beside method, if one has been specified. Typically, this method will process the Out parameters for the schedule instance that was invoked.

Invoke Web Service

Purpose: Invoke a web service.

Metadata:

The name of the proxy class that is used to invoke the web service.

The name of the method on the web service to be invoked.

A Boolean indicating whether the invocation is synchronized.

A set of parameter bindings.

Execution:

Invokes a web service via a proxy class, passing and receiving parameters as specified.

DotNetEvent Sink

Purpose: Model the handling of an event that is raised via the RaiseEvent method or DotNetEventSource activity within a previously invoked (child) schedule.

Metadata:

A method in code-beside that is of the same type as the delegate indicated in the raising of the event to be handled.

Instance Data: None beyond ActivityState.

Execution:

Blocks awaiting notification that the specified event has been raised by a previously invoked schedule instance. The invoked schedule instance must be running under CALL semantics.

DotNetEvent Source

Purpose: Model the raising of an event that is functionally equivalent to raising the event in code-beside via the RaiseEvent method.

Metadata:

A delegate type, indicating the type of event that is being raised (and the type of the handler that is required to handle the event).

Parameter bindings to the method parameters defined on the delegate type.

Execution:

Raises the specified event, and immediately completes execution. There is no guarantee as to the number of subscribers to this event (there may be zero or more), and neither is there any mechanism for getting data back from the potential handler(s) of this event, i.e. the semantic is fire-and-forget.

Sequence

Purpose: Execute a set of child activities according to a single defined ordering.

Execution:

The Sequence activity coordinates the execution of a set of child activities in an ordered fashion, one at a time. The Sequence completes when the final child activity completes.

Parallel

Purpose: Execute a set of child activities concurrently.

Execution:

The Parallel activity executes a set of child activities concurrently. The order in which the children are enabled for execution is non-deterministic. The Parallel completes when all child activities are complete. Due to the threading model of the orchestration engine, in actuality only one activity within a Parallel may be executing at a given point in time.

While

Purpose: Iteratively execute a child activity.

Metadata:

A rule that governs the iteration.

Execution:

Iteratively executes the child activity. Prior to each iteration (including the first), the rule is evaluated; if it evaluates to false, then the While activity completes.

ConditionalBranch

Purpose: Represent a branch of a Conditional.

Metadata:

A rule that governs the conditional execution of the wrapped activity (branch).

Execution:

Executes the child activities, per Sequence semantics. The parent Conditional activity is responsible for examining the metadata (rule) to determine whether the ConditionalBranch should be executed. The Conditional activity itself offers no additional properties (other than ID and Description). However, Conditionals are comprised of conditional branches which expose properties. Upon selection of a ConditionalBranch, two addition context menu operations appear: Move Left (moves the selected ConditionalBranch to its immediate left in the conditional) and Move Right (moves the selected ConditionalBranch to its immediate right in the conditional).

Conditional

Purpose: Conditionally execute one of n ConditionalBranch activities.

Execution:

A Conditional activity contains an ordered set of ConditionalBranch activities. The Conditional executes the first ConditionalBranch activity whose rule evaluates to TRUE. The final ConditionalBranch activity is permitted to not specify a rule, in which case it is always considered to evaluate to TRUE. It is possible for a Conditional to complete without having executed any child activity. Essentially, this provides IF-ELSEIF-ELSE semantics.

Constrained

Purpose: Wrap an activity for the purpose of adding it to a CAG.

Metadata:
An enable rule for the wrapped activity.
A disable rule for the wrapped activity.

Runtime Properties:
Integer indicating whether the wrapped activity has completed at least once.

Execution:

The only allowed parent of a constrained activity is a CAG. The CAG itself utilizes the enable and disable rules on a constrained activity to determine when to execute it. When the Constrained activity is told by the CAG to execute, it simply executes the activity that it wraps. The Performed property is incremented when the constrained activity completes its execution. It is reset to zero only when the parent CAG itself is re-executed (e.g. within a WhileLoop or a second, outer, CAG).

CAG (Constrained Activity Group)

Purpose: Provide constraint-based execution of a set of child Constrained activities.

Metadata:
A completion rule.

Execution:

CAG contains only constrained activities. When the CAG executes, it executes (and re-executes) child activities based upon the evaluation of their enable and disable constraints. A child activity is executed by the CAG only when its enable rule evaluates to true and its disable rule evaluates to false. Specifically: CAG will walk its sub-tree & subscribe to activity state changes for all activities; this will stop at call boundaries. CAG will add a subscription whenever an activity is added dynamically to its sub-tree. CAG will subscribe to data changes for its enclosing scope and all parent scopes up to a schedule boundary; these subscriptions are determined by analysis of the enable and disable rules on all constrained activities in the CAG. The engine will deliver batched notifications of data changes and the CAG will decide which rules to evaluate. Note that data changes made by a called schedule are posted when the call completes. It is possible to identify scope variable dependencies even if those variables are accessed indirectly via code beside methods. As such, it is possible to be very specific in determining which constraints should be reevaluated when a variable is changed. This same mechanism will work for both declarative and code rules. If a constrained activity has no enable rule, it is taken to always be true.

If a constrained activity has no disable rule, it is taken to always be Performed>0. Thus, if no rules are specified on a constrained activity, it is executed immediately when the CAG executes, and it does not ever get re-executed. Likewise, if only a custom enable rule is provided on a constrained activity, it will execute when that enable rule evaluates to true, and it will only execute that one time. If constraint-based re-execution is desired, an appropriate custom disable rule must be provided, along with the appropriate enable rule.

The following table illustrates the condition required to execute a constrained activity.

TABLE A1

Constrained Activity Execution.

| EnableRule | DisableRule | Can activity execute? |
|---|---|---|
| TRUE | FALSE | Yes |
| TRUE | TRUE | No |
| FALSE | FALSE | No |
| FALSE | TRUE | No |

If during the execution of an activity, the disable rule for that activity evaluates to true, the CAG cancels the execution of that activity. This does not preclude re-execution of that activity. As soon as the completion rule of the CAG evaluates to true, the CAG immediately cancels any currently executing child activities, and then itself completes. All rules (enable, disable, completion) are evaluated whenever necessary based upon their data and state change dependencies.

The CAG provides two operation modes: Preview & Edit. If the CAG designer is in Preview mode, the developer is only able to select the activity which appears the filmstrip. The property browser exposes Enable and Disable rule options (detailed below) when a developer has selected any activity. This allows a developer to set enable and disable rules for each activity with a CAG. If the CAG designer is in Design mode, the developer is able to click on the activity in the preview window (called a Constrained). The property browser then displays the Enable and Disable rule options (like in preview mode) in addition to the properties normally exposed by the specific activity.

The CAG designer provides a few additional context menu options:

Preview Activity
Given a selected activity, the CAG will switch from Design Mode to Preview Mode.

Edit Activity
Given a selected activity, the CAG will switch from Preview Mode to Design Mode.

View Previous Activity
Move to the activity immediately preceding the currently selected activity in the filmstrip. When you reach the first activity in the CAG filmstrip, this menu option is disabled.

View Next Activity
Move to the activity immediately following the currently selected activity in the filmstrip. When you reach the last activity in the CAG filmstrip, this menu option is disabled.

In one embodiment, each activity within a CAG is wrapped within a 'constrained activity.' This is then exposed to the developer via the filmstrip of the CAG. If the CAG is in preview mode and a developer selects this activity and copies it, the only place where it may be pasted (and thus have the consequential context menu enabled) is within another CAG. However, if the developer switches the CAG mode to "Design" and chooses the activity within the preview pane, copy/paste & drag-drop are enabled in a similar manner as with the remaining activities.

Task

Purpose: Model an external unit of work that is performed by one or more principals. Wraps a template activity that is either an InvokeSchedule or a custom activity.

Metadata:
    An execution mode, indicating either parallel or sequential execution.
    The type of the underlying task implementation (called the template).
    A role indicating the assignees for the task.
    An optional code-beside method that allows the developer to set task properties on a per-assignee basis.

Execution:
    When the task is executed, first the role is resolved to a set of principals (assignees). If the role is empty then an exception is thrown. The template activity is then cloned once for each assignee, and the optional code-beside method (example shown below) for initializing properties of the clones is then called if present. Depending upon the execution mode, the individual assignee tasks are then executed in parallel or in sequence. To achieve this, each assignee task (clone) is effectively wrapped in a constrained activity with appropriate enable and disable rules set. Note that if the execution mode is sequential, the sequence is determined by the ordering of assignees that is returned by role resolution. As with CAG (parent activity of task), if the completion rule becomes true, then the task completes and any outstanding clones are cancelled. Otherwise, the task completes when all assignee tasks (clones) are complete.

Event Driven

Purpose: Wrap an activity whose execution is triggered by an "event" activity.

Execution:
    An EventDriven activity must have a parent that is either a Listen or an EventHandlers composite activity. An EventDriven activity contains both an IEventActivity, and a second activity of any type. The IEventActivity by definition blocks pending the occurrence of some event, such as the firing of a timer or the arrival of a message. When the event occurs, the IEventActivity completes its execution, and then the second activity is executed.
    Upon selection of an Event Driven (generally within an EventHandlers or Listen activity), two addition context menu operations appear: Move Left (moves the selected EventDriven to its immediate left in the conditional) and Move Right (moves the selected EventDriven to its immediate right in the conditional).

Listen

Purpose: Conditionally execute one of n child EventDriven activities.

Execution:
    The Listen activity ensures that only the first of its child EventDriven activities to have its IEventDriven child's event occur is allowed to execute. All others are cancelled. In concept, Listen is similar to a Conditional, in that exactly one of n branches is executed, where the selection of the branch is determined by the occurrence of an event rather than by procedural business logic.

Event Handlers

Purpose: Wrap a set of EventDriven activities. The EventHandlers activity simply holds a set of EventDriven activities, for use by the associated Scope. An EventHandlers activity may only be associated with a Scope.

Exception Handler

Purpose: Wraps an activity with metadata that represents a catch block for a scope.

Metadata:
    An enum indicating the type of the catch block
        All—catches all exceptions
        Type—catches an exception of a specified type
        Variable—catches an exception of a specified type, and makes the exception available for inspection in a local variable of the code-beside.
    A property indicating the type of exception caught (used only if the enum is set to Type)
    A reference to a local variable where the exception will be deposited (used only if the enum is set to Variable).

Execution:
    ExceptionHandler activities may only be added to an ExceptionHandlers activity in one embodiment. The Scope associated with the ExceptionHandlers activity utilizes the metadata on its set of ExceptionHandler activities to determine which one to execute when the Scope receives an exception. When the ExceptionHandler activity is told by the Scope to execute, it simply executes the activity that it wraps. Upon selection of an ExceptionHandlers, two addition context menu operations appear: View Previous Activity, View Next Activity.

Exception Handlers

Purpose: Wrap an ordered set of ExceptionHandler activities. The ExceptionHandlers activity simply holds a set of ExceptionHandler activities, for use by the associated Scope. An ExceptionHandlers activity may only be associated with a Scope in one embodiment. When two or more ExceptionHandler activities exist, "Move Left" and "Move Right" context menu options are enabled.

Compensate

Purpose: Compensate a completed child scope.

Metadata:
    The ID of the child scope to compensate.

Execution:
    The Compensate activity may exist only within a compensation handler or an exception handler for a scope. Its purpose is to trigger the compensation handler of a completed child scope.

Compensation Handler

Purpose: Wrap a child activity that is defined as the compensation handler for a scope.

Execution:
    Executes its child activity. A CompensationHandler activity may only be associated with a Scope.

Scope

Purpose: A scope is: a transaction boundary; an exception handling boundary; a compensation boundary; an event handling boundary; and, a boundary for message, variable, correlation set, and channel declarations (i.e. shared data state). A scope activity is a grouping of activities that acts as a logical container. Often the purpose of a scope is to apply transactional semantics to the enclosed set of activities.

Metadata:
- The Type of the scope's code-beside class.
- A Boolean indicating whether the scope is a synchronized scope.
- Several properties related to transactional characteristics of the scope.
  - The type of the transaction: none, atomic, or long-running
  - The isolation level (if the transaction is atomic)
    - Chaos: The pending changes from more highly isolated transactions cannot be overwritten.
    - ReadCommitted: Shared locks are held while the data is being read to avoid dirty reads, but the data may be changed before the end of the transaction, resulting in non-repeatable reads or phantom data.
    - ReadUncommitted: A dirty read is possible, meaning that no shared locks are issued and no exclusive locks are honored.
    - RepeatableRead: Locks are placed on all data that is used in a query, preventing other users from updating the data. Prevents non-repeatable reads but phantom rows are still possible.
    - Serializable: A range lock is placed on the DataSet, preventing other users from updating or inserting rows into the dataset until the transaction is complete.
    - Snapshot: Reduces blocking by storing a version of data that one application may read while another is modifying the same data. Indicates that from one transaction you cannot see changes made in other transactions, even if you requery.
    - Unspecified: A different isolation level than the one specified is being used, but the level cannot be determined.
  - The timeout, in seconds (if the transaction is atomic)
  - Whether the transaction is capable of being retried (if the transaction is atomic)
  - Whether the transaction is batchable (if the transaction is atomic)
  - A code-beside method that returns a DateTime indicating a timeout value (if the transaction is long-running)
- A code-beside method that executes when the scope begins executing. This is essentially equivalent to a Code activity as the first activity within the scope. This method is guaranteed to complete before any event handlers for the scope may execute. An exception here is treated just as an exception within a Code activity inside the scope.
- A code-beside method that executes when the scope finishes executing. This is almost equivalent to a Code activity as the last activity within the scope; this code will execute only after any instantiated event handlers finish their execution. An exception here is treated just as an exception within a Code activity inside the scope.
- An optional set of event handlers.
- An optional ordered set of exception handlers (not valid for scopes that are atomic transactions).
- An optional compensation handler.

Execution:
Execution of the activities within a Scope is sequential, and thus the contained activities are explicitly ordered when the scope is constructed, as in a Sequence. As with other composite types, scopes may be nested, subject to some restrictions. If a developer is referencing a type not declared within the scope but for any property within that scope, the property will be full qualified with the outer calling schedule name within the property browser. Under normal circumstances, a Scope activity simply executes its "main" child activity, as well as any of its event handlers that fire. If an OnScopeInitialized code-beside method is specified, that method is executed just as if it were a Code activity as the first item inside the scope. Event handlers execute concurrently with the "main" child activity of the Scope, and are considered optional but normal aspects of the Scope's execution. As in the Listen activity, the first activity within an event handler must be an IEventActivity. Typically, this is either a receive activity or a Delay but may be any custom activity that implements the appropriate interface. A specific event handler may execute more than one time for a given Scope; and, it is possible for these instances of an event handler to execute concurrently. New instances are guaranteed to be created for each "event" that fires for each event handler. When the "main" child activity of a Scope completes its execution, all currently executing event handler instances are allowed to finish their execution normally. But, new instances of any event handlers are not subsequently created. If an OnScopeCompleted code-beside method is specified, that method is executed after both the main body of the scope is finished, and all outstanding event handlers are finished.

Essentially, a scope's OnInitialized and OnCompleted methods are solidly inside the scope. The only "special treatment" they get is:
- No event handler may start before the OnInitialized method completes
- The OnCompleted method is not executed until all currently running event handlers complete (along with the main body of the Scope)
- Once the OnCompleted method starts, no event handlers may run anymore Exceptions that occur in an event handler are treated exactly the same way as exceptions that occur in the "main" child activity of the Scope. If a Scope is marked as a synchronized Scope, then this guarantees safe concurrent access to shared data. Synchronized scopes cannot be nested. Synchronized scopes that access the same shared data (external to both) are guaranteed that the results of their read/write operations on that data would be no different than if the scopes were serially executed. A Scope also acts as an exception handling boundary, meaning that the Scope's exception handlers are shared by all nested activities within the scope (including any event handlers). If an exception is thrown by an executing activity within a non-atomic Scope, the scope cancels all other executing activities and event handler instances, and then handles the exception if it has an exception handler that is able to catch the exception. Once the exception handler executes, the Scope completes but with an outcome of Failed. If no exception handler is defined for a non-atomic scope for a particular exception type, or if an exception handler throws an exception, then a default handler is created (for all uncaught exceptions) that runs all installed compensation handlers (see below) for child scopes, in reverse order of the completion of those child scopes, and then rethrows the exception to its parent Scope.

An atomic scope cannot have associated exception handlers. If an exception occurs during the execution of an atomic scope, the transaction fails, as does the execution of that scope. The scope will itself produce an exception that is propagated to the next outer enclosing scope, which does have the ability to handle that exception. A Scope whose execution completes normally (meaning that no exception occurred), has its compensation handler "installed". This compensation handler may subsequently be called, via the Compensate activity, from within either an exception handler of the parent scope, or the compensation handler of the parent scope. If no compensation hander is defined for a completed scope, a default one is installed that runs all installed compensation handlers for child scopes, in reverse order of the completion of those child scopes. Given the above, compensation occurs only in the context of some exception handler. If an exception occurs during the execution of a compensation handler, it is treated as an exception within that exception handler.

In addition to the standard context menu options, the Scope activity exposes the following additional menu options:

View Scope
  This is the default view of a scope when added to the designer. Selecting this option takes the developer back to this view.

View Exceptions
  Selecting this option changes the UI in-place to display the exceptions associated with the Scope. This is only enabled when Transaction Type is Long Running or None. Stated another way, this menu is not available when Transaction Type is Atomic.

View Events
  Selecting this option changes the UI in-place to display the Event handler associated with the Scope.

View Compensation
  Selecting this option changes the UI in-place to display the Compensation defined with the Scope. This is only enabled (when the Transaction type property is set to Long Running or Atomic)

Schedule

Purpose: A Schedule is the only top-level activity that the orchestration engine will execute.

Metadata (in Addition to Scope Metadata):
  The Namespace of the schedule type.
  A CompilationType enum that indicates whether the schedule is a standalone application, or a library (meant to be invoked from other schedules).
  The representation of the entire schedule in XOML format.
  Parameter declarations.

Execution:
  Other than the need to consume In and Optional-In parameters and produce Out parameters, a Schedule executes exactly the same as a Scope.

Parameters:
  Part of a schedule's metadata is the set of parameters that participate in its execution.

Composite Activities
  The composite activity types that enable control flow are: Sequence, Parallel, Constrained Activity Group, Conditional, While, Listen. Additionally, Scope and Schedule are composite activity types that act as containers with implied sequencing of the activities within them.

ID & Description Properties
  Every activity provides an ID and Description property. When dragging an activity from the toolbox to the design surface, this ID is generated automatically. The Description property is a placeholder for a developer to type. Typical usage scenarios would involve a developer providing a short description of what a specific branch of a condition might be used for. Conceptually, think of this property as an equivalent to a // in the Visual Basic and C# code editors.

Help Text
  When selecting a property in the property browser, the developer is able to hit the F1 key and index to the online help for that property. Each property for each activity will provide the relevant help text.

Task Error List & Property Browser Integration
  When an activity's properties are insufficiently configured, developers are presented with an icon containing an exclamation point. They may then click on the icon and see a drop-down list of the configuration errors. Selection of one of the errors will move the focus to the Properties Browser and highlight the property in error. The icon will disappear when the activity's properties are complete. The errant configurations may also be seen in the "Task List". Doubling clicking on an error message presented in the Task List takes the developer directly to the property in the property browser.

ID Generation
  The default identifier of any activity added to the designer is created based on the number of similar activities which already exist. As activities are added and removed, the identifier is created by the open slot in the range. As an example, the first Send activity added would have an identifier as '1'. The second, '2' and so on. However, if five Send activities exist, the developer removes number 3 (via delete or cut) and then later re-adds another Send (via copy/cut/paste or through the toolbox), the identifier should be '3'.

Valid Names for IDs
  Developers may provide any name for an ID that is valid in the project's language (including valid escaped names).

Multiple Selection of Activities
  Developers will often wish to select a group of activities and move them to another area of the schedule. This could be accomplished on an activity by activity level, however, it is more likely that a developer will select multiple activities at a time and drag them to this new area. If the activities are of the same type, the property browser will be enabled to allow a mass configuration of common properties. For example, if all the activities selected are constrained activity groups, then the Completion Condition property will be available for the developer to configure.

If the developer selects a variety of different types, then the property browser will only provide the ability to configure properties which the activities share (for example, ID and description). During multi selection, the selected activities will be adorned with blue indicators on the corner of the activities. These indicators will be shown as blue dots. The activity which has the keyboard focus will be adorned differently. It will be a solid versus a hollow fill to indicate that it is the activity in focus.

Handler & Variable Generation
  Many activities expose properties which generate variables and or code handlers in the code beside. All properties which perform either action are called out in the property browser integration for each activity. Creation of a new variable or handler is performed when a developer specifies a new variable or handler name via the property browser. Take as an example the message variable for a Send. When specifying "m1" of type System.String, the resulting code beside is

```
public OEMessage<System.String> m1 = new
    OEMessage<System.String>( );
```

By specifying another value for a property which creates a code beside variable or handler, a new variable or handler is created. The existing variable/handler remains intact. It is incumbent upon the developer to delete the generated variable (or respective handler). In the scenario where the developer renames an existing variable in the code beside, the activities referencing it will not be updated. It is again incumbent upon the developer to update each activity which referenced the original variable with this new variable.

Copy/Paste and drag-drag operations across schedules when applied to the handlers for specific activities do not apply to the handlers associated with them. When applied to Scopes, generation of variables and code handlers behaves in a slightly different manner. More specifically, the generated variables and code handlers will be placed within the definition of the Scope Class. All private, protected, internal and public methods and variables are from the activity's scope may be set on the activity (as long as types and signatures match). All public and internal methods and variables are from the activity's enclosing scopes may now be legally set on the activity (as long as types and signatures match).

Consequently, while creating these variables and handlers from the menus or from the property browser, the rules are as follows:

If the variable or method is to be created in the activity's scope, it is created private.

If the variable or method is created in any the activity's enclosing scopes, it is created public.

Context Menu

When right clicking on an activity, its associated designer will provide a developer with activity specific actions. For example, right clicking on a scope, will provide you with "View Scope, View Exceptions, View Events" in addition to the standard "View Code", Cut/Copy/Paste parameters.

Here is a list of possible actions you may take based on commonalities:

View Code
  View the code associated with the selected activity. If an activity is selected and a handler has been specified, selecting this option should take the developer to the specified handler.
Cut
  Remove the selected activity from the designer and copy it to the clipboard.
Copy
  Copy the selected activity to the clipboard.
Paste
  Paste the last copied activity from the clipboard to the designer. If no selection area is selected, the activity will be copied as the activity in the schedule.
Delete
  Deletes the selected activity
Properties
  Populate and set focus to the Property Browser for the selected activity
Generate Handlers
  Generate the corresponding handlers for the selected activity.
Expand
  Expand the designer to expose its constituent parts
Collapse
  Collapse the designer to hide its constituent parts Hotlink/Hyperlink Property Browser Integration Each activity provides context menu options as Hyperlinks in the Property Browser. For all primitive activities, this includes "Generate Handlers". Each composite activity will provide "Expand/Collapse" and context menu options specific to the activity. These are detailed on a per activity level.

Activity Commenting

The orchestration engine designer allows the user to create complex hierarchical schedules. These schedules may be very complex and hard to debut. The commenting functionality gives user an ability to comment out parts of the schedule so that the commented activities will not be executed at runtime. This simplifies the debugging and allows the user to monitor execution of part of the schedule at a time. Activities expose a Boolean property to allow its "pseudo" removal from the schedule. This activity is still present in the schedule, however at runtime, its existence will be ignored and it will not be executed. A developer is able to enable/disable commenting by setting a property exposed in the Property Browser and via the context menu.

The commenting functionality has design time as well as runtime implications. Users are able to programmatically comment an activity as well as use the user interface provided by the designer. The designer allows users to comment the shapes by selecting shapes and using property browser to set the comment property to true and rubberbanding and multi selecting the activities and selecting comment menu option on the context menu. In response to the comment, the designer renders an activity designer semi transparent. It is possible for the user to select the activity designer and set the properties on it. The Xoml continues to have the commented shape in it; the only difference is the comment property being set to true. The design time validation skips the commented activities and behaves as though the activities do not exist. At runtime, the authoring object model offers two collections, which return activities and executable activities. The runtime acts on executable activities.

APPENDIX B

Activity Designers

The IActivityDesigner interface is implemented by all the activity designers which need to participate in the workflow. This is a protocol by which the designers talk with other designers and workflow view. The workflow view looks for the IActivityDesigner interface in order to render, layout or forward events to the designer. Supporting IActivityDesigner interface enables all the designers to act like windows control even though designers are not really derived from windows control. This interface also enables the workflow view and other designer infrastructure like adornment service, menu-command service to exchange information with the designers. The designers derived from IActivityDesigner interface cannot have a hierarchy; in order to have a hierarchy the designers need to implement ICompositeActivityDesigner interface. Following is the definition of IActivityDesigner with the details about properties and methods.

TABLE B1

Properties and Methods of IActivity Designer.

| Properties | |
| --- | --- |
| Visible | Gets if the designer is currently visible or not. |
| Location | Gets the location of the designer in logical coordinates. |
| Size | Gets the size of the designer in logical coordinates. |
| Bounds | Gets the bounding rectangle of the designer in logical coordinates. |

TABLE B1-continued

Properties and Methods of IActivity Designer.

| | |
|---|---|
| ConnectionPoints | Gets the array of points which indicate the locations at which the designer may be connected in the workflow. |
| AssociatedBitmap | Gets the visual bitmap associated with a designer. |
| Glyphs | Gets the glyphs supported by the designer (e.g., Selection, and SmartTag) |
| DesignerActions | Gets the actions associated with the designer to rectify the configuration. |
| Methods | |
| Draw | Called by the workflow view in order to draw the designer. The drawing context is passed using the DesignerData structure. |
| HitTest | Called by the workflow view to check if a mouse coordinate was on designer. |
| OnLayoutPosition | Called in response to layout event. This tells the designer to update location property. Composite designers call the layout position on children in response to this function. |
| OnLayoutSize | Called in response to layout event. This tells the designer to update its size. Composite designers call the layout size on children in response to this function. |
| OnMouseDragBegin | Method indicates that a mouse drag started on the designer. Used for rubberbanding and drag drop support. |
| OnMouseDragMove | Method called in response to mouse dragged and moved over the designer. |
| OnMouseDragEnd | Called to notify when the mouse drag is over. |
| OnMouseEnter | Notifies when mouse enter the designer area. |
| OnMouseDown | Notifies if the mouse is clicked on any part of the designer. |
| OnMouseHover | Notifies that the mouse is on the designer and is being hovered. |
| OnMouseUp | Notifies that user released mouse button after clicking it on the designer. |
| OnMouseLeave | Notifies that the mouse has left the designer. |
| OnDragEnter | Indicates to the designer that user is currently in drag drop mode and while dragging has entered the designer. |
| OnDragOver | Indicates that the drag activity is currently taking place over the designer. |
| OnDragLeave | Indicates that while drag drop was in progress the mouse left designer or drag drop activity was terminated. |
| OnDragDrop | Indicates of a successful Drag drop event. |
| OnGiveFeedback | Asks designer to give feedback when drag drop is in progress. |
| OnQueryContinueDrag | Asks if the drag drop event should continue or should be terminated. |
| OnKeyDown | Notifies the selected designer that a key was pressed occurred when the designer was selected. |
| OnKeyUp | Notifies the selected designer that a key was released occurred when the designer was selected. |
| RefreshDesignerActions | Requests the designer to refresh its collection of designer actions. This is also a request to trigger the validation. |
| CanSetParentActivity | Returns if an composite activity may be set as a parent of current activity. |

ICompositeActivityDesigner:

ICompositeActivityDesigner is implemented by the designer which may have hierarchy under them; that is they may have children. The composite designers are responsible to maintain itself and all its children. Using the ICompositeActivityDesigner interface a composite designer gives away the information about its children, provides functionality to add and remove child designers and enables the keyboard navigation. Following is the definition of ICompositeActivityDesigner with the details about properties and methods.

TABLE B2

Properties and Methods of ICompositeActivityDesigner.

| | |
|---|---|
| Properties | |
| ActivityDesigners | Gets collection of activity designers which make up hierarchy of the CompositeActivityDesigner. |
| CanCollapse | Gets if a activity designer may be collapsed. Expand/Collapse button is shown or hidden in response to this property. |
| Expanded | Get or Sets if the CompositeActivityDesigner is expanded or collapsed. |
| FirstSelectableObject | Gets the first selectable object in the CompositeActivityDesigner hierarchy. |
| LastSelectableObject | Gets the last selectable object in the CompositeActivityDesigner hierarchy. |
| Methods | |
| IsChildVisible | Return if a child activity contained in the CompositeActivityDesigner hierarchy is visible. |
| EnsureChildIsVisible | Scrolls a child activity in CompositeActivityDesigner hierarchy into visible range. |
| GetNextSelectableObject | Gets next selectable object with the CompositeActivityDesigner hierarchy based on the direction flag passed. |
| CanInsertActivities | Returns if an activity is valid to be inserted into a CompositeActivityDesigner. The context passed to this function identifies where the child activity is being inserted. |
| InsertActivities | Inserts a child activity into CompositeActivityDesigner hierarchy at the specified position passed via context. |
| CanRemoveActivities | Returns if an activity at a specific position indicated using context may be removed from CompositeActivityDesigner hierarchy. |
| RemoveActivities | Removes an activity from a specific position in CompositeActivityDesigner hierarchy. |

Simple Designers

ActivityDesigner class represents the simplest implementation of a designer. All the designers associated with activities in workflow are derived from ActivityDesigner. ActivityDesigner class inherits from IActivityDesigner interface and provides default implementation for the interface. The workflow view talks with the designer using the IActivityDesigner interface. ActivityDesigner class is typically inherited by the designers which need a very lightweight implementation for the drawing of designers. These designers do not have any children or hierarchy. The features offered by the activity designer include basic layouting logic, rendering support (e.g., by drawing icons, description, border, interior and background), rendering the help text, returning default glyphs needed by all the designers, showing context menu through DesignerVerbs, filtering of design time specific properties, default event generation, default hittesting, triggering validation, showing tooltip, and participation in keyboard navigation.

public abstract class ActivityDesigner: ComponentDesigner, IActivityDesigner

System.Object

System.ComponentModel.Design.ComponentDesigner
  System.Workflow.ComponentModel.Design.ActivityDesigner
    System.Workflow.ComponentModel.Design.CompositeActivityDesigner
    System.Workflow.ComponentModel.Design.CodeDesigner
    System.Workflow.ComponentModel.Design.CompensateDesigner -continued

```
System.Workflow.ComponentModel.Design.DelayDesigner
System.Workflow.ComponentModel.Design.FaultDesigner
System.Workflow.ComponentModel.Design.CompositeSche-
    duleDesigner
System.Workflow.ComponentModel.Design.InvokeWebServiceDe-
    signer
System.Workflow.ComponentModel.Design.BaseReceiveDesigner
System.Workflow.ComponentModel.Design.BaseSendDesigner
System.Workflow.ComponentModel.Design.GenericTaskDesigner
System.Workflow.ComponentModel.Design.STSTaskDesigner
```

Composite Designers

CompositeActivityDesigner are the designers which have hierarchy (e.g., they have children underneath). The CompositeActivityDesigner are responsible for managing all the aspects of itself as well as its children. It is also responsible for interacting with its children for forwarding the events. Whenever there is a request to modify the activity designer collection contained by the CompositeActivityDesigner; it is passed a context (ContextBase) which specifies the place from which the activity needs to be removed. ContextBase may be specialized by each CompositeActivityDesigner derived class to specify context specific to them. Example of this is SequentialActivityDesigner which specializes ContextBase by deriving a class called ConnectorContext from it. The CompositeActivityDesigner class derives from the ICompositeActivityDesigner interface and provides default implementation for it. The features provided by the CompositeActivityDesigner include expanding/collapsing of the designers, drag and drop indicators, layouting of self and children, drawing of self and children, hittesting of the children, and inserting removing activities from hierarchy.

public abstract class CompositeActivityDesigner: ActivityDesigner, ICompositeActivityDesigner System.Object

```
System.ComponentModel.Design.ComponentDesigner
    System.Workflow.ComponentModel.Design.ActivityDesigner
        System.Workflow.ComponentModel.Design.CompositeActivityDe-
            signer
            System.Workflow.ComponentModel.Design.SequentialActi-
                vityDesigner
            System.Workflow.ComponentModel.Design.ParallelActivityDe-
                signer
            System.Workflow.ComponentModel.Design.ConstrainedActi-
                vityDesigner
```

CompositeActivityDesigner is an abstract class and cannot be instantiated as it cannot exists on its own. Sequential, Parallel and CA designers are all specializations of this class.

SequentialActivityDesigner

SequentialActivityDesigner class represents all the designer which has children underneath and all the children are ordered sequentially. The children are connected by links called connectors which are also used to modify the sequence of children. The SequentialActivityDesigner class is a specialization of CompositeActivityDesigner and provides following set of features: connector start and end bitmap drawing, layouting of all the children sequentially and updating all the connectors linking them, drawing of connectors between the children, highlighting drop areas when drag drop takes place, hittesting the connectors, sequential keyboard navigation using up and down arrows, and returning glyphs for connectors.

internal abstract class SequentialActivityDesigner: CompositeActivityDesigner

System.Object

```
System.ComponentModel.Design.ComponentDesigner
    System.Workflow.ComponentModel.Design.ActivityDesigner
        System.Workflow.ComponentModel.Design.CompositeActivityDe-
            signer
            System.Workflow.ComponentModel.Design.SequentialActivityDe-
                signer
                System.Workflow... ... ...Design.ActivityPreviewDesigner
                System.Workflow... ... ...Design.CompensationHandlerDesigner
                System.Workflow... ... ...Design.ConditionedDesigner
                System.Workflow... ... ...Design.EventHandlerDesigner
                System.Workflow... ... ...Design.ExceptionHandlerDesigner
                System.Workflow... ... ...Design.ScopeDesigner
                System.Workflow... ... ...Design.SequenceDesigner
                System.Workflow... ... ...Design.WhileDesigner
```

All the above designers are specializations of SequentialActivityDesigner; they all mainly differ in drawing. All of these designers have a special way of representing themselves on in the workflow but they all work off a common functionality provided by SequentialActivityDesigner.

ParallelActivityDesigner

ParallelActivityDesigner is another specialization of CompositeActivityDesigner which contains multiple SequentialActivityDesigners. Each of these SequentialActivityDesigners is a branch in parallel designer. The parallel designer offers the following specialized features: layouting of multiple sequential designers, drag and drop indicators for adding additional branches, keyboard navigation for traversing between parallel branches by using left and right arrow keys, and drawing connectors to link the multiple parallel branches.

internal abstract class ParallelActivityDesigner: CompositeActivityDesigner\

System.Object

```
System.ComponentModel.Design.ComponentDesigner
    System.Workflow.ComponentModel.Design.ActivityDesigner
        System.Workflow.ComponentModel.Design.CompositeActivityDe-
            signer
            System.Workflow.ComponentModel.Design.ParallelActivityDe-
                signer
                System.Workflow... ... ...ConditionalDesigner
                System.Workflow... ... ...ListenDesigner
                System.Workflow... ... ...ParallelDesigner
```

Conditional, Listen and Parallel designers are specialization of ParallelActivityDesigner with additional drawing logic associated with them.

ActivityPreviewDesigner

ActivityPreviewDesigner is sequential designer but has an ability to show collection of multiple designers in the form of collection bag. ActivityPreviewDesigner uses the metaphor of filmstrip to display this collection. When a particular designer is selected it's representation is shown in the preview window which the activity preview designer hosts. The ActivityPreviewDesigner has two modes: edit mode and preview mode. In the preview mode, users cannot modify the designer which is selected. This mode enables the user to see the entire representation of the designer without needing to scroll. Edit mode allows the designer to be modified. Features offered by the ActivityPreviewDesigner include: preview strip to show the collection of activities, preview of the currently selected activity, and ability to edit selected designer.

> internal abstract class ActivityPreviewDesigner: SequentialActivityDesigner

System.Object

```
System.ComponentModel.Design.ComponentDesigner
    System.Workflow.ComponentModel.Design.ActivityDesigner
        System.Workflow.ComponentModel.Design.CompositeActivityDe-
          signer
            System.Workflow.ComponentModel.Design.SequentialActivityDe-
              signer
                System.Workflow.........Design.ActivityPreviewDesigner
                    System.Workflow... ... ...Design.GenericCollectionDesigner
                    System.Workflow... ... ...Design.CAGDesigner
```

Scope & Service Designer

Scope and Service designers are special designers. Each of these may have exceptions, events and compensation associated with them. Scope and Schedule also have a class associated with them in the user code file and user has ability to scope variables in these classes. Scope and Service designers are illustrated differently than other designers and show a watermark and highlight them by drawing a drop shadow.

Scope and Service designers have ability of changing the views so that a user may flip the views to reveal exception, events and compensation associated with them. When the user hovers on the Service or Scope icon, a drop down palette appears which allows the user to pick one of the exception, event or compensation views. The designer view is then flipped and the activities contained in the selected view are shown. User may only view activities belonging to any one of the view at any point of time. The flipping of views is achieved by filtering the child activities contained in the Scope or Schedule. Scope and Schedule may have at most one of ExceptionHandlers, EventHandlers and Compensation as its children. Based on the view which user is looking at; the designer filters out these children to only show the child activities which may appear in the chosen view; thus achieving effect of supporting multiple views. Schedule designer is usually set as the root designer in the workflow view.

> internal class ScopeDesigner: SequentialActivityDesigner
>
> internal class ServiceDesigner: ScopeDesigner System.Object

```
System.ComponentModel.Design.ComponentDesigner
    System.Workflow.ComponentModel.Design.ActivityDesigner
        System.Workflow.ComponentModel.Design.CompositeActivityDe-
          signer
            System.Workflow.ComponentModel.Design.SequentialActivityDe-
              signer
                System.Workflow.........Design.ScopeDesigner
                    System.Workflow.........Design.ServiceDesigner
```

ServiceRootDesigner

ServiceRootDesigner is associated with the Root component contained by Designer Host. It is responsible for creating the workflow view which is then hosted in designer window pane. ServiceRootDesigner also supports IToolBoxUser interface which gives the ability to add toolbox items in the workflow by double clicking on the toolbox items.

Design-Time Descriptors

Each activity in the authoring object model has meta-data that describes its behavior during design-time. This includes associating the activities (designers) as well as property grid behavior (naming, description, filtering, property editors, etc.). Type\Property\Event design time behavior is described using a zero or more of the following attributes:

SRCategoryAttribute—orchestration engine attribute. Provides localized category name.

SRDescriptionAttribute—orchestration engine attribute. Provides localized description.

EditorAttribute—provides a UITypeEditor.

TypeConverter—provides filtering, value list, and conversion between types.

BrowsableAtrribute—show\hides members during design time.

SRCategory and SRDescription are merely mapping between a resource name and a string. Most editors (UIType-Editor) are managers for handling dialogs (like the CorrelationSetsDialog) or dropdown lists. The PropertyDescriptor handles the property in design time and is handed the property either by a default TypeConverter, a custom TypeConverter (that is declared as attribute as above) or a TypeDescriptor.

UI Type Editors Provide editors to various properties in the orchestration engine Component model. The Property browser use them to display ellipsis or drop down and to launch the editors.

Type Converters

The type converter provides methods to convert the object to/from other types, provides a PropertyDescriptor list that represents the object properties in design time and might provide values to be used in a propertygrid's property's dropdown.

Followed are some of the TypeConverters implemented in the orchestration engine Component model:

DeclTypeConverter

> Base class to all activity's Type converters. Implements CanConvertFrom( ), CanConvertTo( ), ConvertFrom( ), ConvertTo( ) that convert activity objects to/from strings (To display the name of the activity in the property grid, and allow name editing to create the activity). Also, GetSite ( ) provides access to the services.

HandlerDeclTypeConverter

> Type converter for events. Derives from DeclTypeConverter. Implements GetStandardValues( ) that uses IEventBindingService to display compatible handlers.

VariableDeclTypeConverter

> Type converter for variables (messages, channel, correlations etc'). Derives from DeclTypeConverter. Implements GetStandardValues( ) that uses IFieldBindingService to display compatible variable fields. In addition, the Type converter filters out the "Name" property and set a special propertyDescriptor for the type property that manifest as generic type.

Property Descriptors

Property descriptor provides design time services to activity objects. It provides name, description, category, type converter information as well as additional functionality when getting\setting the property value. By default, the TypeConverter will provide the PropertyDescriptors to all properties. The TypeConverter, however, may remove, add, or wrap them to provide a different design-time behavior of the type.

Followed are some of the PropertyDescriptors implemented in the authoring object model:

DynamicPropertyDescriptor
  Base class to all property descriptors in the authoring object model. Implements a wrapper around the default property descriptor and delegates all the methods to it. In addition, provides access to the object site, either directly from the object (if it is component) or via the IReferenceService.
VariableDeclPropertyDescriptor
  Property descriptor for all variables (message, channel, correlation, etc.). Overloads SetValue( ) to provide code beside field as follows:
    Get the variable to set and its site.
    Get the site of the containing scope.
    Get the IFieldBindingService of the containing scope.
      Note that each scope has its own IFieldBindingService with its own set of fields.
    Validate the field name with the service.
    Open a designer transaction.
    Save the value
    Call IFieldBindingService.CreateField( ) to add the field to the code beside file.
    Commit the transaction
HandlerDeclPropertyDescriptor
  Property descriptor for all Handlers. Overloads SetValue( ) to provide code beside field as follows:
    Get the HandlerDeclaration object to set and its site.
    Get the IEventBindingService.
    Open a designer transaction.
    Create a LocalEventDescriptor.
    Get the PropertyDescriptor for the event (using eventBindingService.GetEventProperty( )) and set the HandlerDeclaration on it.
    Set the "Name" property of the HandlerDeclaration object
    Commit the transaction.
ArrayElementPropertyDescriptor
  Property descriptor that represents an item in a collection. Since collection items—for example, Correlation Sets—do not have property descriptor (they are not properties) the ArrayElementPropertyDescriptor fakes a descriptor as if they were properties, thus allows to display them inside a property browser. This property descriptor was designed to be wrapped by any of the property descriptors described above.
LocalEventDescriptor
  EventDescriptor for represent Handler Declarations. Handlers in the authoring object model are not real events, but properties, so we introduce our own EventDescriptors for the IEventBindingService to be used.

Using ICustomTypeDescriptor

ICustomTypeDescriptor is an alternate way for setting descriptors for a component. The component itself implements the interface and provides the descriptors, as type converter, defaults, etc. GenericActivity, InvokeWebServiceActivity and InvokeSchedule implement this interface.

Using IExtenderProvider

This is yet another technique for introducing design time properties to a component. The extension class RulePropertyProviderExtender provides rule properties to the ServiceDesigner. Properties are added by decorating the extender class via ProvidePropertyAttribute, implementing getter and setter for the attribute, and adding the extender class to a IExtenderProviderService class (in our case, implemented by RulePropertyProviderExtender) that is accessible through the site of the component (Schedule.Site)

Extensibility Support

The System.Workflow.ComponentModel.Design namespace provides various reusable classes for user to use in creating their own activity designers and plugging them into the orchestration engine designer. Following is the list of classes which user may use.
  ActivityDesigner: ActivityDesigner gives the user ability to add simple activities which do not have hierarchy of other activities under it. The user needs to inherit from this designer and may customize the bitmap, description and drawing.
  SequentialActivityDesigner: SequentialActivityDesigner allows the user to write a designer which may contain multiple activities in it. All of these activities are arranged sequentially and are linked using connector lines. User may derive from this class and provide custom coloring, description, icon etc.
  ParallelActivityDesigner: ParallelActivityDesigner enables user to write activity designer which may have multiple composite activities in it, arranged in parallel fashion. This class also enables the user to customize description, icon, colors, etc. This class is extensible thru inheritance.
  OrchestrationEngineToolboxItem: OrchestrationEngineToolboxItem allows the user to create a custom toolbox item. This class gives user an ability to control serialization. The class provides hooks using which the user may popup custom UI when an activity is added in the designer. The user may reuse this class through inheritance. The user needs to provide the toolbox item by using the ToolBoxItem attribute.
  TypeBrowserEditor: The TypeBrowserEditor allows the user to browse the types available in the designer. This class is used by associating it with a property which is of type System.Type. The user uses UITypeEditor attribute to associate this class with a property.
  TypeConverter classes: the orchestration engine component model provides various type converters which allow the user to define their own type converters. All the type converters may be used by extending them through inheritance.
  DesignerGlyph: Designer Glyph class may be used by the user to draw custom glyphs on top of the designers. The may want to display certain visual glyphs which need drawing at the top most Z order. The DesignerGlyph class may be used to draw such glyphs. This class may be used by extending it through inheritance.
  DesignerAction: User may associate DesignerActions with DesignerGlyphs. The actions are shown when the user clicks on the DesignerGlyphs. Custom designer actions may be created by inheriting from DesignerAction class.

APPENDIX C

Semantic Validation of Activities

These exemplary validation checks are common to multiple activities developed by the orchestration engine.

All Activities
  The ID property of an activity must be a valid identifier in the language of the project (C# or VB).
  The ID of a non-Scope activity must be unique within the containing Scope. The ID of a Scope activity must be unique across all Scopes.

Any properties that are variables must be set to a variable that is visible—e.g., it is defined in the Scope of the activity or in a containing Scope and must be public.

Code-Beside Handlers

The ID property of an activity must be a valid identifier in the language of the project (C# or VB).

The Handler must exist in the code-beside scope class of the activity containing the Handler and must have a matching method signature.

Messages

The parametric type T of OEMessage<T> must be serializable.

Correlations

The parametric type T of OECorrelation<T> must implement IComparable.

Rules

The Handler of the Rule must pass handler validations. The signature of the handler is defined by the type of Rule.

Activity-Specific Validation Checks

These exemplary validation checks are specific to an activity type.

Code

The UserCodeHandler property must be specified and must have signature void Method( ).

Compensate

A Compensate activity may appear only inside an ExceptionHandler activity or a Compensation activity of a Scope with TransactionType not None.

If CompensateScope is True, then the Scope property must be set to a Scope activity which is either an immediate child of the Scope from where the Compensate is emanating or itself.

If CompensateScope is False, then the Invoke property must be set to a CompositeSchedule activity which is an immediate child of the Scope from where the Compensate is emanating.

Conditional

A Conditional activity must have at least one child.

Only ConditionalBranch activities are allowed as children.

ConditionalBranch

The parent activity must be Conditional.

Unless the ConditionalBranch is the last child of its parent, the Rule property must be specified.

ConstrainedActivityGroup

The CompletionRule property must be set to a valid Rule.

Only Constrained activities are allowed as children.

Constrained

The parent activity must be ConstrainedActivityGroup.

A Constrained must have exactly one child.

The DisableRule and EnableRules, if specified, must be valid.

Delay

The TimeoutProvider property must be set to a valid Handler.

EventHandlers

The parent must be a Scope activity.

Only EventDriven activities are allowed as children.

If the first child of any child EventDriven activity is a Receive with Activation set to True, then all child EventHandlers must have as first child a Receive with Activation set to True.

Only one child EventDriven activity may have a Delay activity as its first child.

EventDriven

The parent must be a Listen activity or an EventHandlers activity.

The first child must be either a Delay or a Receive activity.

At least one child activity must be present.

Fault

The ExeceptionProvider property must be set to a valid Handler with the signature System.Exception Method( ).

A Fault activity cannot be nested inside a Scope activity with TransactionType set to Atomic.

InvokeSchedule

The type of the invokee must derive from InvokeSchedule and must have the default constructor.

Any public property of the invokee that has the InAttribute, OutAttribute or OptionalAttribute may be assigned to with visible variables of assignable types.

If the ExecutionMethod property is set to Exec, properties with the OutAttribute but not the InAttribute cannot be assigned to.

If the ExecutionMethod property is set to Exec, the variables must be serializable.

A Channel or a Correlation cannot be assigned to a property with the OutAttribute.

Recursive invokes are not allowed.

InvokeWebService

The ProxyClassName property must be set to a valid proxy class.

The MethodName property must be set to a web method in the proxy class.

All parameters to the web method must be specified and visible and their types must be assignable. Further, for any out/ref parameters and the return value, the parameters specified must not be read only.

Listen

Only EventDriven activities are allowed as children.

At least two children must be present.

If the first child of any child EventDriven activity is a Receive with Activation set to True, then all child EventDriven activities must have as first child a Receive with Activation set to True, or a Delay activity.

Only one child EventDriven activity may have a Delay activity as its first child.

Parallel

Only Sequence activities are allowed as children.

At least two children must be present.

If the first child of any child Sequence activity is a Receive with Activation set to True, then all child Sequence activities must have as first child a Receive with Activation set to True.

Receive

The Message property must be set and valid.

If the HasTypedChannel property is True, the TypedChannel property must be set and valid—a visible variable of type OEInboundChannel<T> where T is an interface.

If the HasTypedChannel property is True, the Operation of the TypedChannel must be a method from the interface which has a signature void Method(Type parameter).

If the HasTypedChannel property is True, the Type of the Message must be assignable from the Type of the Operation's parameter.

If the HasTypedChannel property is False, the UntypedChannel property must be set and valid—a visible variable of type InboundChannel.

If the Activation property is True, the Receive must be the first executable statement in the Schedule and may only have Sequence, Parallel, EventDriven, Listen, Scope or Schedule activities as ancestors.

If the Activation property is True, the Schedule must not have the CompileAs property set to Activity.

If the Activation property is True, the Receive must not be nested inside a Compensation or an ExceptionHandler or a While activity.

If the Activation property is False, the Receive must follow at least one Correlation.

A Correlation may be specified at most once and cannot be initialized and followed at the same time.

The OnAfterReceive handler if set must have a signature void Method( ).

ReceiveRequest

The Operation of the TypedChannel property (if it needs to be set) must have the signature ReturnType Method (Type parameter).

ReceiveResponse

The Operation of the TypedChannel property (if it needs to be set) must have the signature ReturnType Method (Type parameter).

The ReturnType of the Operation must be assignable from the Type of the Message.

The SendRequest property must be the qualified name of a valid SendRequest activity.

The SendRequest activity must occur before the ReceiveResponse.

The SendRequest and the ReceiveResponse activities must not be nested inside the same Atomic Scope.

The ReceiveResponseActivity cannot follow a Correlation.

Send

The Message property must be set and valid.

If the HasTypedChannel property is True, the TypedChannel property must be set and valid—a visible variable of type OEOutboundChannel<T> where T is an interface.

If the HasTypedChannel property is True, the Operation of the TypedChannel must be a method from the interface which has a signature void Method(Type parameter).

If the HasTypedChannel property is True, the Type of the Operation's parameter must be assignable from the Type of the Message.

If the HasTypedChannel property is False, the UntypedChannel property must be set and valid—a visible variable of type OutboundChannel.

A Correlation may be specified at most once and cannot be initialized and followed at the same time.

The OnBeforeSend handler if set must have a signature void Method( ).

SendRequest

The Operation of the TypedChannel property (if it needs to be set) must have the signature ReturnType Method (Type parameter).

SendResponse

The Operation of the TypedChannel property (if it needs to be set) must have the signature ReturnType Method (Type parameter).

The ReturnType of the Operation must be assignable from the Type of the Message.

The ReceiveRequest property must be the qualified name of a valid ReceiveRequest activity.

The ReceiveRequest activity must occur before the SendResponse.

The SendResponseActivity cannot follow a Correlation.

Scope

A Scope activity with the Synchronized set to True cannot be nested inside another Scope activity with Synchronized set to True.

A Scope activity with TransactionType Atomic cannot be nested within an ExceptionHandler activity.

A Scope activity with TransactionType Atomic or LongRunning must be nested within a Scope activity with TransactionType as LongRunning (unless the Scope is the Schedule).

If the TransactionType is Atomic, the Synchronized property must be True.

If the TransactionType is Long Running, the TimeoutProvider handler must be set with a signature System.DateTime Method( ).

Schedule

The code beside class must have exactly one constructor.

Sequence

No validations.

Suspend

A Suspend activity cannot be nested inside a Scope with TransactionType set to Atomic.

The ErrorString property must be a valid string.

Terminate

The ErrorString property must be a valid string.

While

The ConditionalRule property must be a valid Rule.

Correlation Set and Convoy Validation Checks

These exemplary validation checks are specific to correlation sets and convoy scenarios.

A Correlation must be initialized before it may be followed.

A Correlation may be initialized at most once with some exceptions.

A Send that initializes a correlation and a Receive that follows it reside in the same Atomic Scope.

Detection of sequential convoys.

Detection and validation of parallel convoys:

All Receive activities in a parallel convoy must initialize the same set of Correlations.

All non-activation Receive activities in a parallel convoy must follow the same set of Correlations.

An activation Receive in a Parallel must initialize a Correlation.

If an activation Receive is the first executable non-composite activity (e.g., ignoring Scopes, Parallels, Listens, etc.) in the workflow and its ancestor is a Parallel or a Listen, then all the branches of the Parallel or Listen must have an activation receive as its first executable activity.

APPENDIX D

Exemplary Namespace APIs

A System.Workflow.ComponentModel namespace contains the implementation of standard Workflow Activities. An Activity object model provides APIs to author an orchestration program. In addition, every object in the declaration object model has inheritance which makes it possible to associate design time behavior with the component. Following is an example of representing an orchestration program which receives a message and sends it using the declaration object model.

```
service Service1
{
    message msg1;
    port    port1;
    port    port2;
    receive(port1, msg1);
    send(port2, msg1);
}
```

The corresponding Authoring APIs to construct such a service include:

```
// declare a service with name "Service 1"
Scheduel schedule = new Schedule ("Service1");
schedule.TransactionType = TransactionType.Atomic;
// declare receive with name "receive1" and which uses port "port1" and
message "msg1"
Receive receive1 = new Receive ("receive1");
receive1.Port = "port1";
receive1.Message = "msg1";
schedule.AddActivity(receive1);
// declare send with name "send1" and which uses port "port2" and
message "msg1"
Send send1 = new Send ("send1");
send1.Port = "port2";
send1.Message = "msg1";
schedule.AddActivity(send1);
// give external user code to the service declaration
serviceDeclaration.ExternalUserCode = "<some external user code, in
which user has declared 'port1', 'port2' and 'msg1' variables.>";
```

The following table briefly describes the description and uses of this namespace.

TABLE B1

System.Workflow.Component Model Namespace.Model

| | |
|---|---|
| Namespace | System.Workflow.ComponentModel |
| Description | This namespace contains implementation of all the standard workflow Activities. All the Activities defined in this namespace are supported by workflow runtime. Also this namespace defines interfaces and protocols to write custom Activities. |
| Uses | To programmatically create Schedules, serialize/deserialize them to/from xoml file. |
| | To compile the schedules and generate run-time executable code. |
| | To write custom designers on top of this object model. |
| | To write custom activities, their serialization and compilation routines. |
| Binary | System.Workflow.ComponentModel.dll |

The Workflow component model is a hierarchical declaration object model. The root of the object model is Schedule. This object model is used by tools writers as well as run-time execution. Every activity in the component model is represented by IActivity interface. IActivity interface inherits from IComponent. IComponent has a Site property which allows the activity to communicate at design time. This object model may be extended by third party activity writers. Activities may be categorized as following:

1) Primitive Activity: a primitive activity has no child activities and it includes a flat list of properties.
2) Composite Activity: a composite activity inherits from a primitive activity and keeps a list of child activities.

In addition to Primitive and Composite activity categorization above, Scope and Schedule activities are treated differently. Scope and Schedule have a corresponding User Code class associated with them. Along with all the Activities, this namespace also provides following features: Serialization and Deserialization from/to xoml files, Compilation of Schedule activity, and Validation implementation on each Activity.

The IActivity interface inherits from IComponent.

```
public interface IActivity: IComponent
{
//This is the unique identifier of an activity with in its parent scope.
//Across scopes this id may have duplicate values. To identify activities across scopes a
scope //qualified name must be used. Also for Scope and Schedule this property tells
the name of //the user code class they work with.
string          ID              { get; set; }
//This property returns the qualified ID of the activity. Qualified ID of the activity is
//ParentScope ID combined with a "." And the activity ID.
string          QualifiedID     { get; }
//This a get set property used to hold description about an activity in the process.
String          Description     { get; set; }
//This is a get set property to comment or uncomment an activity. If an activity is
commented //then it does not participate in the execution and validation checks
bool            Commented       { get; set; }
//This is a get property which tells if an activity is instantiated for RuntimeMode
Usually when //activity graph is instantiated for run-time mode activities makes all of
their properties read-//only so that user will not be able to change them.
bool            IsRuntimeMode { get; }
//This method returns the state of an activity at run-time time. Because the multiple
//orchestration instances share the same activity tree, this method takes the pointer to the
//instance of the orchestration, based on that the IActivityState interface will be returned
```

```
                            -continued for //that particular activity and the instance. The IActivityState interface provides a
way to get //the Status and Outcome properties.
IActivityState    GetState(object scopeBoundObject);
//The purpose of this property is to allow programmatically associate some custom data
with //the activity. This is to be used for programming against activity DOM.
IDictionary       UserData        { get; }
//This property tells the parent activity of this activity.
ICompositeActivity Parent         { get; set; }
//This property tells the parent scope of the activity. This property walks
//through all the parents, till you get a scope. Also please note that the ParentScope of
an //scope returns the parent scope only.
IScope            ParentScope     { get; }
//This function is used to validate the activity. It is passed in a context in the form of
//IServiceProvider, from which the activity writers may get different services to validate
the //contents of activity. Currently this function is called from Xoml compiler and as
well as //designer. Two services include 1) ITypeProvider 2) //IEnvironmentService.
IValidationError[ ]   Validate(IServiceProvider context);
}
```

Following is the definition of IValidationError. This error is returned on calling Validate on the activity.

```
public interface IValidationError
{
//Error text returns the description of error.
string ErrorText     { get; }
//The purpose of this property is to allow programmatically associate some
custom data with //the error. For an example the 'typeof(string)' key in
this property should keep the name of //the property.
IDictionary UserData    { get; }
}
```

Every composite activity inherits from ICompositeActivity. CompositeActivity has additional properties "Activities" and ExecutableActivities in compare to Primitive activity. Following is the interface definition of ICompositeActivity.

```
public interface ICompositeActivity: IActivity
{
    // This property is used to get all the child activities. Please note that
    // this returs IItemList of activities instead of IList of activities.
    IItemList
    // is an interface defined in activity DOM, which has an extra event
    // to notify when an activity is added ot removed from the list.
    IActivityCollection Activities { get; }
    // Execuable activities returns the collection of non-commented activi-
    ties. This
    // property only returns a readonly collection of activities. If the user
wants to change,
    // add or delete activities, then "Activities" collection should be used.
    IList<IActivity> ExecutableActivities { get; }
}
```

IActivityCollection inherits from IList, it has one additional event about modifications to the list and couple of more methods related to dynamic update of collection in runtime mode.

```
public interface IActivityCollection<T> : IList<T>
{
//Only event which is fired when some item is added, removed or
replaced from this list.
event ItemListChangeHandler<T> ListChanged;
//Indexer property to get to an activity based on the ID property of
```

```
                            -continued the activity
IActivity this[string key] { get;}
//Method to dynamically change the activities collection at run-time.
These methods takes the //pointer to an ScopeBoundObject (the
instance to which the modifications are getting applied).
//To Add activity
void Add(object scope, IActivity activity);
//To Add activity range
void AddRange(object scope, ICollection<IActivity> activities);
//To remove an activity
void Remove(object scope, IActivity activity);
//To replace an activity
void Replace(object scope, IActivity replaceThis, IActivity withThis);
}
```

Run-Time Value Provider

The value of the activity properties are constants or pointers to a variable or method in the code-beside file. For an example, Message property on Send activity points to a member variable in the code beside file, also the ErrorString property of Terminate activity might want to keep the actual string in the literal form or it might want to point to an variable in the code beside file. From the run-time perspective, it only cares only about getting a value for the property, this could be either a literal from which the value is retrieved or a variable in the code beside file.

```
public abstract class RuntimeValueProvider
{
// This property get the type of the value which this object will return.
Type RuntimeType      { get; }
// This method is used to retrieve the value of a property at run-time.
object GetValue(object scopeBoundObject);
}
```

In one embodiment, there are two different kinds of value providers, 1) Literal Declaration 2) Member Declaration.

MemberDeclaration

These objects represent a variable or method name in user code file of a particular run-time type. For an example, the Message property on the Send points to a variable in user code beside file, which must be of type "System.Workflow.Runtime.OEMessage<T>". Such a property is of type 'string', and the value of it is the name of the variable. Non-Activity classes have some meta data associated with them in addition to the string value. For example, these may tell what run-time type these variable should refer to etc.

```
public class MemberDeclaration
{
// The name property points to member variable or method in the code
beside file. The name // may be Scope qualified.
string Name             { get; set; }
// This property stores the type of the variable or handler declaration in
the code beside
file. Type    RuntimeType        { get; set; }
// This property only gets a value at run-time, it will only get value
when the object of this class is instantiated for run-time mode.
Scope Scope             { get; }
// This property tells that if the object is been instantiated for
run-time uses.
bool    IsRuntimeMode       { get; }
// The validate method validates this object and returns collection
of validation errors. It passed in the activity of which this object is
part of and the name of the parent property.
IValidationError[ ] Validate(IServiceProvider serviceProvider,
        IActivity activity, string parentPropName);
}
```

There are two main inheritance branches from MemberDeclaration: 1) VariableDeclaration 2) HandlerDeclaration. VariableDeclaration is used to refer to a variable in the user code beside file, and HandlerDeclaration is used to refer to a method in the user code beside file. VariableDeclWithOneArg inherits from variableDecl and is used to refer to a variable in the user code beside file, whose runtime type is generic type with one argument.

Also there is a lot of design time functionality associated with these declaration classes. For an example, using VariableDeclaration as a property type for your activity automatically gives a combo box in the property browser window to list all the variables in the code beside file of a particular runtime type. Also these classes have functions to do semantic checks. For an example, HandlerDeclaration checks if the method name is valid, if the method exists in the user code file, and if the signature of the method matches that identified by the runtime type property.

Variable Declaration

VariableDeclaration inherits from MemberDeclaration and stores the name of the variable in the code beside file. It has three additional methods at run-time mode:

```
public class VariableDeclaration: MemberDeclaration
{
...
// The FieldInfo object which will be pointing to the variable in the code
beside file at run-time.
public FieldInfo FieldInfo { get; }
// Method to get the value of the variable at run-time for a particular
instance of the schedule
public object GetRuntimeValue(object scopeObj);
// Method to set the value of the variable at run-time for a particular
instance of the schedule
public void SetRuntimeValue(object scopeObj, object value);
}
```

TypedVariableDeclaration inherits from VariableDeclaration and makes the run-time type property read-only.

Handler Declaration

HandlerDeclaration inherits from MemberDeclaration and points to a method name in the code beside file. It has one additional method at run-time which returns the delegate object which will be pointing to method in the code beside class.

TypedHandlerDeclaration inherits from HandlerDeclaration and it makes the run-time type property to be read-only.

Literal Declaration

The LiteralDeclaration object contains a literal value instead of pointing to a variable in the code beside file. Following is the definition of the class.

```
public class LiteralDeclaration : RuntimeValueProvider
{
// This property is used to get or set the literal value.
string LiteralValue { get; set;}
}
```

Rule Declaration

Rules are used in business processes to dynamically change the behavior of an orchestration. The Workflow component model defines a way to plug in arbitrary rules technology. To implement a custom rules technology, one has to define a class which inherits from RuleDeclaration. It has abstract methods to validate the rule and to inform inherited classes about the run-time initialize mode. The custom rule technology provider inherits from the RuleDeclaration class and overrides these methods. Also, it provides additional properties which are used to define a rule definition.

Currently the workflow component model has two RuleDeclarations classes, one is the Code based rule declaration, which has a Boolean handler method associated therewith to evaluate the rule and return a true or false value. Another technology is BRE based rule declaration, which provides an object model to define the rule. The run-time counterpart of the rule declarations classes is the RuleEvaluator. Workflow engine looks for RuleEvaluator attribute on the RuleDeclaration class. This attributes tells the name of the Type which implements the IRuleEvaluator interface. The IRuleEvaulator interface has only one method Evaluate( ) which returns a Boolean value.

Runtime Mode

The same activity graph which is used to author an orchestration program at design time is also instantiated at run-time. At run-time the workflow engine calls the root object of the activity graph to execute itself, which in turn calls its children activities to execute themselves and so on the children activities which are composite activities ask their children activities to execute themselves. When the activity graph is instantiated for run-time uses, then the activities do not allow changing their properties.

An activity may know about the run-time initialization by overriding OnRuntimeInitialized( ) method, which is an protected method defined in the Activity class. Activities may do custom run-time specific initialization in this method. Usually on run-time instantiation of activities, they resolve their stringified information into actual run-time type information. For an example a InvokeWebService activity keeps the name of the proxy class in the string form at design time, when the invoke web service is instantiated for run-time it resolves the proxy class name into the actual System.Type object.

Workflow engine only keeps one activity graph for multiple instances of the running orchestrations. The GetState (object scopeBoundObject) method on the activity returns IActivityState for a particular instance of the orchestration. Using IActivityState interface one may get the Status and Outcome property of an activity.

```
public interface IActivityState
{
//To get the status of an activity. At run-time execution mode the activity
goes through
//multiple state transitions ex. Enabled, Executed, Completed, Closed,
Cancelled. The status //property tells the exact current state of the activity.
Status Status        { get; }
//Workflow engine keeps the Outcome of an activity's execution. If the
activity
//execution gets cancelled then the Outcome would be cancelled, if the
activity
//execution throws an exception then the Outcome would be Failed other
wise if activity
//got completed and closed then the Outcome would be Succeeded.
Outcome Outcome    { get; }
}
```

Parallel to run-time instantiation of the activities the non-activities declarations are also instantiated for run-time mode. For an example a VariableDeclaration whose name is "art" and run-time type is "System.String", will have a System.Reflection.FieldInfo object at the time of run-time instantiation, which will be pointing to "Art" variable in the code beside file. The properties of the activity which are of type Variable-Declarations or HandlerDeclarations may also override OnRuntimeInitialized( ) to get informed about the run-time mode. The 'Scope' property on MemberDeclaration will be initialized with the Scope object to which the Member belongs to. Also the GetRuntimeValue( ) and SetRuntimeValue( ) methods on VariableDeclaration and HandlerDeclaration starts returning the value of the variable or method for a particular instance of the schedule.

Writing Custom Activity

To write a custom activity, the activity class inherits from either ActivitDecl or CompositeActivityDecl. To support custom serialization of the activity, a SerializerAttribute has been added to the activity class. A designer attribute associates a designer with the activity. Here is a sample activity code:

```
[ToolboxItem(typeof(WorkflowToolboxItem))]
[Designer(typeof(FooActivityDesigner), typeof(IDesigner))]
[ActivityExecutor(typeof(FooExecutor))]
public sealed class FooActivity: Activity
{
    public FooActivity ( )
    {
    }
    private string foo = string.Empty;
    public string Foo
    {
        get
        {
            return this.foo;
        }
        set
        {
            this.foo = value;
        }
    }
}
```

Sample Program to Use Component Model

Following is a sample code to program against Component model. Schedule is the root of object model This sample create a new Schedule enumeration is used to tell the reason for changes into the item list.

```
// create schedule
Schedule schedule = new Schedule( );
schedule.NamespaceName = "SampleUserCode";
schedule.ID = "MySchedule";
// create a scope
Scope scope = new Scope( );
scope.ID = "MyScope";
schedule.Activities.Add(scope);
// create a send activity which will send something out
Send send1 = new Send( );
send1.ID = "send1";
send1.Message.Name = "msg1";
send1.Message.Type = typeof(System.String).FullName;
send1.HasTypedChannel = true;
send1.TypedChannel.Name = "port1";
send1.TypedChannel.Type = typeof(SampleUserCode.IFoo).FullName;
send1.TypedChannel.Operation = "Foo";
scope.Activities.Add(send1);
// create a delay activity which will put a delay in schedule execution.
DelayDecl delay1 = new DelayDecl( );
delay1.ID = "delay1";
delay1.TimeoutProvider.Name = "delay1_TimeoutProvider";
schedule.Activities.Add(delay1);
// create a receive activity
Receive receive1 = new Receive( );
receive1.ID = "receive1";
receive1.Message.Name = "msg2";
receive1.Message.Type = typeof(string).FullName;
receive1.HasTypedChannel = true;
receive1.TypedChannel.Name = "port2";
receive1.TypedChannel.Type = typeof(SampleUserCode.IFoo).FullName;
receive1.TypedChannel.Operation = "Foo";
scope.Activities.Add(receive1);
```

Xoml Compiler

The Xoml compiler is used to compile Xoml files and generate run-time code for it. Errors given by Xoml compiler are presented by XomlCompilerError. Also the compiler takes XomlCompilerParameter as input. The compiler results are given out by XomlCompilerResults.

Xoml compiler deserializes the xoml file and then walks through the activity graph. It asks each activity to validate itself in a given context. If an activity wants to participate in validation then it inherits from IActivityValidator. If there are no validation errors given by any activity then it asks each activity to generate code for itself. If an activity wants to participate in code generation then it inherits from IActivityCodeGenerator.

XomlCompiler Class

Xoml compilation is different from many other language compilers. Xoml compiler takes xoml files, user-code files as inputs and generates run-time process code. Following are the steps involved in XomlCompilation:

1) Deserialize all the Xoml files and create an activity graph out of it.
2) Based on the assembly references, user code files and code compile units passed to the compiler, in form of parameters, create a TypeProvider component.
3) Walk through the activity graph of each individual xoml file and call validate on them.
4) If there are no validation errors, then call IActivityCodeGeenrator.GenerateCode on top most activity for each xoml activity graph, which will generate CodeStatementCollection.
5) Either give out a CodeCompileUnit of the process code generated or compile the process code with the passed in user code and build an assembly using C# or VB compiler.

Following are the public methods available on XomlCompiler.

```
public class XomlCompiler
{
XomlCompilerResults CompileFromDom(XomlCompilerParameters
parameters, Schedule scheduleDecl);
XomlCompilerResults CompileFromDomBatch(XomlCompilerParameters
parameters, Schedule[ ] scheduleDecls);
XomlCompilerResults CompileFromFile(XomlCompilerParameters
parameters, string file);
XomlCompilerResults CompileFromFileBatch(XomlCompilerParameters
parameters, string[ ] files);
XomlCompilerResults
CompileFromSource(XomlCompilerParameters parameters,
string xomlSource);
XomlCompilerResults
CompileFromSourceBatch(XomlCompilerParameters parameters,
string[ ] xomlSources);
void GenerateSkeletonCompanionCode(Schedule schedule,
SupportedLanguages language, System.IO.TextWriter writer);
void GenerateSkeletonCompanionCode(string file, SupportedLanguages
language, System.IO.TextWriter writer);
}
```

CompileFromDom Method

XomlCompilerResults CompileFromDom(XomlCompilerParameters parameters, Schedule[] scheduleDecl);

CompileFromDom only takes a single Schedule as input parameter and compile it to generate process code. This function facilitates the user who wants to compile one schedule at a time. This function internally calls CompileFromDomBatch.

CompileFromDomBatch Method

XomlCompilerResults CompileFromDomBatch(XomlCompilerParameters parameters, Schedule[] scheduleDecls);

CompileFromDomBatch takes multiple Schedule as input parameter and compile them to generate process code.

CompileFromFile Method

XomlCompilerResults CompileFromFile(XomlCompilerParameters parameters, string file);

CompileFromFile takes a single xoml file as input parameter. The second parameter is treated as path to xoml file. This function facilitates the user who wants to compile one xoml file at a time. This function internally calls CompileFromFileBatch.

CompileFromFileBatch Method

XomlCompilerResults CompileFromFileBatch(XomlCompilerParameters parameters, string[] files);

CompileFromFileBatch takes multiple xoml files as input and compiles them to generate process code. The second parameter is an array of paths to xoml files. This function deserializes all the xoml files. If a XOML file could not be deserialized then it adds the SerializationError to the Errors collection in Compiler Results. It calls the CompileFromDomBatch function to do the compilation.

CompileFromSource Method

XomlCompilerResults CompileFromSource(XomlCompilerParameters parameters, string xomlSource);

CompileFromSource takes text of Xoml file as input parameter and compiles it to generate process code. This function calls the CompileFromSourceBatch to perform the actual compilation.

CompileFromSourceBatch Method

XomlCompilerResults CompileFromSourceBatch(XomlCompilerParameters parameters, string[] xomlSources);

CompileFromSourceBatch takes multiple sources of xoml files as input parameters and compiles them to generate process code. It deserialize the sources to get the activity DOM. If there are deserialization errors, then it converts those errors into XomlCompileError and reports them through XomlCompilerResults.

GenerateSkeletonCompanion Method void GenerateSkeletonCompanionCode(Schedule schedule, SupportedLanguages language, System.IO.TextWriter writer);

This function is used to generate skeleton user Code beside file based on the handler, variable names used in the activity dom. This function walks through the activity graph and generates template code for scopes, variables and handlers. The second parameter tells the language which needs to be used to generate code. Third parameter is a text writer, which hold buffer on which the generated code will be written.

void GenerateSkeletonCompanionCode(string file, SupportedLanguages language, System.IO.TextWriter writer);

This function takes the xoml file path as an input parameter. This function deserializes the xoml file and calls the earlier function.

XomlCompilerParameters

XomlCompilerParameters has properties to pass in the user code to the compiler. Following is the public interface for XomlCompilerParameter.

```
public class XomlCompilerParameters : CompilerParameters
{
bool GenerateCodeCompileUnitOnly { get; set; }
bool GenerateDebugCode { get; set; }
SupportedLanguages LanguageToUse { get; set; }
StringCollection LibraryPaths { get; }
IServiceProvider ServiceProvider { get; set; }
IList<CodeCompileUnit> UserCodeCompileUnits { get; }
StringCollection UserCodeFiles { get; }
}
```

GenerateCodeCompileUnitOnly Property bool GenerateCodeCompileUnitOnly {get; set;}

This flag is used to tell the compiler that the user is only interested in generating CodeCompileUnit and not the executable or dll. In this case compiler does not call C# or VB compiler to generate code.

GenerateDebugCode Property bool GenerateDebugCode {get; set;}

This flag is used to tell if debug code should be used or not.

LanguageToUse Property

SupportedLanguages LanguageToUse {get; set;}

There are at least two languages supported: VB and CSharp. Compiler needs to know the language to use, because it has many validations based on the language.

LibraryPaths Property

StringCollection LibraryPaths {get;}

This is the collection of directory names under which compiler will probe for referenced assemblies. Please note that the compiler also adds some standard library paths to this collection for resolving assembly references. This behavior is similar to CSharp and VB compiler.

ServiceProvider Property

IServiceProvider ServiceProvider {get; set;}

This property is only used when the compiler is invoked from a project system. The purpose of this property is to achieve performance when the compile is invoked from project system. As project system has a TypeProvider created on a per project basis, the compiler uses the same TypeProvider. This increases the performance of the compiler significantly when invoked from project system.

UserCodeCompileUnits Property

IList<CodeCompileUnit> UserCodeCompileUnits {get;}

This property is used to pass in the Code compile units of the user code beside file to the Compiler.

UserCodeFiles Property

StringCollection UserCodeFiles {get;}

This property is used to pass file paths of the user code beside file to Compiler.

XomlCompilerResults

XomlCompilerResults has a property to retrieve CodeCompileUnit of the generated process code. Following is the public interface of XomlCompilerResults:

```
public class XomlCompilerResults : CompilerResults
{
    CodeCompileUnit CompiledUnit { get; set; }
}
```

The Compiled Unit property gives access to the process code.

XomlCompilerError

XomlCompilerError has a method to get the UserData property, which is of Dictionary type. A purpose of this property is to insert extra details about the error. For an example, if one of the property validations failed on an activity, will have a property name with typeof(string) as the key to dictionary. Following is the public interface exposed by this class:

```
public class XomlCompilerError : CompilerError
{
    System.Collections.IDictionary UserData { get; }
}
```

XomlCompilerError also implements IWorkflowError interface, the purpose of this interface is to provide COM inter-operability for errors. Following is the definition of IWorkflowError interface:

```
public interface IWorkflowError
{
    String   Document    { get; }
    bool     IsWarning   { get; }
    String   Text        { get; }
    String   ErrorNumber { get; }
    int      LineNumber  { get; }
    int      ColumnNumber{ get; }
}
```

The properties are mapped to the properties of CompileError class defined in System.CodeDom.

Validation Infrastructure

Every activity inherits from IActivity which has a Validate method. Validate methods take an IServiceProvider. For an example, ITypeProvider determines whether a type name which is an activity's property may be resolved into an actual type or not. The validate method returns a collection of IValidationError. Following is the signature of Validate method:

IValidationError[] Validate(IServiceProvider context);

Following are the public method available on IValidationError:

```
public intertace IValidationError
{
    string       ErrorText   { get; }
    IDictionary  UserData    { get; }
}
```

Sample Validation Routine:

The following is an example of DelayDecl activity's validation routine. Delay wants to validate that the TimeoutProvider handler is actually not null and the method name exists in the parent scope class.

```
public override IValidationError[ ] Validate(IServiceProvider context)
{
ArrayList validationErrors = new ArrayList(base.Validate(context));
// validate TimeoutProvider property
validationErrors.AddRange(this.TimeoutProvider.Validate(context, this,
"TimeoutProvider"));
return (IValidationError[ ])validationErrors.
ToArray(typeof(IValidationError));
}
```

And following is the validation routine of HandlerDeclaration:

```
public override IValidationError[ ] Validate(IServiceProvider context,
IActivity activityDecl, string propName)
{if (context == null) throw new ArgumentNullException("context");
if (activityDecl == null) throw new
ArgumentNullException("activityDecl");
ArrayList validationErrors = new ArrayList( );
string message = string.Empty;
if (this.Name == null || this.Name.Length == 0)
{message = SR.GetString(SR.Error_PropertyNotSet, propName);}
else
{ string methodName = string.Empty;
   Type resolvedType = XomlValidationHelper.ParseInputName(con-
      text, activityDecl, this.Name, out methodName);
   if (resolvedType == null)
   {message = SR.GetString(SR.Error_TypeNotResolvedInMethodName,
propName);}
   else
   {// get the invoke method
      MethodInfo invokeMethod = this.RuntimeType.GetMeth-
         od("Invoke");
      if (invokeMethod == null)
         throw new
         Exception(SR.GetString(SR.Error_DelegateNoInvoke,
         this.RuntimeType.FullName));
      // resolve the method
      List<Type> paramTypes = new List<Type>( );
      foreach (ParameterInfo paramInfo in invokeMethod.GetParameters( ))
         paramTypes.Add(paramInfo.ParameterType);
      BindingFlags bindingFlags = BindingFlags.Public |
      BindingFlags.Instance | BindingFlags.NonPublic | BindingFlags.Stat-
ic;
      MethodInfo methodInfo = resolvedType.GetMethod(methodName,
```

-continued

```
bindingFlags, null, paramTypes.ToArray, null);
    if (methodInfo == null)
    {if (resolvedType.GetMethod(methodName, bindingFlags) != null)
        message=SR.GetString(SR.Error_MethodSignatureMismatch,
            propName);
        else message = SR.GetString(SR.Error_MethodNotExists,
propName, methodName);}
        else if (!invokeMethod.ReturnType.Equals(methodInfo.ReturnType))
    {message = SR.GetString(SR.Error_MethodReturnTypeMismatch,
propName, invokeMethod.ReturnType.FullName);}}}
IValidationError error = null;
if (message.Length > 0)
{  error = new ValidationError(message);
    error.UserData[typeof(string)] = propName;
    validationErrors.Add(error);}
return (IValidationError[ ])validationErrors.ToArray(typeof(IValida-
tionError));}
```

Runtime Code Generation

The Xoml compiler generates a Schedule class with the namespace as the NamespaceName property on the schedule and class name as ID property on the schedule. Then it serializes the Schedule object into a xoml string and annotates the schedule class with XomlAttribute on it, with the first parameters being the xoml string.

The following sample code creates a Schedule Decl object and also creates a CodeCompileUnit object which contains the user code. It also gives the Schedule object and the UserCode to Xoml compiler.

In particular, the following code creates a schedule.

```
Schedule schedule = new Schedule( );
schedule.NamespaceName = "SampleUserCode";
schedule.ID = "MySchedule";
Scope scope = new Scope( );
scope.ID = "MyScope";
schedule.Activities.Add(scope);
Send send1 = new Send( );
send1.ID = "send1";
send1.Message.Name = "msg1";
send1.Message.Type = typeof(System.String).FullName;
send1.HasTypedChannel = true;
send1.TypedChannel.Name = "port1";
send1.TypedChannel.Type = typeof(SampleUserCode.IFoo).FullName;
send1.TypedChannel.Operation = "Foo";
scope.Activities.Add(send1);
Receive receive1 = new Receive( );
receive1.ID = "receive1";
receive1.Message.Name = "msg2";
receive1.Message.Type = typeof(string).FullName;
receive1.HasTypedChannel = true;
receive1.TypedChannel.Name = "port2";
receive1.TypedChannel.Type = typeof(SampleUserCode.IFoo).FullName;
receive1.TypedChannel.Operation = "Foo";
scope.Activities.Add(receive1);
DelayDecl delay1 = new DelayDecl( );
delay1.ID = "delay1";
delay1.TimeoutProvider.Name = "delay1_TimeoutProvider";
schedule.Activities.Add(delay1);
```

The code below creates a code compile unit, adds a namespace, adds a MySchedule Class, and adds a delay method.

```
CodeCompileUnit ccu = new CodeCompileUnit( );
CodeNamespace sampleUserCode = new CodeNamespace("SampleUs-
erCode");
ccu.Namespaces.Add(sampleUserCode);
/*
public partial class MySchedule: Schedule
{
    public MySchedule( )
    {
    }
}
*/
CodeTypeDeclaration mySchedule = new CodeTypeDeclara-
tion("MySchedule");
mySchedule.BaseTypes.Add(new
CodeTypeReference("System.Workflow.Runtime.Schedule"));
mySchedule.IsClass = true;
mySchedule.PartialType = PartialType.Partial;
mySchedule.TypeAttributes = TypeAttributes.Public;
sampleUserCode.Types.Add(mySchedule);
/*
public System.DateTime delay1_TimeoutProvider( )
{
    return new System.DateTime( );
}
*/
CodeMemberMethod delayMethod = new CodeMemberMethod( );
delayMethod.Name = "delay1_TimeoutProvider";
delayMethod.Attributes = (MemberAttributes.Public | MemberAttri-
butes.Final);
delayMethod.ReturnType.BaseType = typeof(System.Date-
Time).FullName;
delayMethod.Statements.Add(new CodeMethodReturnStatement(new
CodeSnippetExpression("new System.DateTime( );")));
mySchedule.Members.Add(delayMethod);
```

The code shown below writes a MyScope class and adds a field.

```
/*
public partial class MyScope: Scope
{
}
*/
CodeTypeDeclaration myScope = new CodeTypeDeclara-
tion("MyScope");
myScope.BaseTypes.Add(new
CodeTypeReference("System.Workflow.Runtime.Scope"));
myScope.IsClass = true;
myScope.PartialType = PartialType.Partial;
myScope.TypeAttributes = TypeAttributes.Public;
sampleUserCode.Types.Add(myScope);
/*
public System.Workflow.Runtime.OEMessage<System.String> msg1;
public System.Workflow.Runtime.OEOutboundChannel<SampleUs-
erCode.IFoo> port1;
public System.Workflow.Runtime.OEMessage<System.String> msg2;
public System.Workflow.Runtime.OEInboundChannel<IFoo> port2;
*/
CodeMemberField msg1 = new
CodeMemberField("System.Workflow.Runtime.OEMessage<Syst-
em.String>", "msg1");
msg1.Attributes= MemberAttributes.Public;
myScope.Members.Add(msg1);
CodeMemberField port1 = new
CodeMemberField("System.Workflow.Runtime.OEOutboundChan-
nel<SampleUserCode.IFoo>", "port1");
port1.Attributes = MemberAttributes.Public;
myScope.Members.Add(port1);
CodeMemberField msg2 = new
CodeMemberField("System.Workflow.Runtime.OEMessage<Syst-
em.String>", "msg2");
msg2.Attributes = MemberAttributes.Public;
myScope.Members.Add(msg2);
CodeMemberField port2 = new
CodeMemberField("System.Workflow.Runtime.OEInboundChannel<Sam-
pleUserCode.IFoo>", "port2");
port2.Attributes = MemberAttributes.Public;
myScope.Members.Add(port2);
```

The code below generates the final C# code. In particular, the code combine the CCUs from the User code and the CCU of the XOML OM to generate the assembly.

```
XomlCompiler compiler=new XomlCompiler( );
XomlCompilerParameters parameters=new XomlCompil-
    erParameters( );
parameters.ReferencedAssemblies.Add(typeof(Sam-
    pleUserCode.IFoo).Assembly.Location);
parameters.UserCodeCompileUnits.Add(ccu);
parameters.OutputAssembly=@"c:\CreateAssembly-
    WithUserCodeInCodeDOM.dll";
XomlCompilerResults
    results=compiler.CompileFromDom(parameters,
    schedule);
```

Error Navigation Infrastructure

When the Xoml compiler is invoked, it returns the collection of IWorkflowError objects if there are any errors. For each IWorkflowError object, a task item is created. Following are the steps involved to navigate to the error on to the designer, when user double clicks the task item:

1) Each task item is associated with a IWorkflowError object.
2) On double clicking first, it gets the name of the file by calling IWorkflowError.Document property.
3) It asks the designer to Open the file and get the DocView object associated with it.
4) It looks IWorkflowErrorNavigator interface on to the DocView.
5) It calls IWorkflowErrorNavigator.Navigat( ) method, and passes the IWorkflowError as the first parameter.
6) IWorkflowErrorNavigator interface is implemented on the document view object. In the Navigate method's implementation, the editor tries to look for "typeof (IActivity)" object in the UserData property of IWorkflowError, if found it gets the scope qualified name of the activity and searches for the activity with the same name in the designer. If an activity is found it is focused. After that it looks for 'typeof(string)' key in the UserData property if found it assumes it should be the name of the property which needs to be focused, so it calls IExtUIService.NaviagteToProperty( ) method by passing property name as first argument.

Following is the interface definition of IWorkflowErrorNavigator.

```
internal interface IWorkflowErrorNavigator
{
    void NavigateToError([MarshalAs(UnmanagedType.IUnknown)]object
    obj);
}
```

Workflow Compiler Executable (aka WFC.EXE)

Wfc.exe is a product binary which is a command line version of XomlCompiler. This executable parses the command line arguments and fills up the XomlCompilerParameters structure.

Following are the definitions of the options which may be passed to the XomlCompiler.

```
wfc.exe <schedule>.xoml /target:codebeside [/language:...]
wfc.exe <schedule>.xoml /target:xomlclass [/language:...]
wfc.exe <schedule>.xoml /target:assembly [<codebeside>.cs]
```

```
[/language:...]
    [/out:...] [/reference:...] [/library:...] [/debug:...]
- OUTPUT FILE -
/out:<file>        Output file name
/target:assembly   Build a Workflow assembly (default).
/target:xomlclass  Generate partial class definition.
/target:codebeside Generate skeleton codebeside.
         - INPUT FILES -
<xoml file list>   Xoml source file name(s).
<vb/cs file list>  Codebeside file name(s).
/reference:<file list> Reference metadata from the specified assembly
file(s).
    Short form is '/r:'.
/library:<path list>   Set of directories where to lookup for the references.
    Short form is '/lib:'.
        - CODE GENERATION -
/debug:[yes|no]    Emit full debugging information. The default is 'yes'.
    Short form is '/d:'.
/skipvalidation[+|-]   Skip workflow validation.
/emitruntimecode[+|-]  Emit Runtime Code for the workflows.
        - LANGUAGE -
/language:[cs|vb]  The language to use for the generated class.
    The default is 'CS' (CSharp). Short form is '/l:'.
/rootnamespace:<string> Specifies the root Namespace for all type
declarations.
    Valid only for 'VB' (Visual Basic) language.
        - MISCELLANEOUS -
/help              Display usage message. Short form is '/?'.
/nologo            Suppress compiler copyright message. Short form is '/n'.
```

Type System

The Type system is an independent component in the designer. CodeCompileUnit and assemblies may be pushed to the type system. It loads the System.Type objects from an assembly reference and pushes them to the type tree. Also for each CodeTypeDeclaration object in CodeCompileUnit it creates DesignTimeType which inherits from System.Type and pushes them to the type tree. This way the types from the type system are exposed by a common abstract class System. Type. Like many other type systems, it creates a tree structure on loading types into it, which makes the type resolution very fast. Type system provides a user interface over the type tree to resolve types; also, it fires events to notify about changes in the type tree.

Following are the major components in the Type System:

1. TypeProvider: It has public methods to add/remove assembly references and CodeCompileUnit to the Type system. Also, it implements an interface which exposes the type tree to the user.
    a. TreeNode: Tree node is a general node in type tree. It keeps all the type definitions associated with it.
2. CodeDOMLoader: CodeDOM Loader loads all the types from Code Compile Unit and pushes them to the Type Tree. On disposing the CodeDOM loader it removes all the types which it added to type tree.
3. AssemblyLoader: Assembly loader loads all the types form an assembly and pushes all the types to the type tree. On disposing this it will remove all the types from type tree.
4. DesignTimeType: This class inherits from System.Type. It takes CodeTypeDeclaration CodeDOM construct as its constructor argument and implements all the properties and methods of System.Type class. Also following classes are used to convert from CodeTypeDeclaration to System.Type.
    a. DesignTimeMethodInfo: This class is used to implement all the members of Methodinfo based on the CodeMemberMethod.

i. DesignTimeParamterInfo: This class inherits from Parameterinfo and provides implementation based upon CodeParameterDeclarationExpression Code DOM construct.
b. DesignTimeEventInfo: this class is used to implement members of EventInfo based on CodeMemberEvent.
c. DesignTimeFieldInfo: This class inherits from FieldInfo and provides implementation of all the methods and properties based on CodeMemberField.
d. DesignTimePropertyInfo: this class inherits from PropertyInfo and provides implementation of all the methods and properties based on CodeMemberProperty code dom construct.
e. DesignTimeConstructorInfo: This class inherits from ConstructorInfo and provides implementation of all the method and properties based on CodeMemberMethod.
f. Attributeinfo: Attributeinfo class is used to hold information about the attributes on the types.

Type Provider Component

Type provider is a top level component in type system. An instance of type provider may be created. Type provider keeps a root node of the type tree. On adding assembly references and code compile units to the type provider, it loads all the types from them and loads them to the Type Tree.

For an example here: If you have following types coming from an assembly:
Art.Bar.Zoo
Art.Peter.Baz
System.String
Then the corresponding tree structure looks like:

```
            Art
              --Bar
                --Zoo
              -- Peter
                -- Baz
            System
              -- String
```

Each node keeps a list of type definitions which it points to. For an example in the above scenario String node will contain System.String type. A list of type definitions is kept on each node. There may be duplicate types in the type system.

The following are the public methods of Type provider.

AddAssemblyReference Method
public void AddAssemblyReference(string path)
This method is used to Add assembly references to the type system. All the types from the assembly will be loaded on to the type system.

RemoveAssemblyReference Method
public void RemoveAssemblyReference(string path)
This method is used to Remove assembly references from the type system. All the types loaded from this assembly to the type tree will be removed.

AddCodeCompileUnit Method
public void AddCodeCompileUnit(CodeCompileUnit codeCompileUnit)
This method is used to load CodeCompileUnits to the type system. This will go through all the CodeTypeDeclarations in the code compile unit and will create appropriate DesigntimeType which inherits from System.Type for each one of them. And DesignTimeType will be loaded to the type system.

RemoveCodeCompileUnit Method
public void RemoveCodeCompileUnit(CodeCompileUnit codeCompileUnit)
This method is used to unload CodeCompileUnit from type system. All the types loaded from CodeCompileUnit will be removed.

RefreshCodeCompileUnit Method
public void RefreshCodeCompileUnit(CodeCompileUnit codeCompileUnit, CodeCompileUnitRefreshHandler refresher)
This method is used to refresh the Code compile unit in the type system. It is like removing a compile unit from type system and then adding it back to the type system.

ITypeProvider Interface

This service is used to access and resolve types in the hosting environment's type system. This is the interface exposed by the TypeProvider component. ITypeProvider is the interface exposed by the TypeProvider to the user. It is used to resolve types in the type system. Following is the definition of this interface:

```
public interface ITypeProvider
{
    Type    GetType(string name);
    Type    GetType(string name, bool throwOnError);
    Type[ ] GetTypes( );
    StringCollection TypeLoadErrors
    {
        get;
    }
    event EventHandler TypesChanged;
    event EventHandler TypeLoadErrorsChanged;
}
```

Following is a description of the components involved in hosting TypeProvider in the designer:

TypeProviderHost Component

TypeProviderHost is the main component used for maintaining TypeSystem on a per project basis. TypeProviderHost keeps a project system pointer and a corresponding TypeProvider. It pushes one CodeCompileUnit to TypeSystem by parsing all the user code files. Also it listens to all the project system events which may modify types contained in the type system. Following are the architectural work done by the TypeProviderHost:
1. Parse User Code files and create a CodeCompileUnit. (FileCodeModel to CodeDOM layer)
2. Listens to events in project system and make appropriate calls to the TypeProvider to refresh types Here is the list of events it listens for and the corresponding TypeProvider call it makes to notify about the changes.

ILangFileEvents: These events are tracked for the file add, remove, move, build action change etcetera in the project. When any of these event happen, the type provider refreshes the CodeCompileUnit.

_dispCodeModelEvents: These events are fired by file code model of Visual basic whenever a new CodeElement is added to user code file. These events are only meant for visual basic project system, similar events are not fired in a C# project system.

_dispReferencesEvents: These events are fired on adding or removing an assembly reference from the project. On getting an add assembly reference event, the assembly is added to corresponding TypeProvider. On getting a remove assembly reference event, the assembly reference is removed from the type system.

_dispBuildEvents: Build events are tracked for project-project for reference cases. In such cases when a referenced project is built, the old assembly is removed from type system and the new assembly is refreshed into the TypeProvider to load new types from it.

_IVsRunningDocTableEvents: Running document table events are tracked for multiple purposes. For example, when a document is changed in editor but closed without saving it, the type system is reverted back to the non-saved state because the type system was updated with the changes in the file. When a document is opened in an editor for editing, the invention listens for IVsTextStreamEvents to get these events and refresh the code compile unit.

_IVsTextStreamEvents: These events are used to listen to file editing done by the user.

ITypeProviderCreator Service

The ITypeProviderCreator service is exposed on a designer package level. Using this service one may get the TypeProvider for a project. Following is the interface definition of ITypeProviderCreator:

```
public interface ITypeProviderCreator
{
    ITypeProvider GetTypeProvider(object obj);
}
```

This service is implemented by the orchestration designer package. The implementation of this service listens to IVsSolution events and maintains a type provider host for each project in the solution. Also this service creates a TypeProviderHost for a project when someone demands it for the first time. Using this service, a developer gets to the TypeSystem of any project. Also on solution close, this service destroys all the TypeProviderHost in the system. On closing a project, this service removes the corresponding TypeProviderHost from the system.

The orchestration engine toolbox page buffers the toolbox entries categorized by assembly in a binary file. When activated, these entries are loaded into the page. The items in the toolbox are checked to indicate that if they are shown by the toolbox. The User may add new toolbox items from different assemblies by choosing the browse button. The Browse button brings up File Select dialog in which the user selects an assembly from which additional toolbox items may be loaded. The toolbox page loads the user chosen assembly in a separate app-domain and gets all the toolbox items out of it by calling ToolboxService.GetToolBoxItems. These items are then marshaled across domains and loaded into the toolbox page. This is done so that the user assemblies are not loaded into the primary domain and locked. The User then may check and uncheck the toolbox items which need to be shown in the toolbox. When the dialog is closed the toolbox page uses ToolboxService.AddToolBoxItems and ToolboxService.RemoveToolBoxItems to add and remove items from the toolbox based on their checked state. The toolbox page also serializes the updated toolbox entries in a binary file so that they may be loaded the next time toolbox page is shown.

GetType Method

Type GetType(string name);

This method is used to resolve type in type Tree. The User passes in a string in the form of "A.B.C" where A.B is the namespace and C is the name of type in the namespace. This method could return "null," which means that type with the following name could not be resolved.

GetType overload Method

Type GetType(string name, bool throwOnError);

This method is identical to the above method, only difference is that it throws an exception when a type is not found.

GetTypes Method

Type[ ] GetTypes ( );

This method is used to retrieve all the types present in the type system.

TypeLoadErrors Property

StringCollection TypeLoadErrors {get;}

On loading types on to the Type provider, it might get into some problems, for an example it could not resolve an assembly reference. In those scenarios TypeLoadErrors property returns all the type load errors.

TypesChanged Event event EventHandler TypesChanged;

Whenever a new assembly reference or code compile unit is added to the Type System, this event will be fired to the user telling that types in the type system are changed. This is a general event which means it does not provide any specific information on which types are added or removed.

Delay Loading Infrastructure

Type system has delay-loading capabilities. Assembly references and CodeCompileUnits added to TypeProvider are not loaded until some one needs to resolve types from the type tree. So the code in AddAssemblyReference and AddCompileUnit caches the assembly paths and CodeCompileUnit and fires the TypesChanged event. None of the types will be loaded until and unless someone demands for them. This technique improves the performance of type system. Due to this reason, exceptions are not thrown when the type loading fails. Instead, TypeLoadErrors are fired.

The following code snippet explains how to create TypeProvider component:

```
// create code compile unit
CodeCompileUnit ccu = new CodeCompileUnit( );
// add namespace
CodeNamespace sampleUserCode = new CodeNamespace("SampleUserCode");
ccu.Namespaces.Add(sampleUserCode);
CodeTypeDeclaration mySchedule = new CodeTypeDeclaration("MySchedule");
mySchedule.BaseTypes.Add(new
CodeTypeReference("System.Workflow.Runtime.Schedule"));
mySchedule.IsClass = true;
mySchedule.PartialType = PartialType.Partial;
mySchedule.TypeAttributes = TypeAttributes.Public;
sampleUserCode.Types.Add(mySchedule);
// create a Type Provider
TypeProvider typeProvider = new TypeProvider(null);
typeProvider.AddAssemblyReference(Assembly.GetExecutingAssembly( ).Location)
typeProvider.AddCodeCompileUnit(ccu);
```

XomlSerializer Class

The serializer component associated with an activity inherits from XomlSerializer. XomlSerializer is also a default serializer component for the activities. It reflects over the activity properties and serializes them. For the composite activities, the default serializer component is CompositeXomlSerializer, which in addition to primitive Xoml serialization, also serializes the child activities.

The functions in this class may be further categorized as public functions which are used to serialize and deserialize the xoml file, functions which are used to control serialization of an object, and functions which are used to control deserialization of an object.

Public Functions to Serialize/Deserialize XOML File
    public object Deserialize(XmlTextReader reader)

This method, given a XmlTextReader object, deserializes it and returns an object. XmlTextReader is pointing to an xml element. This is a public method to deserialize the xoml file.
    public object Deserialize(IDesignerSerializationManager sm, XmlTextReader reader)

This method deserializes an activity given a TextReader and IDesignerSerializationManager. The IDesignerSerializationManager object may be used to provider custom deserializer for objects and also to resolve the types.
    public void Serialize(object obj, XmlTextWriter writer)

This method serializes the object specified in the first parameter to the XmlTextWriter object
    public void Serialize(IDesignerSerializationManager sm, object obj, XmlTextWriter wr);

This method serializes the object onto the XmlTextWriter object. It takes an additional designer serialization manager object which may be used to resolve type etcetera.

Deserializing an Object
    protected object DeserializeObject(IXomlSerializationManager sm, XmlTextReader rd);

This method deserializes an element and creates an object. It uses the xmlns to CLR namespace and assembly mapping to resolve the type of the object and then gives a chance to the serializer component associated with the type to create the instance of the type. The CreateInstance method of the XomlSerializer is used to create instance of the object, which may be overridden in derived classes. The XmlTextReader must be pointing to an element node otherwise this method throw an exception. This method calls the DeserializeContents after creating the instance of the object.
    protected void DeserializeContents(IXomlSerializationManager sm, object obj, XmlTextReader rd);

This method is used to deserialize properties and child objects of an object. It takes the object and the XmlTextReader as parameters. XmlTextReader points to the XmlElement node. It goes through all the attributes of the element and calls DeserializeSimpleProperty( ) on the serializer. The DeserializeSimpleProperty may be overridden to do custom deserialization of properties. After that it goes through all the child elements of the element and recognizes them either as child objects or properties. On realizing a child element as property it calls DeserializeCompoundProperty( ) on the serializer, otherwise it calls DeserializeObject( ) to deserialize the child element and adds the returned object as the child of the main object. To to add the returned object as the child object it calls AddChild( ) method on the serializer which may be overridden to implement different parent-child relation ships.
    protected virtual void DeserializeSimpleProperty (IXomlSerializationManager sm, object obj, XmlTextReader rd);

This method is called by DeserializeContents( ) to deserialize a simple property. The object of which the simple property is part of and the XmlTextReader is passed as parameters. The XmlTextReader points to an attribute. The name of the attribute is treated as the name of the property.
    protected virtual void DeserializeCompoundProperty (IXomlSerializationManager sm, object obj, PropertyDescriptor pd, XmlTextReader rd);

This method is called by DeserializeContentso to deserialize a compound property. It is passed the object, proerty descriptor and the XmlTextReader. The XmlTextReader points to the XmlElement. The property could be a readonly or non-readonly. If the property is readonly then the getter method on the property is called which will give the object, now the DeserializeContents on that object is called to deserialize the contents of the object. If the property is read-write then it may only have one and only one child element. The first child element is deserialized and the returned object is set on the property.

Serializing an Object
    protected void SerializeObject(IXomlSerializationManager s, object o, XmlTextWriter wr);

This method is called to serialize the object. It is passed the object which needs to be serialized and the XmlTextWriter on which the serialization contents have to be written. This method constructs XmlQualifiedName for the object, which actually is the xml namespace and class name of the type of the object. The xml namespace is constructed using the assembly and namespace information of the type of the object. It writes the begin of an xml element with that qualified name and then calls SerializeContents( ) to further serialize the properties and child objects of the object. And it calls the EndElement to close the element.
    protected void SerializeContents(IXomlSerializationManager s, object o, XmlTextWriter w);

This method is called to serialize all the properties and child objects of an object. This method is passed the object and the XmlTextWriter which points to an Xml element. It looks for the serializer component of the object and calls GetProperties( ) on it to get the properties of the object. It looks for DesignerSerializationVisibility attribute on property, if the Visibly is set to Visible then property is treated as simple property and SerializeSimpleProperty is called, if the Visibility is set to Content then property is treated as complex property and SerializeCompoundProperty( ) is called, otherwise if the visibility is set to Hidden then the property is ignored. Also it checks for DefaultValue attribute for the property, if the DefaultValue of the property is same the value of the property then the property is skipped. It calls GetChildren( ) on the serializer component of the object to get all the children objects. It then serializes all the child objects using SerializeObject( ).
    protected virtual void SerializeSimpleProperty(IXomlSerializationManager sm, object obj, PropertyDescriptor pd, string parentPropName, XmlTextWriter wr);

This method is passed the object of which the property needs to be serialized, the PropertyDescriptor of the property and XmltextWriter object. This function writes an xml attribute on the XmlTextWriter by using the property name as the attribute name and property value as the attribute value.
    protected virtual void SerializeCompoundProperty (IXomlSerializationManager sm, object obj, PropertyDescriptor pd, XmlTextWriter wr);

This method is used to serialize a compound property of an object. It is passed in an object, the property descriptor and the XmlTextWriter object. If the property is read-only it creates an element and calls SerializeContents( ) on the object returned by the property's getter method call, otherwise it writes an start element whose name is the name of the property and calls SerializeObject( ) on the object returned by the property's getter method call.

Helper Functions protected virtual IList GetChildren(object obj);

This method is used to get the child objects of an object. Usually objects use different mechanisms to describe the parent child relation ships. For an example the IComposite-Activity denotes the child objects programmatically using the Activities property. The different serializer may override this property and return the list of child objects. By default this returns <null> value.

protected virtual PropertyDescriptorCollection GetProperties(object obj);

This method is used to get properties of an object. By default this method returns the properties with Browsable attribute set to true and DesignerSerializationVisibility attribute not set to Hidden. The object serializer component may override this and control the collection of returned properties.

protected virtual void AddChild(object obj, object childObj);

This method is used to add a child of the parent object. It does the reverse of GetChildren( ), The serializer component may control the behavior of the AddChild( ) implementation.

protected virtual object CreateInstance(Type type, XmlTextReader rd);

This method is used to create an instance of the type. By default it calls Activator.CreateInstance( ) to create the object. But the derived classes may use different techniques to CreateInstance( ) of their component types and they may also pass some parameters on the constructor by using the XmlTextReader object.

CompositeXomlSerializer Class

Composite Xoml serializer is used to serialize composite activities. It has two methods overridden from base class for deserializing and serializing child activities.

```
public class CompositeActivityXomlSerializer: XomlSerializer
{
  protected override IList GetChildren(object obj)
  {
    ... argument checks
    ICompositeActivity compositeActivity = obj as ICompositeActivity;
    return (IList)compositeActivity.Activities;
  }
  protected override void AddChild(object obj, object childObj)
  {
    ... argument checks
    ICompositeActivity compositeActivity = obj as ICompositeActivity;
    IActivity activity = childObj as IActivity;
    compositeActivity.Activities.Add(activity);
  }
}
```

IXomlSerializationManager Interface

IXomlSerializationManager inherits from IDesignerSerializationManager class. It provides additional functions to give the activity type given an xml qualified name and vice-versa. Following is the interface definition of IXomlSerializationManager:

```
public interface IXomlSerializationManager:
IDesignerSerializationManager
{
  XmlQualifiedName  GetXmlQualifiedName(Type type);
  Type              GetType(XmlQualifiedName xmlQualifiedName);
}
```

Serialization Errors

Xoml serializer adds all the Deserialization errors using the IDesignerSerializationManager.ReportError( ) method. When ever the deserialization encounters an error it simply adds the error object, but it does not stop the deserialization process until and unless the xml format is illegal. The XomlSerializer reports the deserialization errors using XomlSerializerException class.

```
public class XomlSerializationException: Exception
{
  private int lineNumber = -1;
  private int columnNumber = -1;
  public XomlSerializationException(string message, int line, int column)
        :base(message)
  {
    ..
  }
  public XomlSerializationException(string message, Exception innerException, int
              line, int column)
  {
    ..
  }
  public XomlSerializationException(string message)
  {
  }
  public int LineNumber { get; }
  public int LinePosition { get;}
}
```

The workflow componentModel also provides serialization of a schedule to a web services description language (WSDL) format.

Orchestration Engine Designer Architecture

The orchestration engine designer uses the classes defined in the System.ComponentModel and System.ComponentModel.Design namespaces. The framework infrastructure classes used by the orchestration engine designer are DesignSurface, DesignSurfaceManager and DesignerLoader. All of these classes are part of System.ComponentModel.Design namespace.

The following table briefly describes the description and uses of this namespace.

TABLE B2

| | System.Workflow.ComponentModel.Design. |
|---|---|
| Namespace | System.Workflow.ComponentModel.Design |
| Description | This namespace contains implementation of all the activity designers and interfaces used by the orchestration engine designer. |
| Uses | Contains base classes for writing the designers<br>Contains Interfaces for plugging in the activity designers into the orchestration engine designer.<br>Contains plumbing needed to talk with classes in System.ComponentModel.Design namespace.<br>Classes useful in writing custom activity designers.<br>Classes useful in writing custom toolbox items so that activities may appear in toolbox. |
| Binary | System.Workflow.ComponentModel.dll |

DesignSurface and DesignSurfaceManager

DesignSurface represents a designer, and includes a default set of services that will be needed by designers. DesignSurfaceManager provides essentially a collection of designers, along with some application-level services those designers may use for communication purposes. DesignSurface exposes multiple services using IServiceProvider interface. The master service exposed is IDesignerHost. IDesignerHost keeps a collection of components added to it, and creates designer for all the components added to it, based on the DesignerAttribute declared on the component. Every component added to designer host must inherit from IComponent. Also the first component added to it is known as RootComponent. The designer for RootComponent must implement an interface called IRootDesigner. This interface has a method called GetView( ), which returns 'Control' object for the root component. The design surface returns the Control returned by root component's GetView( ) in its view property implementation.

The orchestration engine designer uses Schedule as RootComponent and ServiceRootDesigner as its root designer. The GetView( ) method on ServiceRootDesigner returns 'WorkflowView' control, which may be directly hosted by the hosting environment, for an example when the orchestration engine designer is hosted in the designer, the WorkflowView control will be hosted by IVsWindowPane's primary window.

DesignerLoader

DesignerLoader is an abstract class responsible for deserialization and serialization of object graph. A designer loader is created and handed a file or blob of data that contains the serialized state for the designer. The relationship between the data and the loader is private to the loader's implementation. The designer loader is asked to begin the loading process. It is passed an interface pointer, called IDesignerLoaderHost that provides access to DesignSurface that knows how to create designers. IDesignerLoaderHost also provides some common utility functions. The designer loader interprets its bag of serialized data. It creates instances of components, adds them to the container, and sets properties on them. The orchestration engine designer has ServiceDesignerLoader as its implementation for for DesignerLoader class.

Journey from Xoml File to WorkflowView Control

Following is the pseudo code which explains how to hook together all these infrastructure pieces to deserialize the Xoml and display it in a Window Form control.
  DesignSurface surface=new DesignSurface( );
  ServiceDesignerLoader loader=new ServiceDesignerLoader(surface);
  loader.FilePath="c:\\foo.xoml";
  surface.BeginLoad(loader);
  Control control=surface.View;

The above code first creates a DesignSurface. Then it creates a DesignerLoader and passes the surface object in its constructor. Then it sets the FilePath property on the loader. Now it asks the surface to start loading using the specified loader. DesignSurface in turn calls DesignerLoader.BeginLoad( ) to load the xoml file. This causes the activities to be added to DesignSurface, which in turn creates a designer for these activities and caches the activities and their designers. The first component added is Schedule which is known as RootComponent and it has the ServiceRootDesigner associated as a designer using DesignerAttribute.

IComponent and IComponent.Site

All the components added to DesignSurface implements IComponent. DesignSurface creates a Site object and sets it on IComponent.Site property. When a component is sited, it is said to be "owned" by a particular container. A container may provide services to the component through the component's site, and the container itself may even delegate service requests to a parent service provider.

IDesigner and IActivityDesigner

The components added to design surface have a designer associated with them which implements IDesigner interface. IDesigner interface is primitive and the functionality provided is common to all the components. To host designer in the orchestration engine DesignSurface, it must implement IActivityDesigner, which is an interface defined to do most of the UI related work. For an example drag/drop, mouse, keyboard, lay-outing, rendering etcetera. Designers are associated with components through a class-level attribute of type DesignerAttribute. Designers are created by a special implementation of the IContainer interface. When a component is added to this container, the container will search the component's metadata for a designer attribute. If it exists, the designer will be created and initialized.

Design Time Services Requirements

Every designer is initialized with the IComponent it is associated with. IComponent.Site allows the designer to communicate through the outer world. When a component is added to IDesignerHost, designer host creates a site for the component and set it on IComponent. Site property. Site inherits from IServicePovider which allows the designer to access the outer world services.

Services Proffered by DesignSurface

These are standard services proffered by DesignSurface.

TABLE B3

Services Offered by the Designer.

| Replaceable Services |  |
| --- | --- |
| The following services are provided by default, but are replaceable by replacing their value in the protected ServiceContainer property. | |
| IExtenderProviderService | Allows objects that are not part of the container's Components collection to provide their own extender providers. |
| IExtenderListService | Used by TypeDescriptor to get a list of extender providers. This allows extender providers to live outside of the container. |
| ITypeDescriptorFilterService | Primary interface for metadata filtering. This provides designer metadata hooks. |
| ISelectionService | Provides a way to select components in the designer. |
| IReferenceService | Provides a way to get a name for objects, even when those objects are not sited. |
| DesignSurface | The design surface offers itself as a service. |
| DesignerAttributeService | This service provides attribute discovery for designers. |
| Non-Replaceable Services | |
| The following services are provided by default. | |
| IComponentChangeService | Raises events as changes are made to components. |
| IDesignerHost | Master interface for designers. Controls access to types, services and transactions. |
| IContainer | Each designer has an IContainer that owns the set of components that are being designed. |
| IServiceContainer | Interface derives from IServiceProvider and provides a way to add and remove services from the designer. |

Services Proffered by Hosting Environment

TABLE B4

Services Offered by the Hosting Environment.

| | |
| --- | --- |
| IFieldBindingService | Used to create fields, enumerate fields declared in the code beside file. |

TABLE B4-continued

Services Offered by the Hosting Environment.

| | |
|---|---|
| IEventBindingService | Used to create methods, enumerate methods declared in the code beside file. |
| ITypeBindingService | Used to create classes in the code beside file. |
| IIdentifierCreationService | Used to ensure unique identifiers of components. |
| IExtUIService | Provides a way to navigate to properties in the property browser window and allows to add task items to the TaskList. |
| IMenuCommandService | It is used to display context menus, standard menus and designer verbs |
| IUIService | This service has methods related to display modal dialog boxes, display tool windows in hosting environment. |
| IToolboxService | This is a standard service. |

Workflow View

Workflow view is the design surface which renders a visual representation of process flow described in XOML. Workflow view offers rich set of UI functionality needed by the activity designers for rendering and for responding to various windows generated events. In addition to this the workflow view offers set of common functions which may be used by all the designers to perform certain activities.

public class WorkflowView: UserControl, IDesignerService, IDesignerView, IServiceProvider System.Object

```
System.MarshalByRefObject
  System.ComponentModel.Component
    System.Windows.Forms.Control
      System.Windows.Forms.ScrollableControl
        System.Windows.Forms.ContainerControl
          System.Windows.Forms.UserControl[Visual Basic]
            System.OrchestrationEngine.ComponentModel.Design.WorkflowView
```

UserControl: User control allows the workflow view to be rehosted into a third party application to render the workflow.

IDesignerService: The designer service enables the workflow view to expose functionality which enables the activity designers and other hosts to interact with it to exploit various user interface features.

IDesignerView: The designer view interface allows the workflow view container to interact with workflow. Using this service the outer container may communicate its active state to the workflow view which in response to these messages updates its UI state and may do initializations.

IServiceProvider: workflow view acts as service provider to the activity designers; using the workflow view the activity designers may get access to other services proffered in service container.

Workflow view is the design surface which renders a visual representation of process flow described in XOML. Workflow view offers rich set of UI functionality needed by the activity designers for rendering and for responding to various windows generated events. In addition to this the workflow view offers set of common functions which may be used by all the designers to perform certain activities.

What is claimed is:

1. A computer-implemented method to be executed on a computing device for modeling a workflow, said workflow including activities, said method comprising:

presenting a plurality of activities via an interface, said plurality of activities comprising a structured set of steps including an ordered sequence of events, a set of asynchronous events, or both, each of the plurality of activities including metadata for a step in the workflow;

receiving, via an input interface, a selection of the presented activities by a user;

serializing the received activities to create a declarative and persistent representation of the workflow to model a business logic, said serializing comprising binding metadata to objects associated with the received activities and transferring the included metadata of the received activities into the declarative and persistent representation of the workflow such that the computing device can process the workflow based on the declarative representation, said declarative and persistent representation being based on a serialization format, said serialization format defining the following rules: an object is serialized as an XML element, a property of an object is categorized as simple property or complex property, and a child object of an object is serialized as a child element, wherein the serialized is in the form of code statement collection in the declarative and persistent representation of the workflow;

wherein the serialized activities are mapped to an extensible schema definition namespace for validation;

compiling the serialized workflow representation and the received selection into a single assembly containing an executable representation of the workflow, wherein the compiling is not tied to a particular programming language and the declarative representation of the workflow does not need a translation to the particular programming language for the compiling; and executing the executable representation of the workflow created by the compiling.

2. The computer-implemented method of claim 1, further comprising:

receiving software code representing the business logic from a user for association with one of the plurality of activities;

compiling the software code to create one or more binary files; and executing the created binary files to perform the workflow.

3. The computer-implemented method of claim 2, wherein the software code conforms to a common language runtime (CLR) schema.

4. The computer-implemented method of claim 2, further comprising compiling the serialized workflow representation and software code into a single assembly containing an executable representation of the workflow.

5. The computer-implemented method of claim 1, further comprising:

receiving a user-defined activity from the user, said user-defined activity having one or more semantics associated therewith;

evaluating the semantics for conformance to a predefined interface requirement;

presenting the user-defined activity as one of the plurality of activities as function of said evaluating.

6. The computer-implemented method of claim 1, wherein presenting the plurality of activities comprises presenting a plurality of activities each having one or more properties associated therewith specifying design time, compile time, and run time behavior.

7. The computer-implemented method of claim 1, wherein presenting the plurality of activities comprises visually presenting the plurality of activities.

8. The computer-implemented method of claim 1, further comprising translating the serialized workflow representation of the received activities to another workflow language.

9. The computer-implemented method of claim 1, further comprising receiving a hierarchical organization of the selected activities from the user, and wherein the received hierarchical organization comprises one or more of the following: an event-condition-action workflow, a structured workflow, and a constraint-driven workflow.

10. The computer-implemented method of claim 1, wherein one or more computer-readable storage media have computer-executable instructions for performing the method recited in claim 1.

11. One or more computer-readable storage media having computer-executable components for modeling a workflow, said workflow including activities, said workflow modeling a business logic, said components comprising:
  a palette component for visually presenting a plurality of activities, said plurality of activities comprising an ordered sequence or a set of asynchronous events, or both, each of the plurality of activities including metadata for a step in the workflow;
  an interface component for receiving, from a user, a selection and hierarchical organization of the activities presented by the palette component;
  a declarative component for serializing the activities received by the interface component to create a declarative and persistent representation of the workflow, said serializing comprising binding metadata to objects associated with the received activities and transferring the included metadata of the received activities into the declarative and persistent representation of the workflow based on a serialization format, said serialization format defining the following rules: an object is serialized as an XML element, a property of an object is categorized as simple property or complex property, and a child object of an object is serialized as a child element, wherein the serialized is in the form of code statement collection in the declarative and persistent representation of the workflow;
  wherein the declarative component farther maps the serialized activities to an extensible schema definition namespace for validation; and
  a runtime component for compiling the workflow representation serialized by the declarative component and the selection received by the interface component into a single assembly containing an executable representation of the workflow, wherein the compiling is not tied to a particular programming language and the declarative representation of the workflow does not need a translation to the particular programming language for the compiling, wherein the runtime component executes the executable representation of the workflow.

12. The computer-readable storage media of claim 11, wherein the interface component further receives software code representing business logic from a user for association with one of the plurality of activities.

13. The computer-readable storage media of claim 11, further comprising hosting the palette component, interface component, and declarative component in an application program.

14. A computer-implemented system for modeling a workflow, said workflow including activities, said workflow modeling a business logic, said computer-implemented system comprising:
  a memory area for storing a package identifying a plurality of activities, said plurality of activities comprising an ordered sequence or a set of asynchronous events, or both, each of the plurality of activities including metadata for a step in the workflow;
  an interface for selecting and interrelating one or more of the activities from the package to create a workflow; and
  a processor configured to execute computer-executable instructions embodied in the following:
    a serializer for serializing the received activities to create a declarative and persistent representation of the workflow, said serializing comprising binding metadata to objects associated with the received activities and transferring the included metadata of the received activities into the declarative and persistent representation of the workflow, said declarative and persistent representation being based on a serialization format, said serialization format defining the following rules: an object is serialized as an XML element, a property of an object is categorized as simple property or complex property, and a child object of an object is serialized as a child element, wherein the serialized is in the form of code statement collection in the declarative and persistent representation of the workflow;
    a validator for mapping the serialized activities to an extensible schema definition namespace;
    a compiler for compiling the serialized workflow representation and the received selection into a single assembly containing an executable representation of the workflow, wherein the compiler is not tied to a particular programming language and the declarative representation of the workflow does not need a translation to the particular programming language for the compiling; and
    a runtime engine for executing the executable representation of the workflow created by the compiler.

15. The computer-implemented system of claim 14, wherein the interface receives software code that implements business logic associated with the selected activities, wherein the processor is configured to execute the compiler for compiling the serialized workflow representation and the software code into an executable representation of the workflow.

16. The computer-implemented system of claim 15, wherein the package, interface, serializer, compiler, and runtime engine are hosted in an application program.

17. The computer-implemented system of claim 14, wherein the plurality of activities includes a user-defined activity, said user-defined activity having one or more properties, and wherein the processor is further configured to execute a semantic checker for verifying a format associated with each of the properties.

18. The computer-implemented system of claim 14, wherein the interface comprises one or more of the following: a user interface component and an application programming component.

19. The computer-implemented system of claim 14, further comprising a data structure representing a component model associated with each of the activities in the workflow, said data structure comprising:
  an image field storing data for visually representing the activity; one or more author time fields storing metadata defining properties, methods, and events associated with the activity;
  a serializer field storing data for transferring the metadata stored in the author time fields to a declarative representation of the activity;
  a business logic field storing software code associated with the metadata stored in the author time fields;
  an executor field storing data for executing the software code stored in the business logic field; and
  a semantic checker for validating the software code stored in the business logic field.

* * * * *